US011811588B2

(12) United States Patent
Ford et al.

(10) Patent No.: US 11,811,588 B2
(45) Date of Patent: Nov. 7, 2023

(54) CONFIGURATION MANAGEMENT AND ANALYTICS IN CELLULAR NETWORKS

(71) Applicant: Samsung Electronics Co., Ltd., Suwon-si (KR)

(72) Inventors: Russell Douglas Ford, San Jose, CA (US); Mandar N. Kulkarni, Richardson, TX (US); Pranav Madadi, Mountain View, CA (US); Vikram Chandrasekhar, Mountain View, CA (US); Yan Xin, Princeton, NJ (US); Sangkyu Park, Seoul (KR); Hakyung Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 17/192,780

(22) Filed: Mar. 4, 2021

(65) Prior Publication Data

US 2021/0351973 A1 Nov. 11, 2021

Related U.S. Application Data

(60) Provisional application No. 63/060,614, filed on Aug. 3, 2020, provisional application No. 63/021,183, filed (Continued)

(51) Int. Cl.
*H04L 41/0654* (2022.01)
*H04L 41/0631* (2022.01)
(Continued)

(52) U.S. Cl.
CPC .......... *H04L 41/064* (2013.01); *H04L 41/069* (2013.01); *H04L 41/0609* (2013.01); *H04L 41/0654* (2013.01); *H04L 43/067* (2013.01)

(58) Field of Classification Search
CPC ............... H04L 41/064; H04L 41/0609; H04L 41/0654; H04L 41/069; H04L 43/067;
(Continued)

(56) References Cited

U.S. PATENT DOCUMENTS

| 5,381,417 A | * | 1/1995 | Loopik | ............... G01R 31/2846 |
| | | | | 714/724 |
| 6,035,210 A | * | 3/2000 | Endo | ....................... H04W 52/20 |
| | | | | 370/332 |

(Continued)

FOREIGN PATENT DOCUMENTS

| WO | 2019/091359 A1 | 5/2019 | |
| WO | WO-2020029196 A1 * | 2/2020 | ........ H04W 28/0252 |

OTHER PUBLICATIONS

"Framework for evaluating intelligence levels of future networks including IMT-2020, Series Y: Global Information Infrastructure, Internet Protocol Aspects, Next-Generation Networks, Internet of Things and Smart Cities, Future Networks", ITU-T Y.3173, Feb. 2020, 34 pages.

(Continued)

*Primary Examiner* — Hitesh Patel
*Assistant Examiner* — Vinh Nguyen

(57) ABSTRACT

Apparatuses and methods for identifying network anomalies. A method includes determining a cumulative anomaly score over a predefined time range based on a subset of historical PM samples and determining an anomaly ratio of a first time window and a second time window, based on the cumulative anomaly score. The method also includes determining one or more anomaly events coinciding with CM parameter changes based on the anomaly ratio; collating the PM, alarm, and CM data into a combined data set based on matching fields and timestamps; generating a set of rules linking one or more CM parameter changes and the collated (Continued)

data to anomaly events; and generating root cause explanations for CM parameter changes that are linked to anomaly events.

20 Claims, 21 Drawing Sheets

Related U.S. Application Data on May 7, 2020, provisional application No. 63/014,025, filed on Apr. 22, 2020.

(51) Int. Cl.
*H04L 41/069* (2022.01)
*H04L 43/067* (2022.01)
*H04L 41/0604* (2022.01)

(58) Field of Classification Search
CPC ..... H04L 41/0816; H04L 41/16; H04L 43/16; H04L 41/0631
See application file for complete search history.

(56) References Cited

U.S. PATENT DOCUMENTS

| | | | | |
|---|---|---|---|---|
| 7,490,146 | B1* | 2/2009 | Motoyama | H04L 41/0213 709/224 |
| 8,510,807 | B1* | 8/2013 | Elazary | G06Q 30/06 709/224 |
| 8,867,373 | B2* | 10/2014 | Dimou | H04W 76/18 370/242 |
| 10,728,117 | B1* | 7/2020 | Sharma | H04L 41/5067 |
| 10,990,607 | B1* | 4/2021 | Altman | G06F 16/24556 |
| 2012/0278477 | A1* | 11/2012 | Terrell | H04L 69/22 709/224 |
| 2014/0359365 | A1* | 12/2014 | Kottler | G06F 11/3409 714/37 |
| 2015/0280968 | A1* | 10/2015 | Gates | G06F 11/0769 714/37 |
| 2015/0381409 | A1* | 12/2015 | Margalit | H04L 41/0631 709/221 |
| 2016/0021122 | A1 | 1/2016 | Pevny | |
| 2016/0170390 | A1* | 6/2016 | Xie | H04L 12/2829 700/19 |
| 2016/0241429 | A1 | 8/2016 | Froehlich | |
| 2017/0063652 | A1* | 3/2017 | Wu | H04L 43/04 |
| 2017/0245217 | A1* | 8/2017 | Kim | H04W 52/0264 |
| 2018/0239682 | A1* | 8/2018 | Kaluza | G06F 11/3006 |
| 2019/0253308 | A1* | 8/2019 | Huang | H04L 43/0823 |
| 2019/0306023 | A1* | 10/2019 | Vasseur | G06N 5/04 |
| 2019/0354081 | A1* | 11/2019 | Blank | G05B 19/4083 |
| 2020/0057558 | A1* | 2/2020 | Beloussov | G06F 3/0634 |
| 2020/0186433 | A1* | 6/2020 | Cui | H04L 41/16 |
| 2020/0267063 | A1 | 8/2020 | Ye et al. | |
| 2021/0019211 | A1* | 1/2021 | Sghiouer | G06F 11/079 |
| 2021/0258808 | A1* | 8/2021 | Mahimkar | H04W 24/08 |

OTHER PUBLICATIONS

International Search Report dated Jul. 26, 2021 in connection with International Patent Application No. PCT/KR2021/004493, 3 pages.
Written Opinion of the International Searching Authority dated Jul. 26, 2021 in connection with International Patent Application No. PCT/KR2021/004493, 3 pages.
AT&T Inc., Randall Stephenson, Chairman and Chief Executive Officer, "2019 AT&T Annual Report," Feb. 19, 2020, 107 pages.
SCF Release Program, "Small cells market status report Dec. 2018," Document No. SCF050, Version SCF050.10.04, Release 10, Dec. 3, 2018, 29 pages.
Richard S. Sutton, et al., "Reinforcement Learning, An Introduction" 2nd edition, A Bradford Book, The MIT Press, Cambridge, Massachusetts, London, England, 2015, 352 pages.
R. Kwan, et al., "On Association Rules Mining in the Context of Wireless Networks," 2015 7th Computer Science and Electronic Engineering Conference (CEEC), Electronic ISBN:978-1-4673-9481-9, Colchester, UK, Sep. 24-25, 2015, 7 pages.
R. Agrawal, et al., "Fast algorithms for mining association rules," Proceedings of the 20th VLDB Conference Santiago, Chile, 1994, 13 pages.
Jiawei Han, et al., "Mining Frequent Patterns Without Candidate Generation," Proc. 2000 ACM SIGMOD International Conference on Management of Data, vol. 29, Issue 2, Jun. 2000, 12 pages.

* cited by examiner

CONFIGURATION MANAGEMENT AND ANALYTICS IN CELLULAR NETWORKS

CROSS-REFERENCE TO RELATED APPLICATIONS AND PRIORITY CLAIM

This application claims priority under 35 U.S.C. § 119(e) to U.S. Provisional Patent Application No. 63/014,025 filed on Apr. 22, 2020, U.S. Provisional Patent Application No. 63/021,183 filed on May 7, 2020, and U.S. Provisional Patent Application No. 63/060,614 filed on Aug. 3, 2020. The above-identified provisional patent applications are hereby incorporated by reference in their entirety.

TECHNICAL FIELD

This disclosure relates generally to cellular network. More specifically, this disclosure relates configuration management and analytics in cellular networks.

BACKGROUND

The staggering complexity of today's mobile cellular networks may cause their management an increasingly challenging and costly proposition for cellular operators. Operational costs for some operators today already account for a significant percentage of revenue. As the size of cellular networks is expected to effectively double with 5th Generation (5G) systems and beyond, unsurprisingly, their management costs will only rise further.

SUMMARY

This disclosure provides methods and apparatuses for automated configuration management and analytics in cellular networks.

In a first embodiment, an apparatus for identifying network anomalies is disclosed. The apparatus includes a communication interface configured to receive one or more of performance management (PM) data alarm data, and configuration management (CM) data from one or more devices on a network. The apparatus may also include a processor operably connected to the communication interface, and configured to: determine a cumulative anomaly score over a predefined time range based on a subset of historical pm samples and determine an anomaly ratio of a first time window and a second time window, based on the cumulative anomaly score, wherein the first time window is before one or more CM parameter changes and the second time window is a time window during and after one or more CM parameter changes. The processor may also be configured to determine one or more anomaly events coinciding with CM parameter changes based on the anomaly ratio, collate the PM, alarm, and CM data into combined data set based on matching fields and timestamps, generate a set of rules linking one or more cm parameter changes and the collated data to anomaly events, and generate root cause explanations for cm parameter changes that are linked to anomaly events.

In a second embodiment, a method for identifying network anomalies is disclosed. The method includes receiving one or more of performance management (PM) data alarm data, and configuration management (CM) data from one or more devices on a network. The method also includes determining a cumulative anomaly score over a predefined time range based on a subset of historical PM samples and determining an anomaly ratio of a first time window and a second time window, based on the cumulative anomaly score, wherein the first time window is before one or more cm parameter changes and the second time window is a time window during and after one or more cm parameter changes; determining one or more anomaly events coinciding with CM parameter changes based on the anomaly ratio. The method also includes collating the PM, alarm, and CM data into combined data set based on matching fields and timestamps, generating a set of rules linking one or more cm parameter changes and the collated data to anomaly events, and generating root cause explanations for cm parameter changes that are linked to anomaly events.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts.

Figure 1:
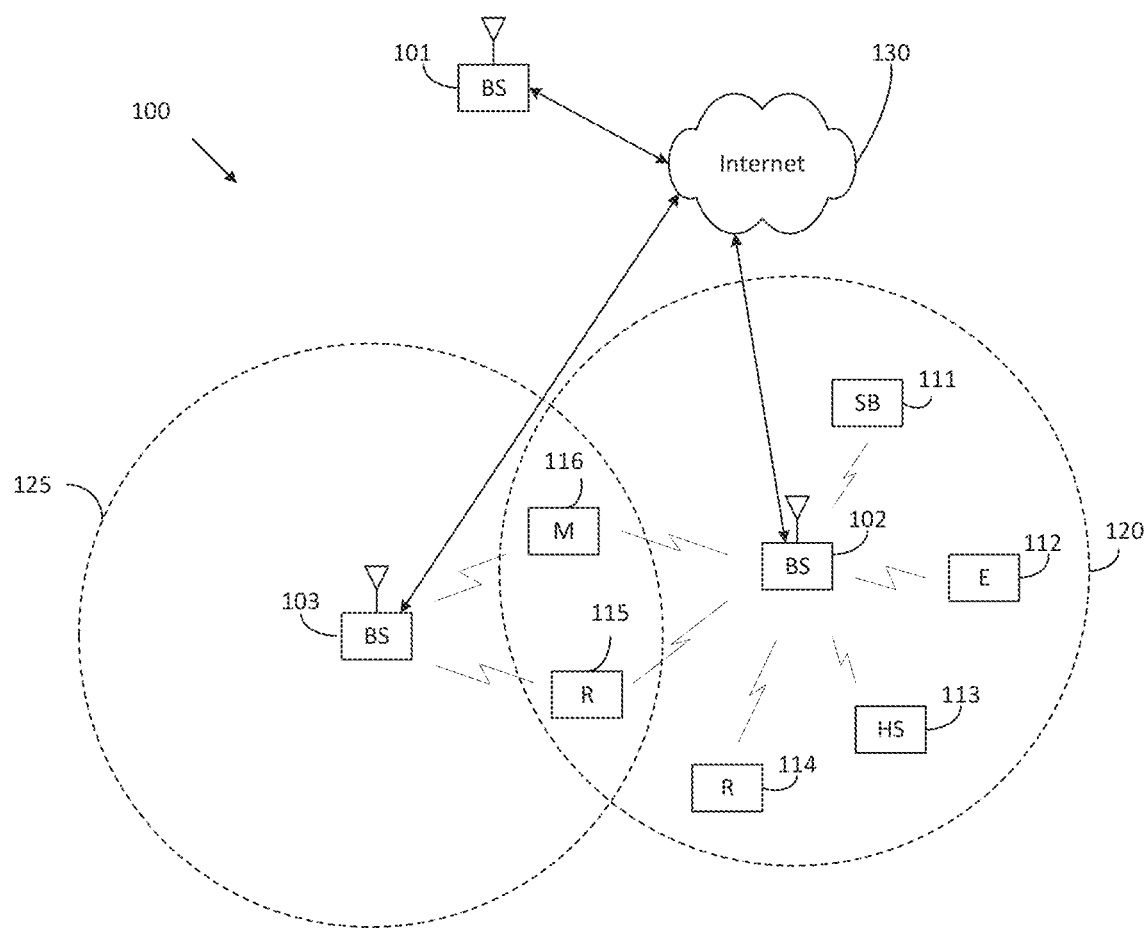
FIG. 1 illustrates an example wireless network according to this disclosure.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

DETAILED DESCRIPTION

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

As stated above, monitoring and maintenance of cellular networks are costly for operators. Configuring cellular base stations can be time consuming and require significant human effort. Errors may lead to degraded performance and prolonged downtimes.

This disclosure provides systems and methods for monitoring one or more cellular networks, detecting problems within the network, and identifying the root cause. Cell configuration settings that are determined to be linked to degraded performance may be identified and/or automatically adjusted. Parameter settings that may improve performance may also be identified and/or automatically adjusted to optimize cell performance.

In cellular wireless networks, a large volume of metadata is generated by network devices such as base stations, core network elements such as routers, and end-user devices. The metadata may include performance management (PM) data as well as fault management (FM) data. Examples of PM data include time-series data such as counters, performance metrics, and performance measurements. Examples of FM data include alarm events that indicate a device has entered an erroneous state, or that some other condition has occurred.

In order to maintain service quality for end-users, network operators must monitor this data to ensure performance benchmarks, such as key quality indicators (KQIs) and key performance indicators (KPIs) are being met; and to identify active or potential faults. Active or potential faults may be due to failures or an improper configuration(s). Active or potential faults may cause devices to suffer degraded performance, resulting in a diminished subscriber experience.

The configuration of different network elements may be updated through a configuration management (CM) system. A typical 4G LTE cell has on the order of a thousand unique configuration parameters, with hundreds more added in the configuration of 5G New Radio (NR) cells. CM changes may be made by engineers or by automatic background processes such as self-organizing network (SON) functions. For example, by an automatic neighbor relation (ANR) operation, or an automatic primary cell ID (PCI) assignment function. CM changes are often necessary. For example, changes are necessary when setting up a new cell deployment, remediating failures and faults, or optimizing the performance of a cell. For example, a cell's performance may be optimized by adjusting the antenna electronic tilt to optimize coverage or adjusting handover parameters for mobility robustness optimization (MRO).

With the complexity of today's cellular networks, whenever a CM change is made, either by humans or automated processes, there is a potential for errors to be introduced, which may inadvertently result in faults and performance degradation. Engineers often rely on their own domain of expertise when altering the network configuration and may not be able to consider all possible effects on performance when doing so. Some example cases of CM misconfiguration which can lead to performance degradation are explained below. For example, engineers may mistakenly set a parameter to an erroneous value, which is often referred to as a "fat finger" error.

A new deployment or changes to an existing cell may cause degradation to a neighbor cell. For example, an automatic process may make one or more configuration changes, which may trigger performance degradation. For example, if the automatic PCI assignment function sets a cell's PCI to one which is already in use by another nearby cell, a PCI conflict may occur, which may be highly detrimental to the accessibility and handover performance of both cells.

Additionally, engineers and automatic processes may tune parameters for optimizing cell performance, which is typically done after the cell has initially been configured and has reached a "steady state" of acceptable performance. Again, engineers, network operators, etc., often rely on experience and trial and error when optimizing a cell. This process often requires several iterations of adjusting one or more CM parameter values and observing the impact to performance over a time period. Therefore, manual optimization of cell parameters may be time consuming and imprecise, possibly leading to sub-optimal performance.

A list of abbreviations used herein is provided below in Table 1:

TABLE 1

Abbreviations

| Abbreviation | Explanation |
| --- | --- |
| 3GPP | 3rd Generation Partnership Project |
| BS | Base Station |
| DL | Downlink |
| OSS | Operations Support System |
| PM | Performance Management |
| FM | Fault Management |
| CM | Configuration Management |
| EDA | Exploratory Data Analysis |
| KPI | Key Performance Indicator |
| FM | Fault Management |
| KQI | Key Quality Indicator |
| E-RAB | E-UTRAN Radio Access Bearer |
| HO | Handover |
| HOSR | Handover success rate |
| RCA | Root cause analysis |
| AD | Anomaly Detection |
| MAD | Mean/Median Absolute Deviation |
| PHR | Power Headroom Report |
| RFI | Radio Frequency Interference |

Tracking Performance Impact of Configuration Changes.

Due to the large volume of data generated by thousands of network devices, it is a challenging task for engineers to monitor all of the relevant PM metrics and FM events to ensure proper network operation and service quality, investigate performance issues or faults, such as those resulting from CM changes, and take one or more actions to remedy them. These manual tasks often result in long downtimes or mean time-to-recover (MTTR) from failures and come with high costs in terms of human labor and other operational costs, including the costs incurred for reproducing the problem (e.g. via drive tests), testing different solutions, and verifying the final solution fixes the underlying issue.

Therefore, it is useful for operators to have at their disposal a system for intelligently monitoring network performance, and automatically detecting faults or anomalous performance. The system may then perform automatic root cause analysis (RCA) to identify a possible root cause or causes for the abnormal performance.

To determine whether performance issues are the result of a CM misconfiguration(s), an intelligent AI/RCA system may track changes in CM parameters alongside trends in PM data, FM events, and system logging information from one or more cells and/or other network devices in order to identify misconfiguration of parameters, and automatically generate analytics information linking the misconfigurations to potential performance issues.

Performing Remedial Actions.

The RCA analytics may be provided to an engineer(s) so they may take manual action(s). Remedial action or actions may be recommended by the automated system. Alternatively, a "self-healing" SON process may be triggered to automatically remediate the issue, (e.g., by updating the configuration of one or more cells or other network elements, without the need for human input).

Performance Optimization.

Additionally, an automated SON system may also identify parameter values that may offer improved cell performance. For instance, an algorithm may employ a rule-based system or may make use of a machine learning (ML) or statistical model trained by historical data, or combinations thereof, to model the relationship between one or more parameter values and the performance across one or more KPIs. From this information, the system may identify opportunities for performance improvement and tune related parameters accordingly. Such a process may adapt to changes in performance. For example, if a cell's performance is observed to decrease after (re-)configuring one or more parameters, other values may be intelligently tried until the performance is observed to improve.

Certain embodiments of this disclosure provide systems and methods for monitoring one or more cellular networks, detecting issues within the network(s), and identifying the root cause or causes of an issue.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

To meet the demand for wireless data traffic having increased since deployment of 4G communication systems, and to enable various vertical applications, 5G communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, CM, PM, and FM may be received from one or more data sources, and configuration of different network elements may be updated through an AI-based configuration management (CM) system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
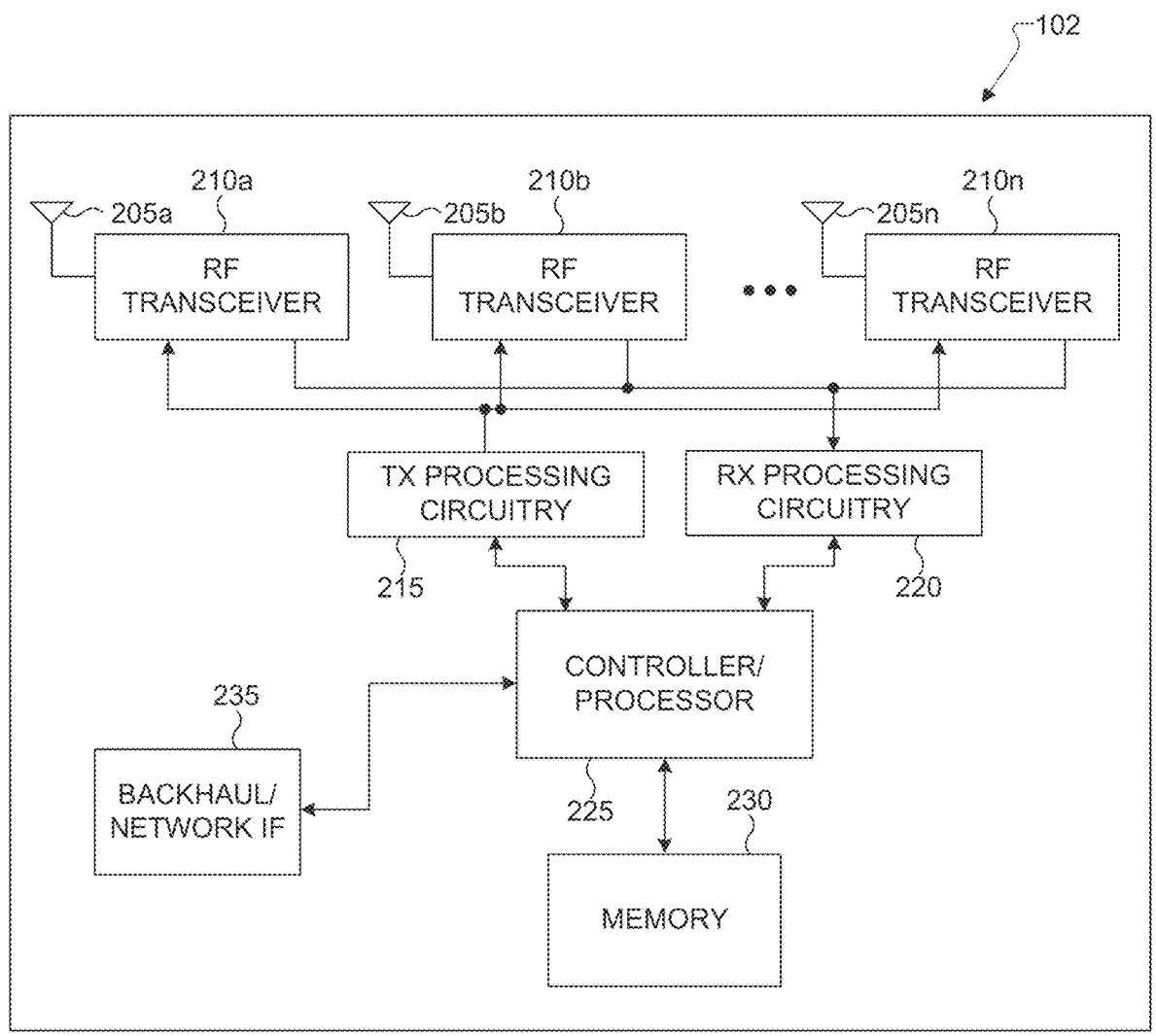
FIG. 2 illustrates an example gNB according to this disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, certain embodiments of this disclosure provide systems and methods to determine meaningful correlations between alarm and KPI data.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
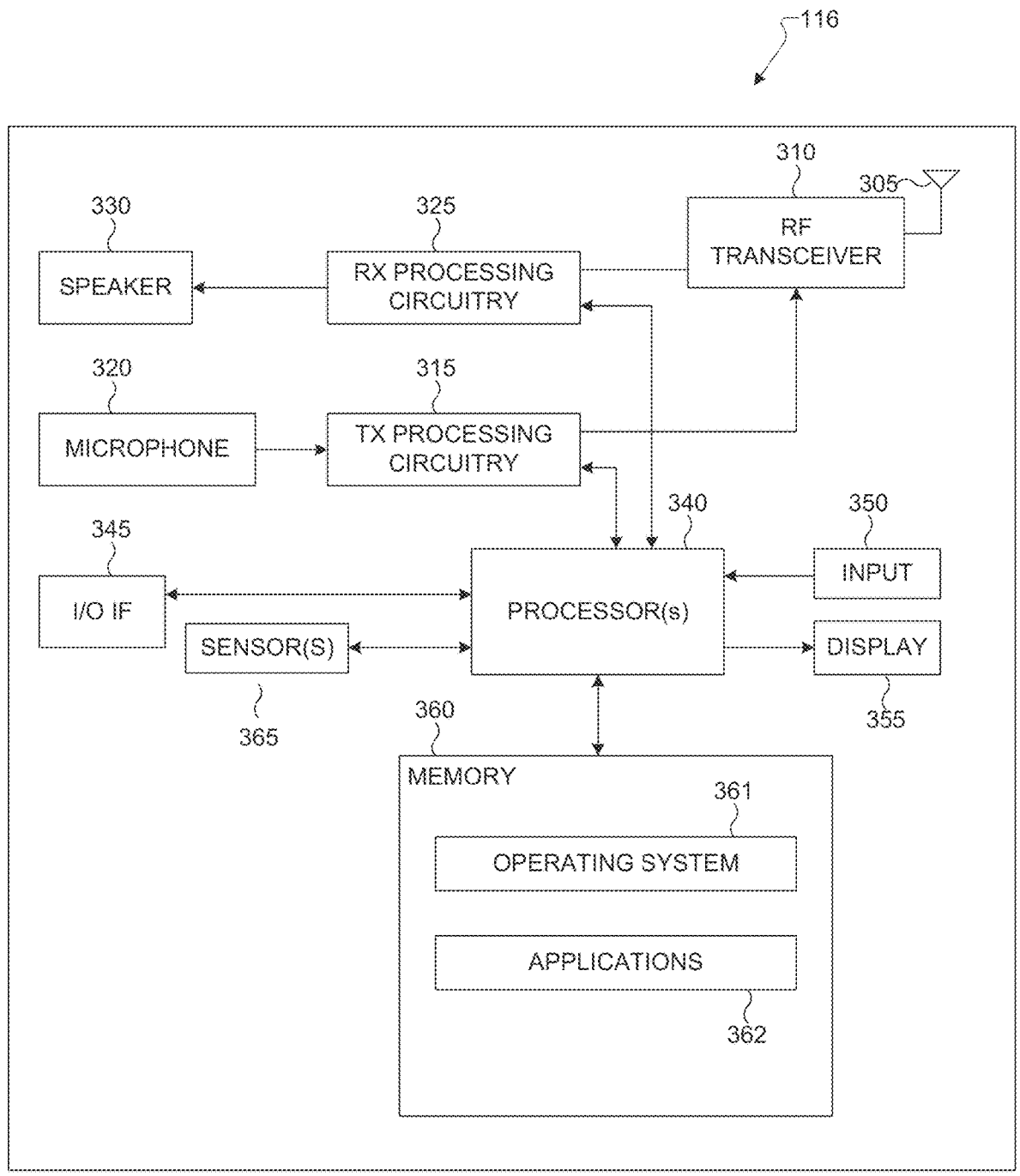
FIG. 3 illustrates an example user equipment (UE) according to this disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna array(s) 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, input 350, a display 355, a memory 360, and sensor(s) 365. The memory 360 includes an operating system (OS) 361 and one or more applications 362.

The RF transceiver 310 receives, from the antenna array(s) 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna array(s) 305.

The processor 340 can include one or more processors or other processing devices and execute the OS 361 stored in the memory 360 in order to control the overall operation of the UE 116. For example, the processor 340 may control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355. The operator of the UE 116 can use the input 350 to enter data into the UE 116. The input 350 can be a keyboard, touchscreen, mouse, track ball, voice input, or other device capable of acting as a user interface to allow a user in interact with the UE 116. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 may be a liquid crystal display, light emitting diode display, or other display capable of rendering text and/or at least limited graphics, such as from web sites, videos, games, images, and the like. The display 255 can be sized to fit within an HMD. The display 355 can be a singular display screen or multiple display screens capable of creating a stereoscopic display. In certain embodiments, the display 255 is a heads-up display (HUD).

The memory 360 is coupled to the processor 340. Part of the memory 360 could include a random-access memory (RAM), and another part of the memory 360 could include a Flash memory or other read-only memory (ROM). The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can sensitive and confidential information, which require user authentication prior to accessing.

UE 116 may further include one or more sensors 365 that can meter a physical quantity or detect an activation state of the UE 116 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein. Any of these sensor(s) 365 may be located within UE 116, within a secondary device operably connected to UE 116, within a headset configured to hold the UE 116, or in a singular device where UE 116 includes a headset.

As described in more detail below, some approaches rules may be computed based on a value of a CM parameter after it was changed, and/or by extending basic rules using rule mine techniques.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Systems and methods that provide a framework for automated network monitoring and control of a configuration management system are disclosed herein. The framework may include an interface and signaling between the AI engine and the SON controller to facilitate automated anomaly detection, root-cause analysis, and control. The framework may also include an interface and signaling between an AI engine and a user client device for displaying analytics data and for manual/user control of the system.

Figure 4:
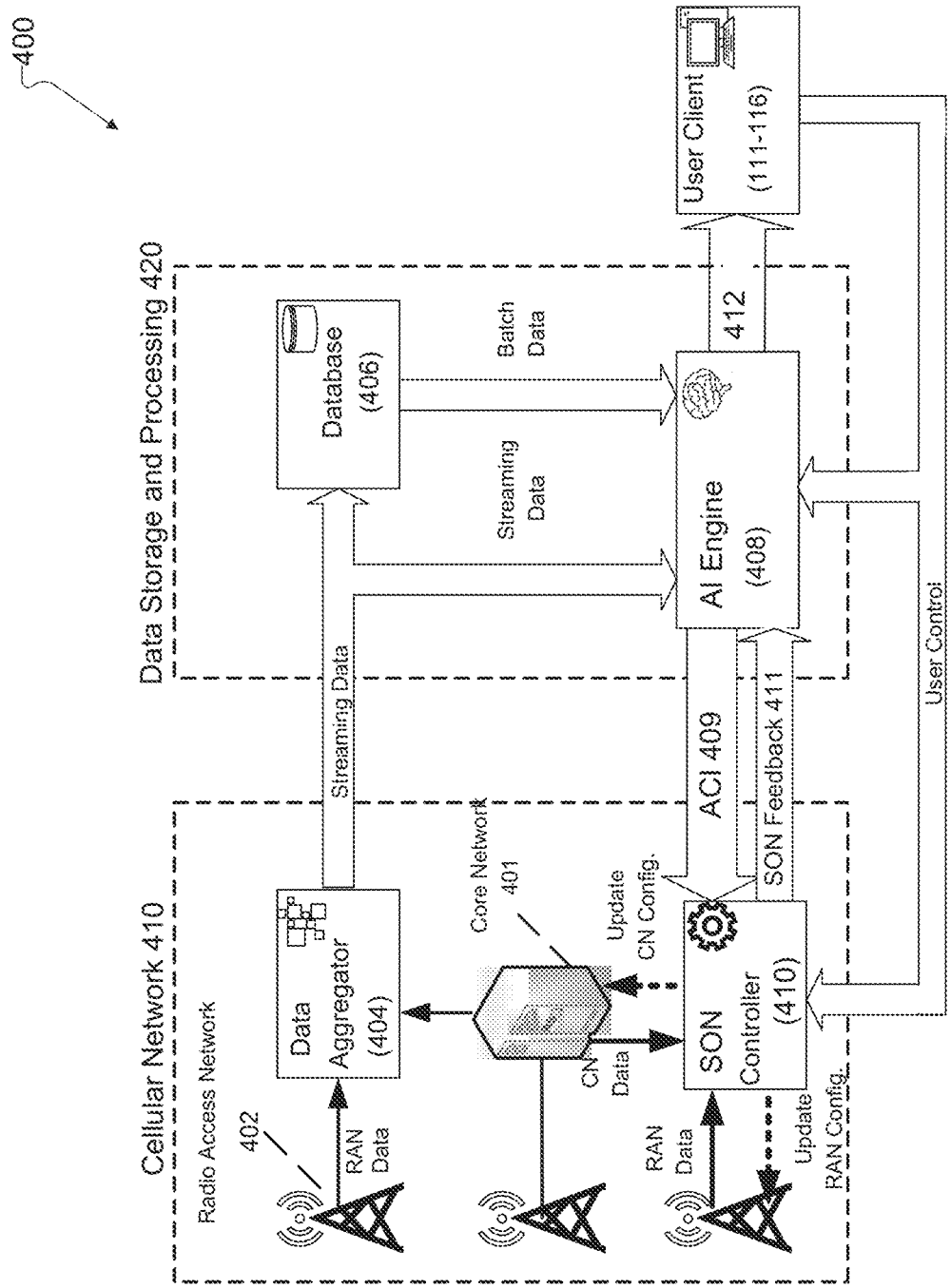
FIG. 4 illustrates a high-level architecture for an AI-based CM system according to this disclosure.

FIG. 4 illustrates a high-level architecture of an AI-based CM system (CM system) 400 according to this disclosure. CM system 400 may be implemented on one or more servers, workstations, or other suitable electronic device, which include the same or similar electronic components as UE 116. The source of data for the CM system 400 is the cellular network infrastructure, including the core network (CN) 401 and Radio Access Network (RAN) 402. RAN data may include measurements, metrics and other data collected from base station (e.g. 101-103) and UE devices (e.g. 111-116). Data from core network 401 and RAN 402 may be collected and aggregated at one or more intermediate nodes 404, which may be referred to as data aggregators 404, element management systems (EMS) 404, or LTE management systems (LMS) 404 herein. The data aggregator(s) 404 may store the aggregated data for retrieval by operations engineers and/or various systems, such as the automated CM system described in this disclosure. The data aggregators 404 may also transmit the aggregated data to one or more devices and/or other intermediate nodes 404. The aggregated data may include PM data such as KQIs/KPIs, counters, metrics, which may be in the form of structured time series data or as unstructured data, such as log files. FM data may also be provided. FM data may include alarm events indicating that an abnormal condition has occurred in the network, such as a device failure or an error state of a device.

Network data from the data aggregator 404 may be transferred and stored in a database 406. CM data, such as configuration parameters and values of various network devices, may also be stored at the data aggregator/EMS 404 or database 406. The CM data may include records of all CM changes that have been made historically, which may be referred to as a CM change log herein. Batches of historical data can then be retrieved from the database 406 by an AI engine 408, which processes the data to provide various network analytics and inference capabilities. Data may also be streamed directly from the RAN 402 and/or core network 401, or data aggregator 404 to the AI engine 408 for online/real-time processing. Further details on the functions of the AI engine 408 are provided later in this disclosure.

An AI engine 408 may perform computations on the input data and produce analytics and control information (ACI) 409, which may then be sent to one or more SON controllers 410. Note that the AI engine 408, along with the SON controller 410 may be hosted at a datacenter or local central office near the RAN 402 or may be collocated with a base station (e.g. 101-103). SON controllers 410 may use the information (such as rules, anomalies, etc., detailed below) from the ACI 409 of the AI engine 408 to automatically perform actions on the network such as updating the configuration of one or more network elements. The AI engine 408 may also specify which devices or variables are of interest for the SON controller 410 to monitor in the ACI messages 409. This may provide for more efficient operations as the SON controller 410 may be configured to only monitor a subset of network devices and data variables, instead of all possible variables. SON controllers 410 may also provide feedback messages 411 to the AI engine 408 regarding the state of the monitored devices and variables. In this way, the AI engine 408 can quickly adapt to changing network conditions and provide updated ACI 409 to the SON controllers 410.

Additionally, analytics information/results 412, generated by the AI engine 408, may be transmitted to a user client device (e.g. UEs 111-116), for analysis by a human engineer in user client information (UCI) messages. For simplification, the client device will be referred to as client device 116. The client device 116 may display the analytics results 412 in a user interface.

The user interface may include data tables, plots, and other visualizations of the PM/CM/FM data, as well as anomalies or faults that have been detected. The user interface may also include a root cause analysis of the faults, as well as any CM parameters that may be correlated with the results. Additionally, the user interface may accept commands from the user, which may be sent to the SON controller 410, or directly to the network elements, to perform an action, such as a configuration update. Commands or feedback may also be sent by a user to the AI engine 408. Commands or feedback sent from a user may be used by the AI engine 408 to adjust its analysis results. For example, by re-training one or more ML algorithms. For example, a user may label certain data points as being anomalies, potential anomalies, or not anomalies. In another example, a user may provide feedback to the AI engine 408 indicating the root cause of certain anomaly events, or whether the automatic RCA diagnosis from the AI engine 408 was correct. The AI engine 408 may then re-train the anomaly detection (AD) and/or RCA machine learning (described further below) and/or other algorithms to account for the user input.

Figure 5:
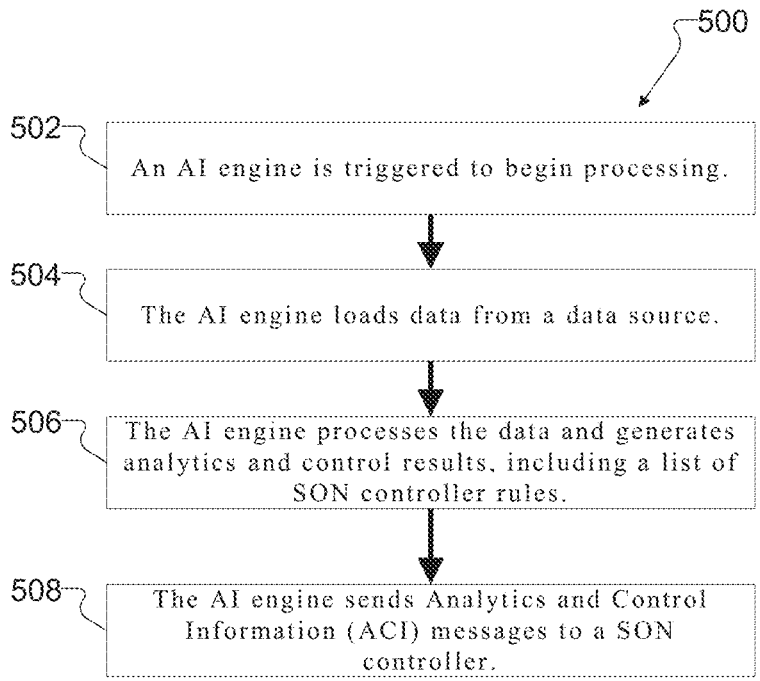
FIG. 5 illustrates a simplified process for processing network data and generating/sending ACI messages according to this disclosure.

FIG. 5 illustrates an example process 500 for processing network data and generating/sending ACI messages according to this disclosure. The AI engine 408 may be triggered (e.g. periodically by a timer or aperiodically, by the arrival of new network data, by a command from the user client, or by some other event) to begin processing network data in operation 502. In operation 504, the appropriate network data is loaded into the AI engine 408. In operation 506, the AI engine 408 may perform various data preprocessing steps and computations by one or more machine learning algorithms, such as those described later in this disclosure. In operation 508, the AI engine generates ACI messages containing the results of the computation in 506 and may send the ACIs to one or more SON controllers.

Figure 6:
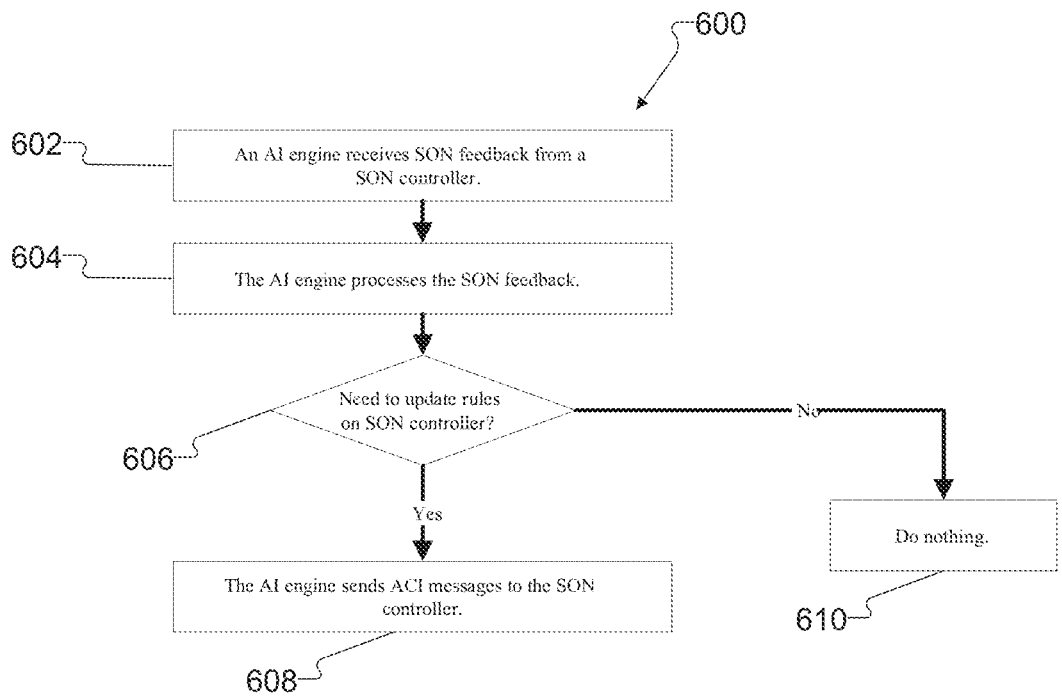
FIG. 6 illustrates an example process for receiving SON feedback messages 411 from a SON controller and generating/sending update ACI messages according to this disclosure.

FIG. 6 illustrates an example process 600 for receiving SON feedback messages 411 from a SON controller and generating/sending update ACI messages according to this disclosure. In operation 602, an AI engine 408 may receive feedback messages 411 from a SON controller 410. Details of example content that may be included in the SON feedback messages 411 are provided further below. In operation 604, the AI engine 408 processes the SON feedback messages 411. In operation 606, the AI engine 408 determines if there are any updated results. For example, the AI engine 408 may determine whether there are state/action rule updates that need to be sent to one or more SON controllers 410. If no updates are needed, the procedure terminates in 610. Otherwise, the AI engine 408 may send ACI messages 409 with the updated analytics and control information results to one or more SON controllers 410.

Figure 7:
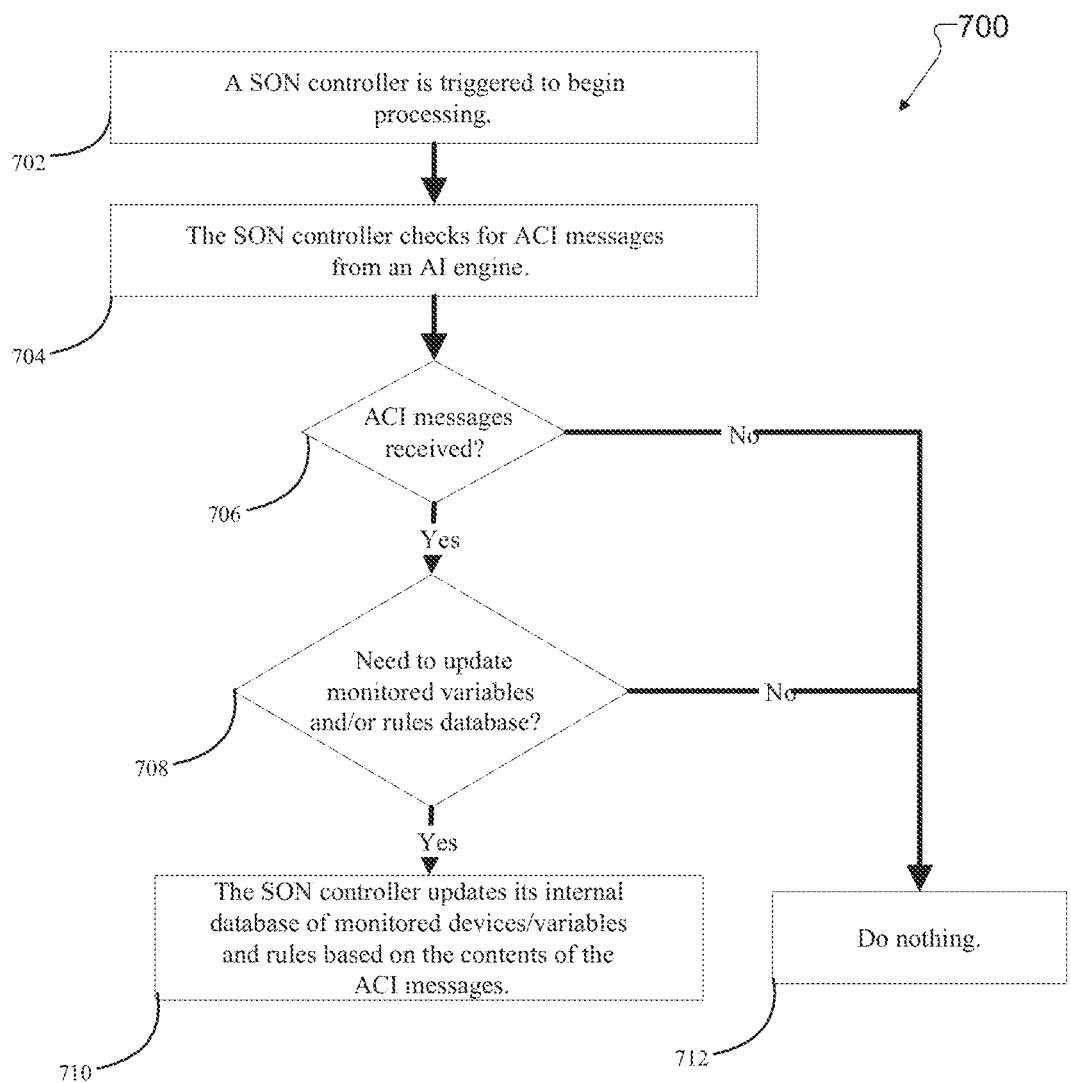
FIG. 7 illustrates an example process for receiving information from ACI messages, checking for matching rules, and executing self-healing actions, according to this disclosure.

FIG. 7 illustrates an example process 700 for receiving information from ACI messages 409 of an AI engine 408, checking for matching rules, and executing self-healing actions, according to this disclosure. In operation 702, a SON controller 410 may be triggered (periodically by a timer or aperiodically, by the arrival of new network data, ACI messages 409 or other control messages from an AI engine or user client, or by some other event) to begin the procedure. In operation 704, the SON controller may check for any incoming ACI messages 409 from the AI engine 408. If messages are received, the SON controller may check whether the set of monitored devices/data variables or the set of state/action rules should be or needs to be updated in operation 708. If no messages are received, or if no monitored variables or state/action rules need to be updated, the procedure terminates in operation 712. Otherwise, in operation 710, the SON controller 480 updates the database 406 (or other data store) of monitored variables and state/action rules.

Figure 8:
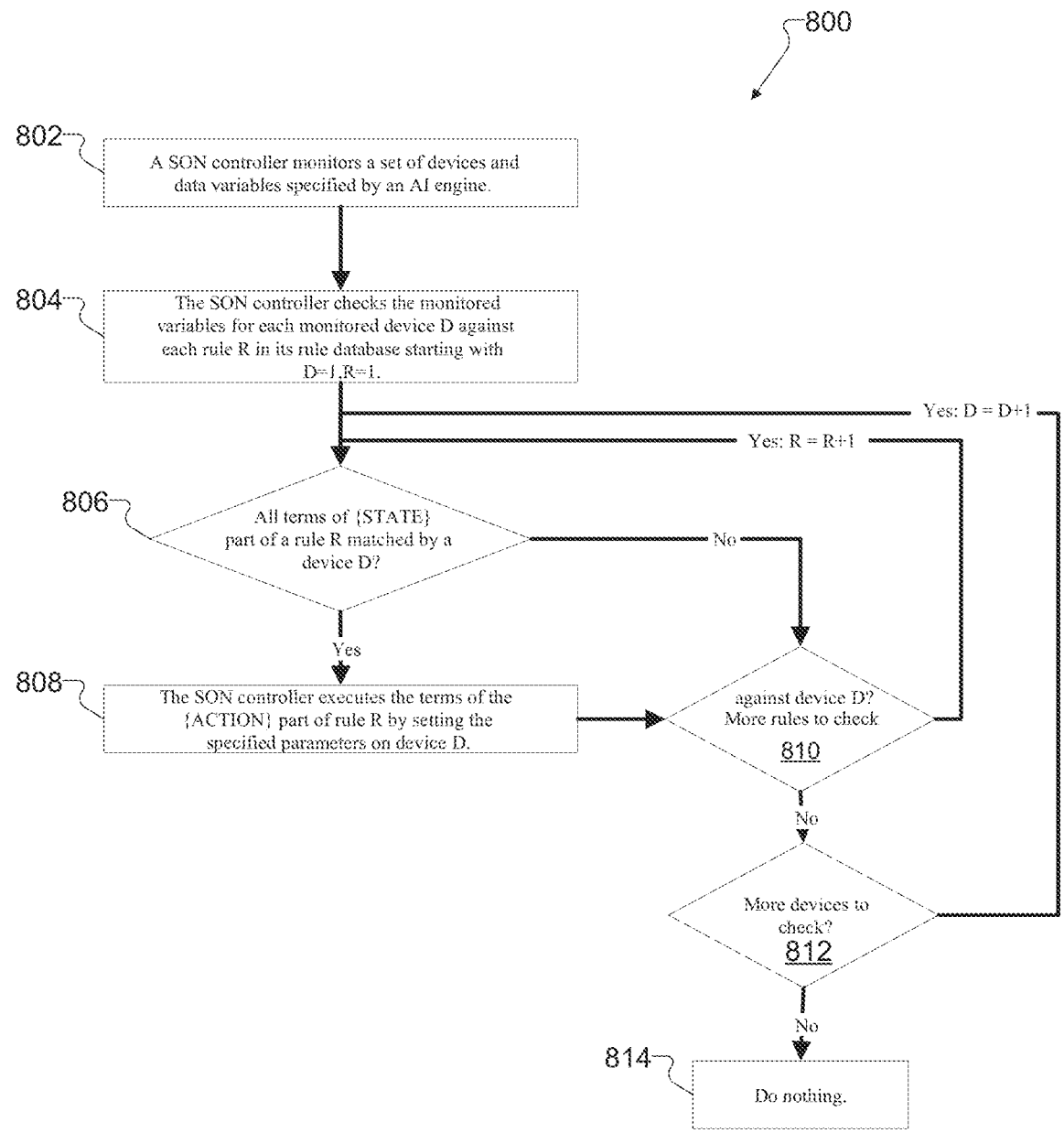
FIG. 8 illustrates a process for matching state and/or action rules, and executing related actions according to this disclosure.

FIG. 8 illustrates a process 800 for matching state and/or action rules and executing related actions in accordance with this disclosure. A SON controller 410 may monitor the set of devices and variables specified by the AI engine 408 in operation 802. In operation 804, the SON controller 410 begins checking the monitored variables reported by each monitored device against a set of state/action rules, starting with device D=1 and rule R=1. In operation 806, the SON controller 410 may determine if every one of the Boolean expressions in the {STATE} term of rule R evaluate to "true". If all the Boolean expressions are "true," the rule is matched for that device, and the SON controller 410 executes the {ACTION} of the corresponding rule on device D in operation 808. If the rule is not matched, the next rule is evaluated in operation 810. Note that different sets of variables and rules may be monitored for different devices, as may be specified by the AI engine 408 in the ACI messages 490, or in any other suitable way. If all rules specified for device D are evaluated, in operation 812, the SON controller 410 begins evaluating the rules for the next device. Finally, if all rules are evaluated for all devices, the procedure terminates in 814.

Analytics and Control Information (ACI) Messages.

Several examples of information that may be included in ACI messages 409 that are sent from an AI engine 408 to a SON controller 410 are provided below. These examples are provided for explanatory purpose and do not limit the scope of this disclosure in any way.

ACI messages 409 may include rules for updating the configuration of network elements, commands to update the configuration of one or more network elements based on decisions made by the AI engine 408, an indication of data variables of one or more network devices to begin monitoring by a SON controller 410, and the priority of certain rules or actions.

Rules for updating the configuration of network elements are referred to herein as state/action rules. For example, a state/action rule may be defined to set one or more configuration parameters to a specific value at a base station, a cell of a base station, or other network element(s) based on the state of the network element(s). The state of a network element may be determined by various variables, such as KPIs, metrics, log events or alarms, and/or CM parameters. The variables may then be mapped to one or more actions by a SON controller 410 based on the applied rule. The state variables and mapping to actions may be defined in the ACI message 409 content as a {STATE}→{ACTION} statement, such as in the following example equation:

$$\{KPI_1 \in [K_{1,low}, K_{1,high}], KPI_2 < K_{2,high}, \ldots, \\ ALARM_1 = A_1, \ldots, PARAM_1 = P_1, \\ PARAM_2 \in \{P_2^1, P_2^2, P_2^3\}, PARAM_3 \neq \\ P_3, \ldots\} \rightarrow \{PARAM_3 \rightarrow P_3, PARAM_4 \rightarrow P_4\} \quad (1)$$

In Equation (1) above, the left-hand side; i.e., {STATE} expression, is composed by one or more individual Boolean expressions {$EXPR_1$, $EXPR_2$, ... }, which specify the matching conditions of one or more PM, FM, and CM state variables. If the conditions specified in the left-hand side of the rule are matched by the data variables reported by a network device, then the action terms specified in the right hand side {ACTION} expression are performed on the device by a SON controller 410 or similar. Each $KPI_k \in [K_{k,low}, K_{k,high}]$ term denotes a range for a specific KPI or PM counter that is reported by a BS or other network device. In the example above, if the reported KPI/counter is found to be within a specified threshold range (between $K_{k,low}$ and $K_{k,high}$), then the individual STATE term is matched. Similarly, if a reported alarm code $ALARM_a$ is found to match the value $A_a$, and/or a parameter setting $PARAM_p$ has the value $P_p$, or equals one of the values in a set $\{P_p^1, P_p^2, \ldots\}$, then the corresponding STATE term is matched. For each term of the STATE expression, the negation of the abovementioned expressions may be used to specify that a state variable is not equal to a specific value or is not in a specified range or set of values (e.g., $KPI_k \notin [K_{k,low}, K_{k,high}]$ or $PARAM_p \neq P_p$). If all of the Boolean terms of the {STATE} are matched (that is, if the logical AND operation of all terms is true), then the {ACTION} terms are executed by setting the parameters in the action to the specified values ($PARAM_3 \rightarrow P_3$, $PARAM_4 \rightarrow P_4$ in the above example).

The following is a simple example of a rule statement.

{HoTriggeringScellRsrpEventA3Avg<−90 dBm,
   TooLateHoRlfBeforeTriggering>10}→
   {Hystersis'→(Hystersis−1 dB)}

In the example rule statement above, the AI engine 408 may determine that a high too-late handover failure rate (indicated by TooLateHoRlfBeforeTriggering counter exceeding an acceptable rate), combined with the average RSRP reported at the time of the A3 measurement event (indicated by the HoTriggeringScellRsrpEventA3Avg counter) being in a low range, should trigger an action to decrease the hysteresis margin parameter by 1 dB at any cells that match the aforementioned criteria, so that the A3 event is evaluated earlier in the handover procedure. The AI engine may programmatically determine this action using a machine learning algorithm, or the rule may be specified by an engineer through the user client interface. The SON controller 410 may receive this ACI message 411 and store it in a database (e.g. database 406) of rules. Then, when data reported by a base station matches the criteria of the rule, the SON controller 410 may execute the action by, for example, setting the hysteresis to the previous value of the hysteresis (for that cell) and decreased by 1 dB.

Alternatively, rules may take the form of a state-action look-up table, such as Table 2 below:

TABLE 2

Example State-Action Table

| Index | STATE | | ACTION | |
|---|---|---|---|---|
| | $KPI_1$ | $KPI_2$ | $PARAM_1$ | |
| 1 | | | | |
| 2 | $[K_{1,low}^1, K_{1,high}^1]$ | $[K_{2,low}^1, K_{2,high}^1]$ | $P_1^1$ | $PARAM_2 \rightarrow P_2^1$ |
| 3 | $[K_{1,low}^2, K_{1,high}^2]$ | $[K_{2,low}^2, K_{2,high}^2]$ | $P_1^2$ | $PARAM_2 \rightarrow P_2^2$ |
| 4 | $[K_{1,low}^3, K_{1,high}^3]$ | $[K_{2,low}^3, K_{2,high}^3]$ | $P_1^3$ | $PARAM_2 \rightarrow P_2^3$ |

In Table 2, each row specifies different values and/or threshold ranges for each PM counter $KPI_k$, parameter $PARAM_p$, alarm (not shown in the table), etc., as shown in the corresponding column headers. If the data variables meet the criteria specified by that row, the action specified in in ACTION column may be performed by the SON controller 410.

State/action rules may have additional information or characteristics. For example, state/action rules may have the following additional information or characteristics:

A unique rule ID or index. Each variable name in the {STATE} or {ACTION} expressions can be stored in a database of variable names on the SON controller 410 or an external database, along with a unique variable ID. The variables in each state/action rule may be specified by their ID in the ACI messages, which could reduce messaging overhead.

State/action rules may include the number of times the action of a state/action rule may be executed for a specific network device.

State/action rules may include the time duration in between successive instances of evaluating a rule by the SON controller 410.

State/action rules may include the probability of evaluating a specific state/action rule, which may determine how frequently a rule is evaluated when the rule evaluation is triggered. In some embodiments, an AI engine 408 may generate multiple rules with the same STATE expression but assign different probabilities. When triggered to evaluate rules, as in FIG. 8 described above, one rule out of the set of rules with the same STATE expression may be randomly selected with the assigned probability, and the action performed accordingly by the SON controller. This lends to the reinforcement learning framework described later in this document.

The State/action rules (in either string format as above, table format such as in Table 2, or any other suitable form), may be transmitted in several ways. For example, the rules may be transmitted as an ACI message(s) 409, as binary-encoded data or as a string (e.g. JSON) or in a comma-separated value (CSV) format. The data in the ACI messages 409 may also be encrypted and/or compressed.

As stated above, ACI messages 409 may also include commands to update the configuration of one or more network elements based on decisions made by the AI engine 408 directly. Such commands may be considered a form of state/action rule and can also be expressed as {STATE}→{ACTION} statements, but with the {STATE} expression always evaluating to "true". The number of times the command may be executed for a specific network device may also be specified in the ACI (or default to 1), as well as the time duration between successive evaluations of the command.

In addition to rules for updating the configuration of network elements and commands to update the configuration of one or more network elements based on decisions made by the AI engine 408, ACI messages 409 may also include an indication of data variables of one or more network devices for a SON controller 410 to begin monitoring. For example, if an AI engine 408 detects that the throughput of a cell drops below a threshold, the AI engine 408 may indicate that an anomaly has occurred at the cell experiencing a drop in below threshold. The AI engine 408 may also send an ACI message 409 to a SON controller 410, directing the SON controller 410 to start monitoring specific variables (e.g. KPIs, counters, alarms, etc.). The monitored variables from the network may be used by the SON controller 410 to determine if any {STATE}→{ACTION} rules are matched, as described above. This may help reduce the set of cells/devices or data variables for the SON controller 410 to monitor and provide for a more efficient operation. A subset of the monitored devices and variables may also be specified as data that may be reported back to the AI engine 408 by the SON controller 410 in SON feedback 411 messages.

The priority of certain rules or actions (or an indication relating to the priority of certain rules and/or actions) as described above may also be included in ACI messages 409 sent from AI engine 408 to a SON controller 410. The SON controller 410 may need to prioritize different operations and actions if, for example, the SON controller 410 has limited computational resources, needs to serve many network devices, and/or monitor a large volume of data.

SON Feedback Messages.

The SON client (e.g. client device/UE 116) may send a variety of feedback messages 411 to the AI engine 408. Several examples of information that may be included in feedback messages 411 are provided below. These examples are provided for explanatory purpose and do not limit the scope of this disclosure in any way.

The feedback messages 411 may include information relating to one or more of a set of monitored data variables from one or more devices, a set of anomaly points and/or events detected in the monitored data variables, a set of state/action rules or rule IDs/indices that were matched by one or more devices.

The client device 116 may send feedback messages 411 that includes information relating to a set of monitored PM, FM, CM, log, or other data variables from one or more network devices. Samples (data points) of the data variables may be aggregated by averaging, summing, or computing some other function of the raw data samples. Time series data, for example, may be "resampled" by averaging the data over a time window, before reporting to the AI engine. The time window may be longer than the measurement period for the time series data sample, the device(s) and/or variable IDs may be included in the feedback message 411.

The feedback messages 411 may include information relating to a set of anomaly points and/or events detected in monitored data variables. Anomalies may be computed by several methods. For example, the methods described with respect to FIGS. 10 and 11. Feedback messages 411 may also specify other information. For example, feedback messages 411 may specify the device(s) and/or variable IDs associated with the anomaly points/events, a severity score, and/or a confidence value. A severity score may be an integer or a floating point value that represents the severity of the detected anomaly point/event. A confidence value indicates the confidence of the algorithm that the indicated root cause category is the true root cause, based on the available data.

Feedback message 411 may include a set of state/action rules or rule IDs/indices that were matched by one or more network devices. The device ID and variable IDs corresponding to the matched rule, the number of times the rule was matched, and/or the timestamps at which the rule was matched, as the timestamps may correspond to the timestamps of the data variables in the rule {STATE} terms.

User client information (UCI) messages from the AI engine 408 to one or more user clients/client devices 116 may include, but are not limited to, a set of anomalies detected in the data variables by the AI engine 408, root cause analysis results, or a root cause indication.

UCI messages may include a set of anomalies detected in the data variables by the AI engine 408. The AD system, described in detail below, may determine that a network device is functioning abnormally based on the PM/FM/CM/log data. The AI engine 408 may indicate to the user client the identifiers (e.g. eNB and cell ID) of the abnormal devices, along with the specific KPIs or other data variables that were found to be abnormal and the timestamps of when the abnormal performance occurred and/or was detected.

Some examples of information that may be provided along with the detected anomalies are provided below.

UCI messages may include a timestamp or time range information. A timestamp or time range information at which a network device, or one or more data variable of a network device, was detected to be abnormal is referred to as an anomaly point. One or more anomaly points can be grouped into an anomaly event. Anomaly events may be inferred by the AI engine to be attributed to the same underlying cause (e.g. a fault or an abnormal event).

A metric which indicates the confidence of the algorithm that a specific anomaly point or event represents a true abnormal behavior in the network may also be included in UCI messages. The AD algorithm may output a confidence value to indicate the expected accuracy of the algorithm outputting a true detection for the indicated anomaly point/event.

UCI messages may include an anomaly severity score, which can be an integer or floating point value that represents the severity of the detected anomaly point/event.

Anomaly points/events can be associated with a single network device such as a cell, or a set of devices. For instance, anomaly events that affect multiple neighboring cells in the network may be detected. For example, a failure at a primary cell might cause several users to attach to a secondary neighboring cell, causing an excessively high load on the neighbor cell; thus, potentially reducing throughput for that cell's users. In this example, the anomaly event may be reported to the user client for the primary cell as well as all affected neighbor cells. The set of anomaly points may be specified in the UCI message as a list of devices and data variables. The set of anomaly points may be encoded in a string (e.g. JSON) or binary format.

Root cause analysis results may provide additional analysis of the abnormal network behavior to the user client, or to an output log, another system, etc. The AI engine 408, after performing automated RCA (described below), may provide analytics such as root cause category codes, root cause systems, recommended actions, a confidence score, a severity score, a root cause indication, and/or any other applicable analytics.

Root cause category codes are labels that indicate the type of fault, failure or abnormal condition that is identified by the AI engine 408. Some examples of root cause categories or codes and their descriptions are shown in Table 3 below. Multiple root cause codes can be associated with a single anomaly point or anomaly event.

Root cause symptoms may be associated with a given root cause category and code. Root cause symptoms may be a set of PM/FM/CM/log data variables and the values or range of values of those variables that are related to a particular root cause category. Example systems for some example root cause categories are shown in Table 3. The symptoms and their value ranges may be specified in a similar format as the {STATE} expression in the {STATE}→{ACTION} rules described in the ACI messages 409 discussion above.

Recommended actions for each root cause category may also be determined by the AI engine 408, and output or transmitted to the user, UE 116, another program, etc. For example, for the HIGH_DOWNTILT root cause in Table 3, the recommended action may be to reduce the antenna tilt angle to potentially improve coverage for UEs that farther from the transmitter. A recommended value or range of values for one or more CM parameters may also be provided in the UCI message(s).

A confidence score, indicating the confidence of the algorithm that the indicated root cause category is the true root cause, based on the available data.

A severity score, indicating the severity of the failure or event for the given root cause category.

A root cause indication can be associated with multiple network devices and/or anomaly events. Information may be provided in the UCI on which devices were the primary source of the anomaly event and other secondary devices, which were impacted by the event associated with the root cause category. A list of primary and secondary devices may thus be included along with each of the abovementioned fields (root cause codes, symptoms, recommended actions and confidence/severity score) for each element of the list.

TABLE 3

Example root cause categories and descriptions

| RCA Category Code | Explanation | Example Symptoms (effects) |
| --- | --- | --- |
| UL_COVERAGE | Degraded uplink (coverage hole) | Large proportion of users transmitting with max power<br>High usage of uplink MCS <= 5 (QPSK with low coding rate)<br>Lack of scheduling of uplink traffic |
| UL_RFI | Degraded uplink (RF interference) | High Uplink RSSI & Interference power<br>High usage of uplink MCS <= 5 (QPSK with low coding rate)<br>Lack of scheduling of uplink traffic |
| DL_RFI | Degraded downlink (RF interference) | Reported Downlink Channel Quality <4<br>High usage of uplink MCS <= 5 (QPSK with low coding rate)<br>Lack of scheduling of uplink traffic |
| HIGH_BLER | Degraded H-ARQ Block Error Rates | Uplink H-ARQ Block Error Rate >50%<br>Downlink H-ARQ Block Error Rate >50% |
| UL_LOW_TRAFFIC | Low uplink traffic demand or cell not available | Uplink PRB utilization close to 0<br>Possible Availability KQI anomaly<br>Low traffic volume and few uplink active users |
| DL_LOW_TRAFFIC | Low downlink traffic demand or cell not available | Downlink PRB utilization close to 0<br>Possible Availability KQI anomaly<br>Low traffic volume and few downlink active users |

TABLE 3-continued

Example root cause categories and descriptions

| RCA Category Code | Explanation | Example Symptoms (effects) |
| --- | --- | --- |
| RF_HARDWARE_FAILURE | Failure with Remote Radio Head (RRH). | RRH failure alarms (e.g. RRH Voltage Low, RRH Function Fail, RSSI Imbalance) and cell availability = 0% |
| HIGH_DOWNTILT | Antenna tilt is not configured optimally, causing a coverage issue. | Coverage hole (large portion of users transmitting at high power and low MCS) and excessive antenna downtilt angle detected. |
| LOW_DOWNTILT | Antenna tilt is not configured optimally, causing high RFI to neighboring cells. | High Uplink RSSI & Interference power at neighboring cells combined with low antenna downtilt angle. |
| ANTENNA_AZIMUTH_CONFIG | Antenna azimuth angle is not configured optimally. | Coverage or interference issue due to improper configuration of antenna horizontal angle. |
| HANDOVER_CONFIG | Handover parameters not configured optimally. | High handover failure rate and radio link failures attributed to Too-Late, Too-Early, or Ping-Pong handover failures. Handover parameters such as hysteresis, time-to-trigger, and/or cell individual offset being set to unexpected values. |
| UL_POWER_CONTROL_CONF | UL power control parameters not configured optimally. | P0 parameter for PUCCH or PUSCH channels set too low, leading to low UL SINR or too high, leading to excessive UL interference. |
| CELL_SELECTION_CONF | Cell selection parameters not configured optimally. | Load imbalance between nearby cells. Parameters such as q-RXLevMin, cell reselection priority, thresh-High and/or threshX-Low set to unexpected values. |

CM-Related Anomaly Detection and Root Cause Analysis System.

Figure 9:
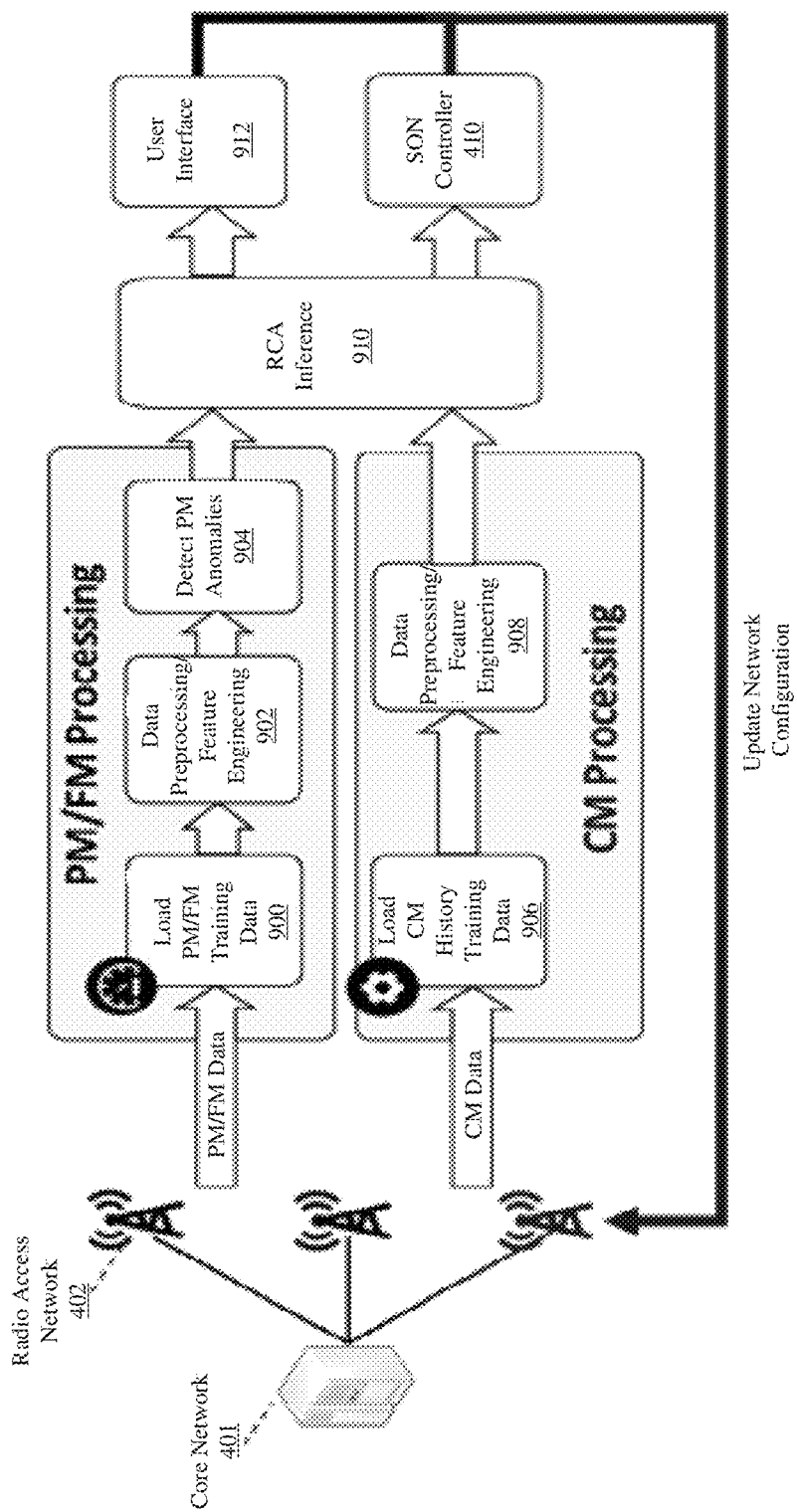
FIG. 9 illustrates an example architecture of the AD and RCA functions of the AI engine according to this disclosure.

FIG. 9 illustrates an example architecture of the AD and RCA functions of the AI engine 408 according to this disclosure. In operation 900, PM, FM and log data may be loaded into the RCA system. Batches of data may be retrieved from the data aggregator 404 or database 406. Data may also be streamed directly from the network to the AI engine 408, as previously described. The RCA system supports both offline batch processing and streaming directly from the network.

PM/FM data preprocessing operation 902 may include, for example, removing invalid data samples, normalizing or scaling the data, removing trends and seasonality in time-series data, generating additional synthetic features from the existing KPIs and other fields in the data, and selecting a subset of the data samples or fields that are needed for further processing. Fields, such as timestamps, may need to be converted to a format that conforms to or is understood by the expected format. Data may be grouped per each network device identifier. For example, data may be grouped by each cell, which may be uniquely identified by a network element ID, eNodeB/gNodeB ID, cell number or cNum, or by other standard identifiers, such as the LTE EUTRAN Cell Global Identifier (ECGI). The subsets of data for each network device may be processed independently and/or processed in parallel by a multi-processing or distributed computing system.

After the PM/FM data preprocessing operation 902 completes, the preprocessed PM/FM data may be passed to the anomaly detection operation 904. The anomaly detection system is described in later in this disclosure.

In the CM data operation 906, CM data is loaded from one or more of the aforementioned data sources (network devices, data aggregator(s), database(s), etc.). After the CM data is loaded, CM data preprocessing operation 908 may preprocess the CM data. The CM data preprocessing operation 908 may include the PM/FM preprocessing operation 902. The CM data preprocessing operation 908 may also include the extraction of fields that are specific to the CM data, modification of those data fields, and/or generation of synthetic fields. Synthetic data fields are the result of functions computed on the original or previously updated data fields. In the data preprocessing operations 902 and 908, data samples may be collated to merge the PM/FM/log and CM data into one combined data set. For example, by matching the eNodeB ID and cNum fields and the timestamp of entries in the PM/FM/log dataset with the CM dataset.

After the data preprocessing operations 902 and 908 are completed, the preprocessed network data and anomaly detection results may be transmitted or retrieved by RCA operation 910. For example, an RCA inference engine may receive the preprocessed network data and anomaly detection results. The RCA inference engine may execute various machine learning or other algorithms to process the data and provide relevant analytics. The output of the RCA inference engine may include data indicating which CM parameter changes may be correlated with performance degradation, performance improvement, or both. Additional analytics data may also be provided by the inference engine. For example, sets of parameters that are found to be correlated with a performance impact (either degradation or improvement) when they are changed together, i.e., when the parameter values are updated simultaneously on the same device or over a short duration of time.

The output result of the RCA inference engine may be formatted and displayed in a user interface 912 for a network operation engineer to examine and use for troubleshooting purposes. The RCA inference engine may also recommend actions, such as updating a configuration parameter that may improve performance or resolve a network fault or other abnormal event. As described above, the SON controller 410 may perform remediation or self-healing actions, which may be done programmatically and without the need for manual action by an engineer or other person. For example, if a handover time-to-trigger parameter is identified by the inference engine to be set to a high value, which is determined to be correlated with a high rate of handover failures (indicated by degradation in handover-related KPIs), then the parameter can be automatically set to a value which is correlated with an improved handover success rate.

PM Anomaly Detection.

The purpose of the anomaly detection procedure is to identify possible abnormal values in the reported KPIs (e.g., IP throughput or handover success rate) or other time-series data variables. Next, the AD results may be combined with CM, FM, and other data to further identify whether these abnormalities may be attributed to a previous configuration change.

Figures 10, 11:
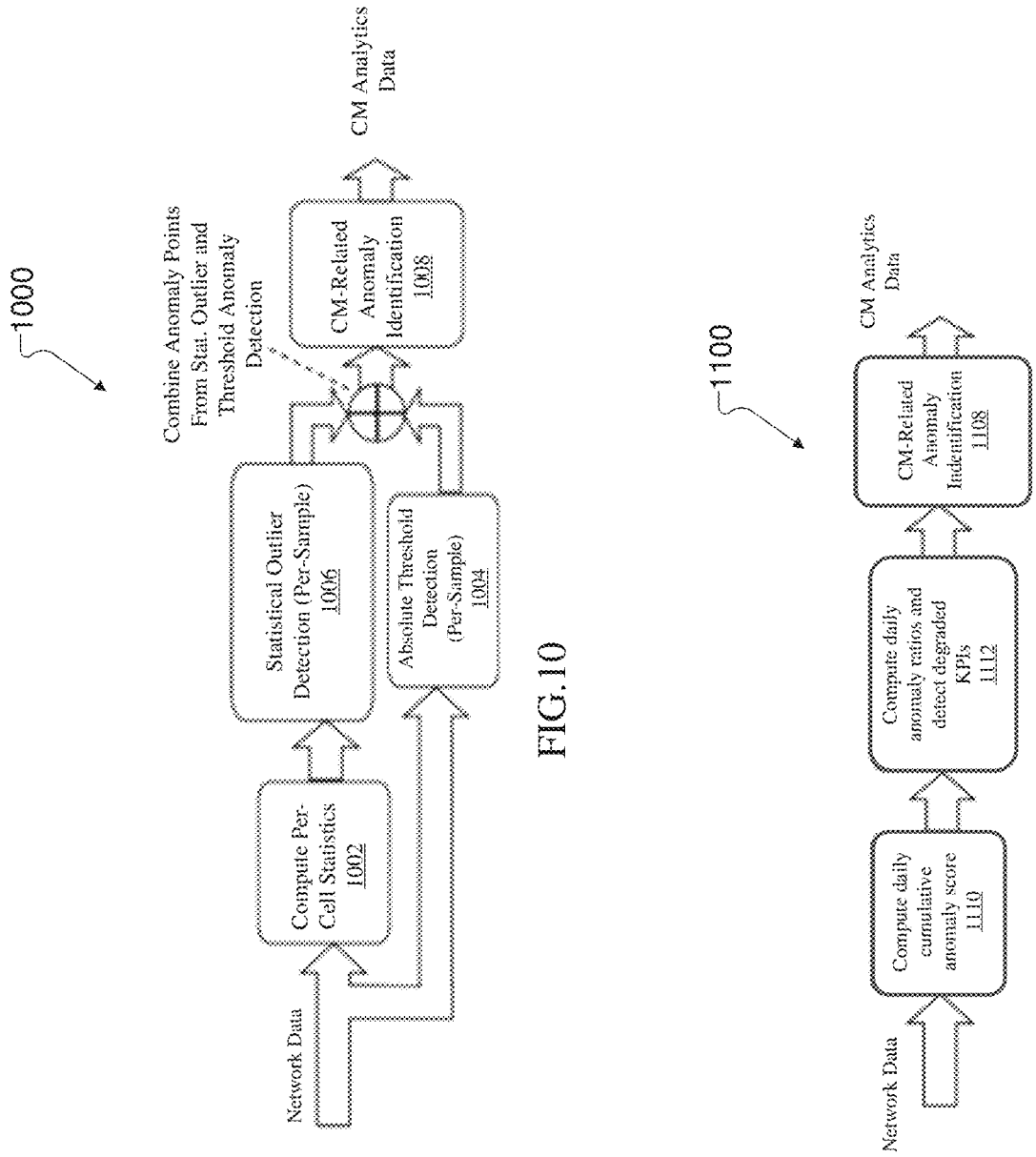
FIG. 10 illustrates an example embodiment of an anomaly detection pipeline operation according to this disclosure.
FIG. 11 illustrates an example embodiment of an anomaly detection pipeline operation according to this disclosure.

FIG. 10 illustrates an example embodiment of an anomaly detection pipeline operation 1000 according to this disclosure. In operation 1002, the data statistics per cell or per device may be computed for use in a statistical anomaly detection scheme operation 1004. For example, the sample summary statistics (mean, median and standard deviation) may be computed for a specific time-series variable for the device over the entire set of historical data for that variable, or over a subset of the data (for example, data from the past year or several months prior to the current date).

To account for the sample distribution varying as a function of repeating pattern(s) in time (i.e., seasonality), samples may first be grouped into bins based on whether the timestamp of the data sample corresponds to a specific time range. For example, samples may be binned based on the day of the week or some subsets of days in $\{0, \ldots, 6\}$, where 0=Monday and 6=Sunday. Samples may be binned based on whether they were sampled on a weekend day (Saturday/Sunday) vs. a weekday (Monday-Friday). Samples may also be grouped based on the time of day. For example, the hour of the day, or some subsets of hours in $\{0, \ldots, 23\}$. Samples may be grouped based on whether the data was sampled on a holiday or some other special day (for example, a day on which there was a sporting event), and so forth. Then, the sample summary statistics can be computed for each individual bin.

In the statistical anomaly detection scheme operation 1004, an anomaly detection technique may be applied to individual samples (a time series data points for KPIs or other features) to detect data samples, or groups of data samples, which deviate from the normal trends in the historical data. Several techniques may be used for identifying anomaly samples, such as statistical outlier detection. In statistical outlier detection, some function of the data sample value $x \in X$, where X denotes the variable itself, and the summary statistics of the time series data variable for the corresponding feature is computed to determine if a sample is an outlier or anomaly. As an example, the following Z-score scheme can be applied.

For a time-series variable X, the mean $\mu$=mean(X) and standard deviation $\sigma$=std(X) may be computed over the entire sample of X. Alternatively, the statistics may be computed for the individual day-of-week $d \in [0,6]$ and hour $h \in [0,23]$ bins. In this case, the mean and standard deviation would be expressed as $\mu_{d,h}$=mean($X_{d,h}$) and $\sigma_{d,h}$=std($X_{d,h}$), where $X_{d,h}$ represents the samples of X in which the hour and day of the timestamps equal d and h, respectively. Note that the median of X or $X_{d,h}$ may be used in place of the mean.

Next, for each time-series sample $x \in X_{d,h}$, the Z-score may be computed $$Z_{score}(x) = \frac{x - \mu_{d,h}}{\sigma_{d,h}}.$$

Lastly, declare a sample to be an anomaly point if MAD(x)>threshold. Otherwise, declare the sample as not an anomaly point. The threshold may be chosen based on several standard deviations away from the mean, which corresponds to some percentile of the data. For example, a threshold of 2 is equivalent to checking whether a sample is greater than the mean by $2\sigma$, which is equivalent to the 95th percentile of the data.

In the statistical anomaly detection scheme operation 1004, PM samples for a given device may be compared against one or more fixed thresholds that may be selected/configured based on human domain expertise to identify cases of consistently poor performance in cells. For example, a sample of the IP throughput KPIs may be declared to be an anomaly point if found to be lower than a 2 Mbps threshold, the accessibility rate KPI if lower than 90%, and so forth. The union of the anomaly points from both statistical and fixed threshold-based anomaly detection pipelines may then be combined and provided as input to the CM-related anomaly detection scheme in 1008.

In another embodiment, in operation 1002, the data can be further grouped based on whether the sample timestamps were before or after a CM parameter change for a given network device. This may be useful if a configuration change or changes to a device causes the distribution or trends in the data to change. That is, for a change to CM parameter p occurring at times $t_0$ at a device on the network, the PM time series X statistics for the same device may be computed for the sets $X_{before}=\{x | t_x < t_p, \forall x \in X\}$, and the set $X_{after}=\{x | t_x \geq t_p, \forall x \in X\}$, where $t_x$ is the timestamp of the time-series sample x.

FIG. 11 illustrates another example embodiment of an anomaly detection pipeline operation according to this disclosure. The example of FIG. 11 illustrates a ratio based anomaly score pipeline operation for anomaly detection. In operation 1110, the daily cumulative anomaly score is computed. After the daily score has been computed, operation 1112 may obtain or receive the daily cumulative anomaly score, compute daily anomaly ratios, and detect degraded KPIs. Operation 1008 functions the same way as described below with respect to FIG. 10.

Candidate CM-related Anomaly Detection.

In operation 1008, candidate CM-related anomaly detection may be performed by the AI engine 408 to identify anomaly events that coincide in time with one or more CM parameter changes.

Figure 12:
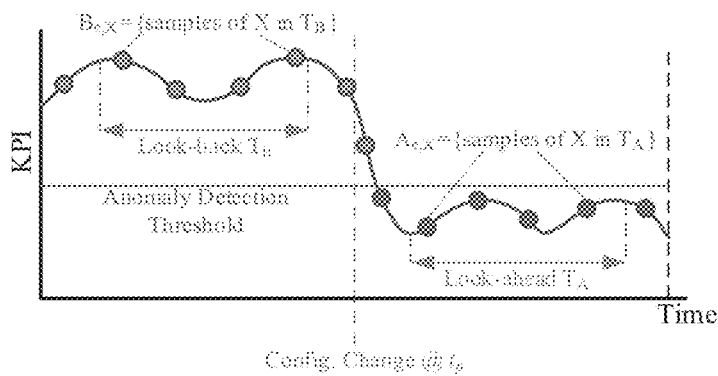
FIG. 12 illustrates an example of anomalies in look-back window and look-ahead window relative to a CM change at time of an anomaly detection pipeline operation according to this disclosure.

FIG. 12 illustrates an example of anomalies in look-back window $T_B$ and look-ahead window $T_A$ relative to a CM change at time $t_p$ of an anomaly detection pipeline operation (e.g. 1000, 1100) in accordance with this disclosure. The CM-related anomaly detection algorithm may find instances where a change of parameter p, applied at time instant $t_p$ to a device, is followed by one or more KPI/PM anomalies during the look-ahead window of $T_A(t_p)$ at the same device. The look-ahead window $T_A(t_p)$ is defined as a time after time instant $t_p$ of the CM parameter change. In some embodiments, the look-ahead window $T_A(t_p)$ time period includes time instant $t_p$ of the CM parameter change.

For example, operators may perform CM changes during a planned maintenance window or during low traffic times such as in the early morning (e.g., 12 a.m.-6 a.m.). Therefore, in this example, $T_A(t_p)$ spans the busy hours of 7 a.m. to 10 p.m. on the day of the CM change. It may be expected that if degradation occurs, an anomaly would be found during this time period when the network is more heavily loaded the day of or after the CM change. Formally, $T_A(t_p)=[t_p+\tau_{A-start}, t_p+\tau_{A-end}]$, where $\tau_{A-start}$ and $\tau_{A-end}$ are the start and end offsets of the look ahead window relative to $t_p$, and $T_B(t_p)=[t_p-\tau_{B-start}, t_p-\tau_{B-end}]$, where $\tau_{B-start}$ and $\tau_{B-end}$ are the start and end offsets of the look-back window relative to $t_p$. Note that the time instants $t_p$ may be discretized into intervals of time greater than the original resolution of time for CM change reporting, so that temporally co-occurring changes falling into the same interval can be grouped together. For instance, if the resolution of CM logging is 1 second, CM changes made within, for example, a 15-minute time interval may be considered as one time instant $t_p$.

The CM-related anomaly detection procedure then proceeds as follows for all $t_p$.

First, define $A_{c,X}(t_p)$ as the set of KPI x anomalies during $T_A(t_p)$ and $B_{c,X}(t_p)$ as the set of anomalies during $T_B(t_p)$ for a device c.

Next, compute the anomaly count ratio $$R_{c,X}(t_p) = \frac{\alpha |A_{c,X}(t_p)|}{|B_{c,X}(t_p)|}$$

as the ratio of the two anomaly sets, where |.| denotes the cardinality of the set. The scaling factor $\alpha$ may be used to scale the numerator in the ratio, in the case that the duration of $T_A(t_p)$ and $T_B(t_p)$ are not equal. That is, $$\alpha = \frac{\tau_{B-end} - \tau_{B-start}}{\tau_{A-end} - \tau_{A-start}}.$$

Next, check if $R_{c,X}(t_p) >$ threshold to determine whether the number of anomaly instances increased significantly after the CM change. For instance, a threshold of 2 may mean that the number of anomaly samples in the look-ahead window increased by 100% relative to the look-back window. Note that setting the threshold to infinity or some very large number would impose the constraint that zero PM anomaly points occur in the look-back window, while one or more PM anomaly points occur in the look-ahead window.

Next, label the anomalies in $B_{c,X}(t_p)$ as being part of a PM anomaly event at time $t_p$.

The set of anomaly event times for a given PM time series X and CM parameter p may be denoted as:

$$S_{c,X} = \{t_p | R_{c,X}(t_p) > \text{threshold}, \forall t_p \forall p \in P_c\}.$$

Note that in the above equation, the set $S_X$ includes parameter change times for all parameter changes at device c (denoted as the set $P_c$) and is thus not dependent on the type of parameter that was changed.

The inverse of ratio $$\frac{1}{R_{c,X}(t_p)} = \frac{|B_{c,X}(t_p)|}{|A_{c,X}(t_p)|}$$

may be substituted for $R_{c,X}(t_p)$ in the above procedure to detect instances of CM changes coinciding with performance improvement, as opposed to degradation.

PM Anomaly Detection and Candidate CM-related Anomaly Detection.

In another embodiment, instead of detecting anomalies with individual samples, a cumulative anomaly score, i.e., a measure of the aggregate KPI performance for a cell or other device, is computed over the look-back and look-ahead windows $T_B(t_p)$ and $T_A(t_p)$. Next, the ratio of the of the cumulative anomaly scores in the two ratios is computed and compared to a threshold value to check if a performance degradation or a performance improvement has occurred. The following general procedure may be performed for all parameter change times $t_p$.

For a PM time series X, define the sets of samples in the look-back and look-ahead windows $B_{c,X}(t_p)$ and $A_{c,X}(t_p)$ for device c, as discussed above.

For the samples x in both $B_{c,X}(t_p)$ and $A_{c,X}(t_p)$, compute the per-sample anomaly score function $f(x)$. Example per-sample anomaly score functions are given in Table 5.

Next, compute the cumulative anomaly scores $F_{p,X}^B$ and $F_{p,X}^A$ respective to the sets $B_{p,X}$ and $A_{p,X}$.

$$F_{c,X}^B(t_p) = \frac{1}{|B_{c,X}(t_p)|} \sum_{x \in B_{c,X}(t_p)} f(x)$$

$$F_{c,X}^A(t_p) = \frac{1}{|A_{c,X}(t_p)|} \sum_{x \in A_{c,X}(t_p)} f(x)$$

Note that, in the cumulative anomaly scores, a smaller score indicates an abnormal device performance, and a larger score is representative of normal operation.

Next, compute the anomaly score ratio $$R_{c,X}(t_p) = \frac{|F_{c,X}^B(L_p)|}{|F_{c,X}^A(L_p)|}.$$

Note that this relationship is the inverse of the previous example.

Next, check if $R_{c,X}(t_p) >$ threshold, where the threshold is greater than 1. A ratio that is much greater than 1 may indicate significant degradation in performance and that an anomaly event has occurred at around time $t_p$. Alternatively, to detect instances of performance improvement, the inverse ratio can be computed and checked to see if it is greater than a threshold.

Return the set of anomaly events for all parameter change times $S_{c,X}$ (defined above).

TABLE 4

Example PM anomaly score functions

| Score Type | Function | Description |
| --- | --- | --- |
| Mean | $f(x) = x$ | Results in cumulative score being the sample mean. |
| Logistic | $f(x) = \dfrac{1}{1 + \exp(-k(x - x_0))}$ | K controls slope of curve, $x_0$ controls when curve hits 0.5. Parameters selected for each PM counter/KPI. E.g.: IP Throughput: k = 2.5E−3, x0 = 2.5E3 Kbits/s Mobility: k = 0.95, x0 = 90% RRC Connection Drop Rate: k = 0.95, x0 = 95% |
| Normalized Mean | $f(x) = x/\mu$ | μ: mean of KQI. Mean can be computed for different day-of-week/hour bins, e.g. for each 3 hour bin, with separate bins for weekday or weekend. |
| Percentile | $f(x) = \begin{cases} 0, x \in [0, 10) \text{ \% ile} \\ 1, x \in [10, 25) \text{ \% ile} \\ 2, x \in [25, 100) \text{ \% ile} \end{cases}$ | Percentile numbers can be computed for different day-of-week/hour bins, e.g. for each 3 hour bin, with separate bins for weekday or weekend. |

PM Anomaly Detection and Candidate CM-related Anomaly Detection.

Figure 13:
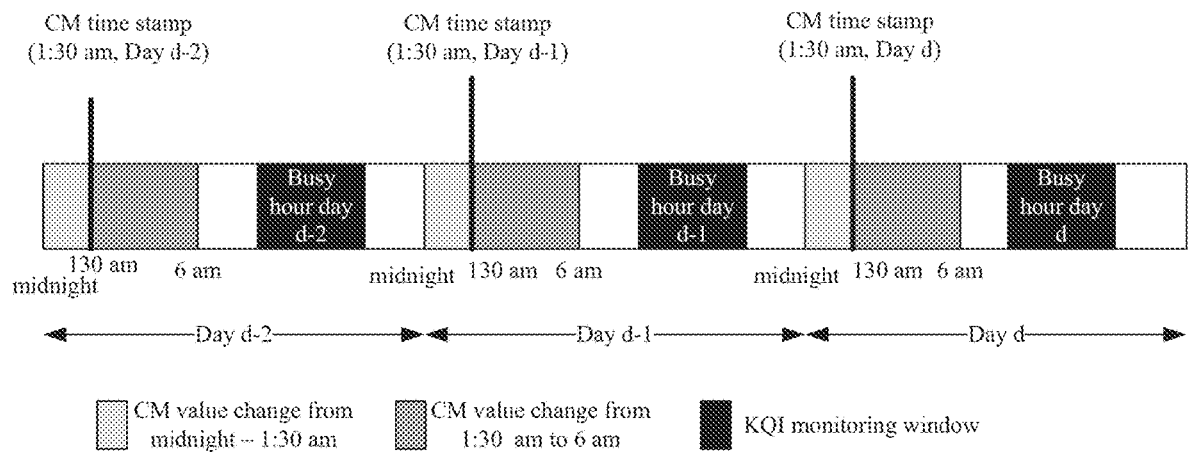
FIG. 13 illustrates an example of CM logging timestamps occurring inside a maintenance window and with actual change times unknown according to this disclosure.

FIG. 13 illustrates an example of CM logging timestamps occurring inside a maintenance window and with actual change times unknown according to this disclosure.

In yet another embodiment, an operator may wish to only apply CM changes during a regular maintenance window. For example, CM changes may be applied at any time during this window, and few to no changes may be applied outside the window. However, all CM changes from the previous day may be logged at a specific time during the maintenance window.

As an example, consider a maintenance window of 12:00 a.m. to 6:00 a.m. of each day d, as shown in FIG. 13. The actual time when the change was applied during this window is not recorded, only the time when the CM changes are logged is recorded. In this example, all CM changes from the previous logging time (1:30 a.m. of day d−1) to the current logging time (1:30 a.m. of d) are logged at 1:30 a.m. of each day d. Therefore, it is unknown whether CM changes were applied in the maintenance window of day d−1 in the hours 1:30 to 6 a.m. or during the maintenance window of d from 12 a.m. to 1:30 a.m.

This uncertainty in the CM change times may make correlation of CM changes with anomaly events challenging and any approach will be subject to measurement error. To address this issue, the PM anomaly detection and candidate CM related anomaly detection embodiment described above may be modified as follows.

First, d may indicate the day on which a CM change was logged at a specific time of day (e.g. 1:30 a.m. in the example of FIG. 13). For a PM time series X, define the $B_{c,X}(d)$ as the set of PM data samples for device c during the non-maintenance window of day d, or some time range within the non-maintenance window of the day of the CM change, in which CM changes are not normally performed by the operator. Similarly $B_{c,X}(d-1)$ and $B_{c,X}(d-2)$ are the sets of PM data samples in the same time range in the non-maintenance window for the day prior and two days prior, respectively, to the day d on which the CM change was logged.

Next, compute the per-sample anomaly score function $f(x)$ for each sample in the sets $B_{c,X}(d)$, $B_{c,X}(d-1)$ and $B_{c,X}(d-2)$.

Next, compute the weighted cumulative anomaly scores $F_{c,X}^{B}(d)$ and $F_{c,X}^{A}(d)$ as follows:

$$F_{c,X}^{B}(d) = \alpha \frac{1}{|BH_{c,X}(d-2)|} \sum_{x \in BH_{c,X}(d-2)} f(x) +$$

$$(1-\alpha) \frac{1}{|BH_{c,X}(d-1)|} \sum_{x \in BH_{c,X}(d-1)} f(x)$$

$$F_{c,X}^{A}(d) = \alpha \frac{1}{|BH_{c,X}(d-1)|} \sum_{x \in BH_{c,X}(d-1)} f(x) +$$

$$(1-\alpha) \frac{1}{|BH_{c,X}(d)|} \sum_{x \in BH_{c,X}(d)} f(x)$$

In the above example, the factor $\alpha \in [0,1]$ is determined by the ratio of the portion of the maintenance window after the CM logging time to the portion of the maintenance window before the CM logging time.

Next, compute the anomaly score ratio $$R_{c,X}(t_p) = \frac{|F_{c,X}^{B}(L_p)|}{|F_{c,X}^{A}(L_p)|}.$$

Next, check if $R_{c,X}(t_p)$>threshold, where the threshold is greater than 1 (same as the candidate CM-related anomaly detection example described above).

Last, return the set of anomaly events for all parameter change times $S_x$ (same as the candidate CM-related anomaly detection example described above).

In the computing the weighted cumulative anomaly scores step above, the first term in the cumulative anomaly score $F_{c,X}^{B}(d)$ is weighted by the factor α, which is the probability that a change, always logged at the same time in the maintenance window of each day d, was actually applied during the maintenance window of day d−1 during the hours after the previous CM log time. In this scheme, it is assumed that CM changes are applied with uniform probability during the maintenance window. In the above example, CM logging takes places at 1:30 a.m. each day during the maintenance window of 12 a.m-6 a.m. Therefore, α=¾ is the fraction of the maintenance window after the CM change.

Root Cause Analysis for Configuration Management, Basic Rules with Parameter Change Events.

After determining the set of PM anomaly events coinciding with CM changes, the AI engine may perform root cause analysis to infer which CM parameter changes commonly result in anomaly events. An association rule learning or association rule-mining approach is employed to find correlations between CM change events and PM anomalies events. Within the rule mining framework, a basic rule is defined as follows.

$$\{t_p \in CM_{c,p}\} \Rightarrow \{t_p \in S_{c,X}\}$$

In the above, $CM_{c,p}$ is the set of times $t_p$ on which the parameter in question p was changed for a network device c. Also, set $S_{c,X}$ is defined, similar to the above, as the set of times such that the ratio $R_{c,X}(t_p)$ exceeds a threshold, over all $t_p$ and over all parameters p in the set $P_c$, at the device c. The basic rule states that a change to p at time $t_p$ at device c implies that the PM data variable of interest (e.g., IP throughput) coincides in time with an anomaly event, which is indicative of significant degradation (or, in another embodiment, significant performance improvement) at device c. The left-hand side of the rule is referred to as the antecedent, whereas the right-hand side is referred to as the consequent of the rule.

As an example, a basic rule for parameter A5 handover threshold p=a5_threshold_rsrp and KPI X=Eutran- MobilityHoInter (inter-eNB handover success rate) would be expressed as {change to a5_threshold_rsrp at time t for cell c}⇒{inter-eNB handover anomaly event at time t for cell c}.

Evaluating Rule Performance.

The following metrics, for example, may be employed to evaluate the efficacy of the basic rules.

A support metric may be employed to evaluate the efficacy of the basic rules. The support may be computed separately for the antecedent and consequent as follows.

$$supp(CM_p) = \frac{|CM_p|}{\sum_{c \in C} |T_{c,CM}|}$$

$$supp(S_X) = \frac{|S_X|}{\sum_{c \in C} |T_{c,X}|}$$

In the equation above, the support of the antecedent $supp(CM_{c,p})$ is the total number of unique instances of parameter p being changed, combined over devices of the same device type, denoted $CM_p$, divided by the total number of possible times at which CM parameters may be changed, $T_{c,CM}$, summed over all devices of the same device type. This assumes that CM parameter change times are discretized into a finite number of possible change time intervals represented by $t \in T_{c,CM}$.

Similarly, the support of the consequent $supp(S_X)$ is the total number of anomaly events, combined over all devices of the same type, denoted $S_X$, divided by the total number of sample times in $T_{c,X}$, summed over all devices of the same device type. Again, the times in $T_{c,X}$ must be at discrete intervals, e.g. samples taken every 15 minutes or aggregated over an entire day, or time-of-day range (e.g. the busy hours) of a day.

A confidence related metric may be employed to evaluate the efficacy of the basic rules. The conditional probability that, given a CM change for p at time $t_p$, a PM anomaly event is also detected at time $t_p$.

$$\text{Confidence} = P(t_p \in S_{c,X} \mid t_p \in CM_{c,p}) = \frac{\sum_{c \in C} |S_{c,X} \cap CM_{c,p}|}{\sum_{c \in C} |CM_{c,p}|}$$

The confidence can be computed the number of times of $t_p$ in the intersection of the sets $S_{c,X}$ and $CM_{c,p}$, summed over all devices of the same device type (e.g., a cell), divided by the number of unique instances of parameter p being changed, summed over all devices of the same type. Confidence may be equivalent to the precision of a rule, generated by the rule mining algorithm, in correctly determining whether a PM anomaly event is related to a CM parameter change. For example, if a type of PM anomaly event occurs half of the time that a type of parameter is changed, then the confidence would be 50%. Other metrics are required, however, to determine whether the confidence result is statistically meaningful.

Note that these metrics are not computed for a particular device but over the set of all devices $c \in C$ of the same type. For example, the set of all cells or eNodeBs in the network. Different device types, for example, core network elements such as mobility management entities (MMEs), serving gateways (S-GW), and so forth, may have different parameters, KPIs and other data variables. Accordingly, the rule performance should be computed separately.

In another embodiment, devices may be grouped into subsets based on geographic location or other characteristics, such as whether the device is a macrocell or a picocell base station. In such cases, the rule metrics would be computed separately for each subset, e.g., for the set of macrocells $C_{macro}$ and the set of picocells $C_{picocell}$.

A Hit Ratio metric may be employed to evaluate the efficacy of the basic rules. The number of time instances where a PM anomaly event is explained by a CM parameter change. Formally, it is computed as the ratio of number of time instances in the intersection of anomaly event set $S_{c,X}$ and the parameter change time set $CM_{c,p}$, summed over all c, to the number of times in the set $S_{c,X}$ summed over all c.

$$\text{Hit Ratio} = \frac{\sum_{c \in C} |S_{c,X} \cap CM_{c,p}|}{\sum_{c \in C} |S_{c,X}|}$$

The hit ratio indicates the number of anomaly events of a specific type of PM data, which are explained by a change to parameter p. Hit ratio is equivalent to the recall of a rule.

A lift related metric may also be employed to evaluate the efficacy of the basic rules. A measure of independence between a type of CM parameter change and a type of PM anomaly event.

$$\frac{supp(S_X \cap CM_p)}{supp(S_X) \times supp(CM_p)}$$

A lift value close to 1 indicates independence between the antecedent (parameter change) and consequent (PM anomaly event). On the other hand, a lift much greater than 1 shows higher correlation between the parameter and PM anomaly events.

A statistical significance related metric may be employed to evaluate the efficacy of the basic rules. A reasonable size of the set $S_{c,X}$ and $CM_{c,p}$ is required for the above metrics to be statistically significant. That is, a larger set of time instances where a CM-related PM anomaly event occurred lends to a more statistically meaningful result. The statistical significance of experiments is typically measured by computing the p-value. However, in this case, many unknown factors may determine whether a PM anomaly event occurs, making it difficult to prove or disprove the hypothesis that a CM parameter change is linked to a type of anomaly event.

A CM change may or may not cause an anomaly event for a specific device, depending on other state variables of the device, which may or may not be measurable. Additionally, CM changes for a specific parameter may be rare events. Therefore, the hypothesis that a parameter change causes an anomaly event is difficult to prove with basic rules. In the following discussions, extensions to the basic rules and compound rules provide clearer insights about the root cause of anomaly events. However, even with basic rules of the above form, the information that a strong correlation was found, based on the confidence and lift metrics, between a parameter and a type of anomaly event, is useful information for an operations engineer to use to diagnose potential network issues.

Basic Rules with Parameter-after Value Change Events.

In another embodiment, rules may be computed based on the value of a CM parameter after it was changed, as opposed to the binary parameter change-based rules in the embodiment described above. Basic rules are thus defined as follows, where <p, v> represents a specific parameter-after value pair.

$$\{t_{<p,v>} \in CM_{c,<p,v>}\} \Rightarrow \{t_{<p,v>} \in S_{c,X}\}$$

The set $CM_{c,<p,v>}$ includes time instances $t_{<p,v>}$ of a specific parameter p being set to v. Parameter-value rules are designed to detect cases of a parameter being set to invalid or sub-optimal value, which is linked a PM anomaly events. For example, the handover time-to-trigger parameter may be accidentally set to a very large value, e.g. 5120 ms, or a very small value, e.g., 0, which in both cases may result in a higher than normal handover failure rate.

The basic rule performance metrics presented above can be modified simply for parameter-value rules by substituting the set $CM_{c,<p,v>}$ for the set $CM_{c,p}$ in each of the equations for support, confidence, hit ratio and lift.

Basic Rules with Parameter-Before/after Value Change Events.

In another embodiment, both the value before and after the change to p, $v_b$ and $v_a$ respectively, can be incorporated into the basic rule. The rules are then computed for each unique tuple <p, $v_b$, $v_a$>.

$$\{t_{<p,v_b,v_a>} \in CM_{c,<p,v_b,v_a>}\} \Rightarrow \{t_{<p,v_b,v_a>} \in S_{c,X}\}$$

Again, the rule performance metrics can be modified by substituting $CM_{c,<p,v_b,v_a>}$ for $CM_{c,p}$ in each of the equations.

Basic Rules with Parameter-Delta Value Change Events.

In yet another embodiment of basic rule computation, rules may be based on the amount of change to the value of p, $\Delta_p = v_a - v_b$. The rules are then computed for each unique pair <p, $\Delta_p$>.

$$\{t_{<p,\Delta_p>} \in CM_{c,<p,\Delta_p>}\} \Rightarrow \{t_{<p,\Delta_p>} \in S_{c,X}\}$$

Such rule formulation is designed to detect cases of a parameter change by some amount (regardless of the before/after value) being linked to a PM anomaly event. For instance, an engineer may accidentally change a parameter by some large amount, which causes some degradation of the device performance. Note that the set of parameters must have numeric values, and not categorical or string values, for parameter-delta value rules to be applied. Again, the rule performance metrics can be modified by substituting $CM_{c,<p,\Delta_p>}$ for $CM_{c,<p,\Delta_p>}$ in each of the equations.

Quantization of Parameter Values.

In each of the basic rules involving numeric parameter values (i.e., after values, before and after values, and delta values), quantization of the respective values or delta values may be employed. Since there may be large set of unique values or delta values for a given parameter, and thus a large number of tuples <p, v>, <p, $v_b$, $v_a$>, or <p, $\Delta_p$>, quantization can reduce the possible combinations to improve the efficiency of the rule computation. The confidence of the rules may be improved as well, since values that are numerically close may have a similar causal relationship to anomaly events, and thus, grouping them together may increase the size of the CM change time set $CM_{c,<p,v>}$.

An example procedure for quantization of parameter delta values for each unique parameter p is as follows. However, the same procedure follows for after or before/after values.

First, compute the set of all delta values $V_p = \{\Delta_p(t_{<p,\Delta_p>}) \forall t_{<p,\Delta_p>} \in CM_{c,<p,\Delta_p>}\}$ where $\Delta_p(t_{<p,\Delta_p>})$ is the change in the parameter at time instant $t_{<p,\Delta_p>}$.

Next, group the delta values of V values into positive and negative value changes, $V_p^+$ and $V_p^-$.

Next, quantize the delta values the sets $V_p^+$ and $V_p^-$ into a fixed set of $N_{bin}$ bins with bin indices $b_p^+$ and $b_p^-$, where $b_p^{+/-} \in \{0, 1, \ldots, N_{bin}-1\}$. Values falling into each bin are determined by the thresholds $TH_{b_{p,low}}^{+/-}$ and $T_{Hb_{p,high}}^{+/-}$, where a delta value $\Delta_p$ is included in the bin if $TH_{b_{p,low}}^{+/-} < \Delta_p < TH_{b_{p,high}}^{+/-}$.

Once all delta values have quantized for all parameters, basic rules of the following form can be evaluated, where $b_p^{+/-}$ denotes either a positive or a negative bin index.

$$\{t_{<p,b_p^{+/-}>} \in CM_{c,<p,b_p^{+/-}>}\} \Rightarrow \{t_{<p,b_p^{+/-}>} \in S_{c,X}\}$$

Evaluation of Basic Rules on Real-World Datasets.

In this section, an embodiment using basic rules with parameter-after value change events and a delta-value-based rule mining embodiment using a North American LTE operator dataset are evaluated. The set of PM data includes over 12 million PM samples reported by 324 eNodeBs/2465 cells in the North East USA. Table 5 provides a list of monitored KPIs used in this evaluation, which are service-level Key Quality Indicators (KQIs) that provide a good indication of the overall performance and health of the cell. The CM change logs for the same region and over the same time range as the PM samples are included. The CM-related anomaly detection approach described in the PM anomaly detection and candidate CM related anomaly detection embodiment is employed in this example. Therefore, all CM changes are logged at a specific time in the maintenance window of each day, and each anomaly event indicates that degradation has occurred on the day d for a CM change occurring on either day d or d−1, with some probability determined by the method described above in the PM anomaly detection and candidate CM related anomaly detection embodiment described above.

TABLE 5

Table in Basic Rule Evaluation

| PM Family | Monitored KPI | Definition (measurement in latest 15 min) |
|---|---|---|
| Integrity | EutranIpThroughput | IP Throughput over Downlink |
| Retainability | ConnReEstabRate | Rate of RRC re-establishment requests |
| Mobility | EutranMobilityHoIntra | Intra eNB HO Success Rate |
| | EutranMobilityHoInter | Inter eNB HO Success Rate |
| | EutranMobilityHoX2Out | Outbound X2 HO Success Rate |
| | SumHoX2OutAtt | Number of outbound X2 attempts |

In each of the experiments in this section, the normalized mean anomaly score function from Table 4 is used. The anomaly ratio test thresholds (i.e., the anomaly score ratio $$R_{c,X}(t_p) = \frac{|F_{c,X}^B(L_p)|}{|F_{c,X}^A(L_p)|}$$

described above) of 1.25, 2, and 10 are also tested, wherein the threshold of 1.25 corresponds to a 20% degradation in the respective KPI, 2 corresponds to a 50% degradation and 10 corresponds to a 90% degradation.

Tables 6 and 7 illustrate examples of the performance of the after-value based rules for IP throughput anomaly events and mobility anomaly events, respectively. A subset of rules is presented, which meet the criteria of having a minimum support of the antecedent of at least 10 days on which the parameter was changed, and a confidence of at least 60%. The descriptions of the parameters are provided in Table 10.

TABLE 6

Parameter-After Value Basic Rule Performance for IP Throughput Anomaly Events

| Parameter | Relation | Example After Value | # anom/ total dates (all cells) | Conf. | Hit Ratio | Lift | Thresholds |
|---|---|---|---|---|---|---|---|
| pos-duplex-type | positioning-conf-info | tdd | 16/16 | 100% | .09% | 8.4 | 1.25, 2, 10 |
| config-tx-delay | cpri-port-entries | 81461 | 36/36 | 100% | .2% | 8.4 | 1.25, 2, 10 |
| config-rx-delay | cpri-port-entries | 72509 | 36/36 | 100% | .2% | 8.4 | 1.25, 2, 10 |
| dl-antenna-azimuth | antenna-line-device | 175 | 10/12 | 83.3% | .05% | 7.0 | 1.25, 2 |
| plmn0-search-rate-for-idle-lb | eutran-fa-prior-info-func | 20 | 12/18 | 66.7% | .07% | 5.6 | 1.25, 2 |

TABLE 7

Parameter-After Value Basic Rule Performance for Mobility Anomaly Events

| Parameter | Relation | Example Value | # anom/ total dates | Conf. | Hit Ratio | Lift | Thresholds |
|---|---|---|---|---|---|---|---|
| pos-duplex-type | positioning-conf-info | tdd | 16/16 | 100% | .09% | 8.4 | 1.25, 2, 10 |
| config-tx-delay | cpri-port-entries | 81461 | 36/36 | 100% | .2% | 8.4 | 1.25, 2, 10 |
| config-rx-delay | cpri-port-entries | 72509 | 36/36 | 100% | .2% | 8.4 | 1.25, 2, 10 |
| dl-antenna-azimuth | antenna-line-device | 175 | 11/12 | 91.7% | .08% | 10.0 | 1.25, 2 |
| plmn0-search-rate-for-idle-lb | eutran-fa-prior-info-func | 20 | 12/18 | 66.7% | .07% | 5.6 | 1.25, 2 |
| p0-nominal-pusch | ul-power-control-param-logic | −85 | 13/20 | 65% | .03% | 2.6 | 1.25 |
| p0-nominal-pucch | ul-power-control-param-logic | −104 | 13/20 | 65% | .03% | 2.6 | 1.25 |

TABLE 8

Parameter-Delta Value Basic Rule Performance
for IP Throughput Anomaly Events

| Parameter | Relation | Example Value Δ | # anom/ total dates (all cells) | Conf. (%) | Hit Ratio (%) | Lift | Thresholds |
|---|---|---|---|---|---|---|---|
| thresh-serving-low | eutran-fa-prior-info-func | 2 | 15/21 | 71.4 | 0.06 | 6.2 | 1.25, 2 |
| plmn0-search-rate-for-idle-lb | eutran-fa-prior-info-func | 34 | 11/12 | 91.7 | 0.06 | 11.6 | 1.25, 2 |
| dl-max-tx-power | carrier-control-info | 30 | 20/27 | 74.1 | 0.12 | 9.4 | 1.25, 2, 10 |
| dl-antenna-azimuth | antenna-line-device | 45 | 9/12 | 75.0 | 0.05 | 9.5 | 1.25, 2 |
| max-drb-count | qci-drb-cac-info | 200 | 8/12 | 66.7 | 0.03 | 5.8 | 1.25 |

20

TABLE 9

Parameter-Delta Value Basic Rule Performance for Mobility Anomaly Events

| Parameter | Relation | Example Value Δ | # anom/ total dates (all cells) | Conf. (%) | Hit Ratio (%) | Lift | Thresholds |
|---|---|---|---|---|---|---|---|
| thresh-serving-low | eutran-fa-prior-info-func | 2 | 15/21 | 71.4 | 0.06 | 6.2 | 1.25, 2 |
| plmn0-search-rate-for-idle-lb | eutran-fa-prior-info-func | 34 | 11/12 | 91.7 | 0.06 | 11.6 | 1.25, 2 |
| dl-max-tx-power | carrier-control-info | 30 | 20/27 | 74.1 | 0.12 | 9.4 | 1.25, 2, 10 |
| dl-antenna-azimuth | antenna-line-device | 45 | 9/12 | 75.0 | 0.05 | 9.5 | 1.25, 2 |
| max-drb-count | qci-drb-cac-info | 200 | 8/12 | 66.7 | 0.03 | 5.8 | 1.25 |
| plmn0-search-rate-for-idle-lb | eutran-fa-prior-info-func | 34 | 12/12 | 100.0 | 0.07 | 12.6 | 1.25, 2 |
| dl-max-tx-power | carrier-control-info | 30 | 24/27 | 88.9 | 0.14 | 11.2 | 1.25, 2, 10 |

TABLE 10

Description of Parameters with High-Confidence Rules

| Parameter | CM Category (Relation) | Value Range | Description |
|---|---|---|---|
| pos-duplex-type | positioning-conf-info | tdd/fdd | TDD/FDD setting |
| config-tx-delay | cpri-port-entries | 0 . . . 300000 (ns) | Tx time buffer setting for delay compensation between the RU and DU |
| config-rx-delay | cpri-port-entries | 0 . . . 300000 (ns) | Rx time buffer setting for delay compensation between the RU and DU |
| dl-antenna-azimuth | antenna-line-device | −1 . . . 3600 (x.1 deg) | Antenna azimuth of the RU downlink. |
| plmn0-search-rate-for-idle-lb | eutran-fa-prior-info-func | 0 . . . 100 | Carrier selection ratio for Idle Mode Load Balancing |

TABLE 10-continued

Description of Parameters with High-Confidence Rules

| Parameter | CM Category (Relation) | Value Range | Description |
|---|---|---|---|
| p0-nominal-pusch | ul-power-control-param-logic | −126 . . . 24 (dBm) | PUSCH Initial power control value |
| p0-nominal-pucch | ul-power-control-param-logic | −127 . . . −96 (dBm) | PUCCH Initial power control value |
| thresh-serving-low | eutran-fa-prior-info-func | 0 . . . 31 (dB) | Srxlev threshold (in dB) used by the UE on the serving cell when re-selection towards a lower priority RAT/frequency. |
| dl-max-tx-power | carrier-control-info | 300 (x.1 dBm) | Maximum output power of the DL RU (varies by the cell bandwidth) |
| priority | eutran-fa-prior-info-func | 0-7 | cellReselectionPriority for the EUTRA FA and it is used for SIB and RRCConnection Release |
| a5-threshold2-rsrp | eutra-a5-criteria-info | 0 . . . 97 (dB) | A5_THRESHOLD2 value of Event A5 during ReportConfigEutra configuration. |

From the basic rule evaluation, the hit ratio is low (<1%) for all rules. Hit ratio is fraction of anomaly events explained by a CM change. As mentioned, CM-related anomalies, especially for a specific parameter values or delta values, are expected to be very rare events. Thus, a low hit ratio is expected and not indicative of poor performance. Instead, confidence and lift metrics should be considered when interpreting whether a rule has indicated meaningful correlation between a CM change and a type of PM anomaly. From the above tables, several high-confidence rules for cell optimization-related parameters are found. Other optimization parameters (e.g. hysteresis, time-to-trigger, dl-max-tx-power) have confidence values of <50%, but may be improved through compound rule mining methods, as discussed later in this disclosure. Many high-confidence rules for non-optimization parameters, which are not included in the above tables, are also found. Some of these parameters include eNB ID assignment, IP address assignment, geographic coordinates, CSG PCI group assignment, downlink/uplink bandwidth and carrier frequency, and antenna height. For these parameters, note that it is not straightforward to explain impact of CM change on performance using domain knowledge.

It is also observed that different parameter rules with high confidence are found for the after-value and delta-value rules. This shows that both methods are useful for detecting different types of CM-related anomalies. As mentioned, after-value rules are more indicative of a value being invalid (e.g. fat fingering), whereas delta-value rules detect cases of large change causing degradation. By combining the basic rules from both methods, a total of 28 unique parameter rules are found with confidence>60%.

Neighbor Anomaly Detection and Rule Mining.

Often, a CM parameter change at one or more devices can impact one or more neighboring devices. Neighboring devices may be devices that are geographically close to the degraded device(s) or are physically or logically connected in the network, e.g. a eNodeB connected to a S-GW element over the S1 interface, or multiple eNodeB s being enabled in the neighbor relation table, which determines handover relationships. In another embodiment of the CM related anomaly detection schemes described above, potential neighbor impact of CM parameter change can be analyzed by identifying cases in which a CM change at a source device s coincides in time with an anomaly event detected at either s or one of its neighbors t∈NB(s). The neighbor set NB (s) may represent the neighbors of s in a graph representation of the network, which may differ depending on the scenario under analysis. For example, if signaling anomalies in the core network are to be analyzed, the neighbor set may include devices in the core network that are physically interconnected, share a common 3GPP-specified interface (e.g. S1, X2, etc.) or are neighbors in a routing table. If handover performance is to be analyzed, the neighbor set may include devices in a handover graph or neighbor relation table. If interference issues are to be analyzed, the interference graph may be analyzed.

Anomaly events may then be detected at device s and each of its neighbors t using one of the methods described above, or by some other AD scheme. In the previously-introduced AD schemes, the anomaly ratio threshold $R_{s,X}(t_p)$ is computed for s and $R_{t,X}(t_p)$ is computed for each $t \in NB(s)$ as described above. The set of anomaly event times for source device s may then be defined as:

$$S_{s,X} = \{t_p | R_{s,X}(t_p) > \text{thresh OR } R_{t,kpi}(d) > \text{thresh},$$
$$\forall t_p \forall p \in P_c\}$$

As shown above, the time instant $t_p$ is included in $S_{s,X}$ if the anomaly ratio threshold for PM variable X exceeds a threshold at either s or any one of its neighbors t.

The basic rule definitions in the embodiments described above may be modified by substituting $S_{s,X}$ for $S_{c,X}$ in the consequent of the rule. For example, in the example embodiment of parameter after-value rules described above, the basic rule may be stated as:

$$\{t_{<p,v>} \in CM_{s,<p,v>}\} \Rightarrow \{t_{<p,v>} \in S_{s,X}\}$$

where $CM_{s,<p,v>}$ is the set of all time instances at which parameter p was changed to value v at device s.

The rule performance would again be computed over the combined set of all devices for a similar device type, e.g. a cell or specific type of core network device.

Compound Rule Mining.

The basic rules described in the embodiments above may be useful in several scenarios, such as detecting when a CM parameter is changed, which is meant to be fixed, or not meant to be changed during a steady state operation of the device, i.e., after the device was initially configured. Basic rules may also be useful in detecting cases of a parameter being set to an invalid value or being accidentally changed by a significant amount as these types of changes may result in an anomaly event.

However, to provide more detailed analysis to aid operations/network engineers with troubleshooting, or to make more accurate inferences as to the root cause of the issue; that is, why a CM parameter change may have been linked to an anomaly event, the basic rules may be extended by including additional features in the antecedent (left-hand side) and/or consequent (right-hand side) of the rule.

The form of a compound rule may be expressed as:

$$\{I_{P_c}(t_0) \wedge A_1 \wedge A_2 \wedge \ldots \wedge A_{N_A}\} \Rightarrow \{I_{S_c,X'}(t_0) \wedge C_1 \wedge C_2 \wedge \ldots \wedge C_{N_C}\}$$

In the above compound rule statement, $CM_{c,P_c}$ is defined as the set of time instances at which a parameter $p \in P_c$ is changed, where $P_c$ is a subset of one or more CM parameter changed at device c. The indicator function is thus defined as:

$$I_{P_c}(t_0) = \begin{cases} \text{TRUE} & t_0 \in CM_{c,P_c} \\ \text{FALSE} & o.w. \end{cases}$$

Compound rule statements may extend the basic rule formulation by including multiple parameter changes in the antecedent. As mentioned, the time instants $t_0$ may be discretized into intervals of time greater than the original interval of CM change reporting, so that temporally co-occurring changes falling into the same interval can be grouped together. For example, second-level resolution of CM change timestamps may be discretized into 15-minute intervals represented by $t_0$. The above can also be extended to support parameter-value and parameter-delta value-based compound rules. In other embodiments, the definition of the set P' may be modified to include parameter-value pairs <p, v>∈$P_c$, tuples of parameter before and after values <p, $v_b$, $v_a$>∈$P_c$, and parameter-delta values <p, $\Delta_p$>∈$P_c$ for multiple types of CM parameters, as opposed to only the parameters p themselves.

Furthermore, one or more other Boolean terms $A_i$, i∈{1, . . . , $N_A$}, where $N_A$ is the number of additional antecedent terms, may be included in the antecedent. The terms $A_i$ may be Boolean statements including functions $F_X(t_0)$ of KPIs and PM counters, alarm types, or logging events at device c.

For PM-based antecedent terms, functions such as the following may be considered:

The value of a time-series PM variable X at time instant $t_0$, that is, $F_X(t_0)=X(t_0)$. The value of a PM variable at some (positive or negative) offset r from the time of a parameter change, $F_X(t_0)=X(t_0-\tau)$ may also be used.

An aggregation function $F_X(t_0)$ of the time-series PM variable over a time range, relative to the time of a parameter change $t_0$. For example, a function $F_X(t_0)$ may be computed on the PM samples in the look-ahead window $T_A(t_0)$ introduced above, or on the samples in the look-back window, $T_{c,B}(t_0)$, for device c. Example aggregation functions may include the mean, median, or other statistics of the samples in the time window, or some anomaly score function, such as those presented above in Table 4.

An anomaly ratio function $F_X(t_0)=R_{c,X}(t_0)$, such as the functions defined above.

To incorporate the function $F_X(t_0)$ into the antecedent term $A_1$, the range of $F_X(t_0)$ must be quantized into a fixed number of bins $b_j$, j∈{1, . . . , B}. The number of bins B may vary depending on the PM variable samples, which are the arguments to a function $F_X(t_0)$. A value of $F_X(t_0)$ is included in a bin $b_j$ if it falls between the bin edges. Then, the Boolean term may be expressed as:

$$A_i = \begin{cases} \text{TRUE} & F_X(t_0) \in [b_{A_i-low}, b_{A_i-high}] \\ \text{FALSE} & o.w. \end{cases}$$

where $[b_{A_i-low}, b_{A_i-high}]$ are the bin edges for the antecedent term $A_i$. The bin edges may also be referred to as the inequality constraints of the respective function $F(t_0)$.

For alarm-based antecedent terms, functions such as the following may be considered.

An indicator function that determines whether an alarm $ALARM_a$ of a specific alarm type was first reported at the time instant of a CM parameter change $t_0$, or within some time window before or after $t_0$. That is, $$A_i = \begin{cases} \text{TRUE} & t_{alarm} \in [t_0 + \tau_{start}, t_0 + \tau_{end}] \\ \text{FALSE} & o.w. \end{cases}$$

where $t_{alarm}$ is the timestamp of the alarm first being reported and $\tau_{start}$ and $\tau_{end}$ are the offsets of the time window relative to $t_0$, and may be positive or negative.

An indicator function that determines whether an alarm of a specific alarm type is in an active state, meaning the alarm had not been cleared, at the time instant of a CM parameter change $t_0$, or within some time window before or after $t_0$.

An indicator function that determines whether an alarm of a specific alarm type was cleared at the time instant of a CM parameter change $t_0$, or within some time window before or after $t_0$.

A count of the number of new, active, or cleared alarms of one or more alarm types occurring at the time instant of a CM parameter change $t_0$, or within some time window before or after $t_0$.

The antecedent is thus computed as the logical AND of each of the $A_i$ terms along with the $I_{c,P}(t_0)$ term, the latter indicating one or more parameters in P' were changed at the same time instant $t_0$.

The right-hand side consequent of the compound rule includes the indicator function $I_{S_c,X'}(t_0)$, which indicates whether anomaly event(s) were detected at the time instant $t_0$ at device c for any of the PM variables $X_k$ in the set X'={$X_1$, $X_2$, . . . , $X_K$}.

$$I_{S_c,X'}(t_0) = \begin{cases} \text{TRUE} & t_0 \in S_{c,X'} \\ \text{FALSE} & o.w. \end{cases}$$

In other words, multiple types of PM anomaly events (at the same device) may be considered in the consequent. Other Boolean consequent terms $C_j$, j∈{1, . . . , $N_C$} may also be computed based on PM variables and alarms, as described above for the antecedent terms $A_a$.

Association Rule Mining Procedure.

For basic rules, rule mining may be performed as follows.

Select a subset of one or more CM parameters of interest for the antecedent. For example, a subset of consequential parameters, which have known impact on performance of the PM variables in the consequent, may be manually selected based on domain knowledge.

Select a subset of PM variables of interest for the consequent. For example, the service-level KQIs in Table 4 may be good candidates for indicating anomaly events in the consequent.

Select a set of thresholds for anomaly ratio testing. For example, thresholds of 1.25, 2 and 10 were used in the above evaluation. Different thresholds can generate different sets of high-quality rules (i.e., rules meeting the support/confidence requirements). For example, a threshold of 10 imposes that major 90% degradation in the PM variable must be matched in the rule consequent.

For each CM parameter of interest, for each PM variable of interest, and for each threshold, compute the support, confidence, lift and hit ratio for each rule of the form presented in one of the embodiments described above.

Filter out any rules that do not meet the criteria for minimum support, confidence, lift, and hit ratio. Some example criteria are the thresholds used in the evaluation described above. For example, a minimum support of 10 CM change events and 60% minimum confidence.

Return the set of basic rules meeting the criteria.

For compound rules, various algorithms such as Apriori and FP-Growth may be employed for learning rules. As input to the rule mining algorithm, a set of one or more parameters P' along with a set of terms $A_i$ may be provided for constructing the antecedent. A set of one or more PM variables X' consequent terms $C_j$ are provided for the consequent. The rule mining algorithm may generate compound rules which meet the specified criteria for minimum support and/or confidence.

Inferring Root Causes from Rules.

Once the set of rules (either basic or compound) that meet the specified criteria is generated, human domain expertise may be applied to interpret the pattern of the PM variables, alarms, and parameters contained in the resulting rules.

One approach would be for an operations engineer to label a set of anomaly events with a root cause category, such as the example categories in Table 3. In FIG. 4, described above, the user client 116 may provide the capability to manually label anomaly events, which may be detected by the AI engine 408. The user client 116 may then send the labels to the AI engine 408. The AI engine 408 may then classify the generated rules as belonging to one of the provided root cause categories.

Another approach, which does not require individual anomaly events to be manually labeled, would be to manually identify which PM, FM, or CM variables and alarms are likely to be the cause or the primary symptom of an anomaly event (either degradation or improvement in a KPI or other PM variable), or a secondary symptom of the anomaly event, i.e., degradation in one or more PM variables, or one or more alarms being triggered because of the primary symptom. In some cases, the true root cause may be difficult to infer. For example, a random spike in active users at a cell not accompanied by any changes or abnormal behavior at neighboring cells may simply be due to changes in vehicle traffic on a particular day. Thus, if the true cause cannot be inferred, a variable in the antecedent that a cellular network expert decides is causally independent from other variables, mat be deemed as a primary symptom. A cellular network expert may inspect the terms of the antecedent and consequent, and their respective inequality constraints, and infer the root cause of the anomaly event(s). In the case of CM rule mining, a CM change may have been related to one or more PM variables becoming degraded or alarms being triggered. For example, the symptoms shown above in Table 3 for the HIGH_DOWNTILT, LOW_DOWNTILT, ANTENNA_AZIMUTH_CONFIG, HANDOVER_CONFIG, UL_POWER_CONTROL_CONF and CELL_SELECTION_CONF categories exemplify how different variables may be interpreted to identify the possible root cause.

Once each of the high-quality rules is assigned a root cause label, the set of labeled rules may be stored in a database and used by the AI engine 408 or the SON controller 410 to classify the root cause of new anomaly events.

Automated Parameter Optimization and Recommendation System.

The anomaly detection, rule mining, and root cause inference techniques presented above may also be employed for recommending CM parameter setting s that may improve performance. This also lends to automated self-healing: if parameter changes can be identified, which lead to performance improvement with high confidence, a SON controller 410 may automatically set such parameters. As mentioned above, cases of CM parameter changes linked to performance improvement may be detected by modifying the AD schemes described above to use the inverse anomaly ratio, as follows:

$$R'_{c,X}(t_p) = \frac{1}{R_{c,X}(t_p)} = \frac{|F^A_{c,X}(t_p)|}{|F^B_{c,X}(t_p)|}$$

$$S_{c,X} = \{t_p \mid R'_{c,X}(t_p) > \text{threshold}, \forall\, t_p \forall\, p \in P_c\}$$

Next, the same association rule mining framework may be employed to learn when a CM parameter change to a specific value (or from a specific before to after value) may, with high confidence, offer improved performance. With compound rules, it may be possible to generate a parameter change recommendation which are customized to a device and is a function of other state variables of the device (represented in the antecedent terms $A_i$). Such {STATE}→{ACTION} rules, as discussed above, may then be generated by including the $A_1$ terms in the {STATE} portion, and the parameter/value pairs in $P_c$ in the {ACTION} portion.

Reinforcement Learning Framework.

Figure 14:
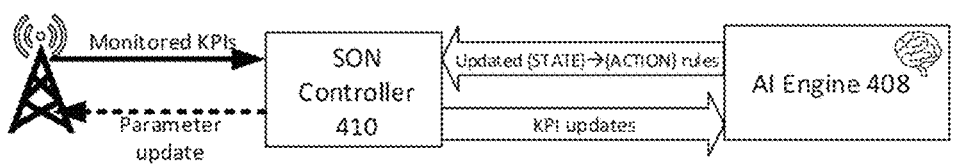
FIG. 14 illustrates an example of a reinforcement learning framework using state/action rules for self-healing according to this disclosure.

FIG. 14 illustrates the above approach for parameter setting optimization and recommendation as part of a reinforcement learning framework for automated self-healing according to this disclosure.

In the example framework of FIG. 14, a SON controller 410 maintains a database of {STATE}→{ACTION} rules (or, equivalently, as state/action table or Q-table) provided by the AI engine 408 in an ACI message 409. The SON controller may also monitor a set of KPIs or other data variables generated by one or more monitored network devices. The SON controller 410 may apply the actions in the rules when a monitored device enters the state defined by the {STATE} expression and executes the {ACTION} by setting one or more CM parameters on the devices. As mentioned above, one or more rules with the same {STATE} term may be executed with a specified probability. This may make it possible for different actions to be tested on the network device(s); i.e., enabling the exploration phase of reinforcement learning. The data reported by the device(s) continues to be monitored and transmitted back to the AI engine 408 in SON feedback information messages 411. Based on whether the devices, which have had parameters updated by the SON controller 410, are observed to have improved performance or not after the most recent parameter change, the AI engine 408 can learn and revise its {STATE}→{ACTION} rules and transmit the updated rules to the SON controller 410 accordingly.

Aggregating Data Sources for Inference and Root Cause Analysis in Self-Healing Cellular Networks.

With recent advancements in hardware, storage, and software, AI is having a transformational effect in almost every field. For cellular domains, AI may help solve problems that were traditionally deemed impossible to solve due to tremendous network complexity, model deficit, or algorithm deficit. Leveraging data driven machine learning techniques for troubleshooting degradations in cellular network performance is an evolving field. Traditionally, troubleshooting cellular networks may be done by manually monitoring trends in different KPIs and identifying deviation of these KPIs from their normal statistical behavior. This process may involve monitoring statistics of several tens to hundreds of key KPIs and identifying anomalies in network operation in these KPIs through human expertise. This method causes the process to be highly dependent on human experts having to adapt to changing KPI trends on a regular basis (weekly, monthly, depending on time of day, etc.). This further makes the process to be vulnerable to errors.

It is important for service providers to correctly identify anomalous degradation network performance, then identify the root cause and finally make changes to network parameters or network topology to mitigate the root cause of the network anomalies. An operations support system (OSS) is a software system that enables service providers monitor a mix of KPIs (interchangeably referred to as PM data herein), CM Parameters, and alarms (interchangeably referred to as FM data herein), obtained from base stations in the network. PM data are periodically reported, for example, once every 15-minutes, from each cell within an eNB in the form of counters, floating point values and histograms. CM data consist of eNB configuration parameters and are typically collected once each day. FM data may notify occurrence of Alarm events; unlike PM data that are periodically reported, alarms are triggered in response to hardware or software failure at the eNB. A small subset of the PM KPIs may be representative of the overall health and end-user service quality provided by the network. The KPIs within this subset are referred to as KQIs. For instance, DL or UL throughput, or Voice over long term evolution (VoLTE) call drops are example KQIs. Any degradation in these KPIs may be correlated with degradation in other KPIs that monitor detailed network functionalities. These detailed KPIs may provide insight as to failure or degradation in the network operations that led to a degraded KQI. For example, monitoring UL or DL signal to interference plus noise ratio (SINR) is a KPI that can enable one to identify whether the degradation in KQI is due to radio link failure. Other example KPIs are number of active users connected per cell, number of hybrid ARQ (automatic repeat request) attempts, user transmit power headroom, etc.

VoLTE RCA can be challenging. For example, the data source may not have detailed troubleshooting KPIs. Accordingly, the RCA process may involve correlating with another data source. For example, OSS data for performing troubleshooting.

Further, KPIs from each data source may have limitations for VoLTE RCA. In terms of granularity of reporting, reflection of true quality of user experience, ability to perform troubleshooting with available KPIs.

Certain embodiments according to this disclosure provide systems and methods on robustly detecting degradation in electronic system, including the VoLTE RCA using KPIs of multiple data sources.

Computing VoLTE KPIs may also be challenging because different data sources have different methods of computing the KPIs. For example, an end to end VoLTE call may contain UL, DL, and backhaul link with one or two eNBs/gNBs being involved. End user QoE may be affected by one or more of the above stated links. Further, call level monitoring can be expensive. VOMA may be able to only monitor up to 20 calls per eNB or 6 calls per cell.

Computing VoLTE KPIs may also be challenging because VoLTE traffic contains spurts of speech as well as spurts of silence. Muting may also affect QoE in talk spurts. Accordingly, it may be difficult to determine whether a talk spurt has ended or if a network anomaly has occurred.

Multiple sources of data may also be KPIs and/or alarms. Certain embodiments according to this disclosure provide systems and methods for meaningful combining alarm and KPI correlations.

alarms may be indicative of a software or a hardware issue. However, it may be difficult to determine the impact of such issues on KPIs.

Certain embodiments according to this disclosure provide systems and methods for robustly detecting degradation in system performance (e.g., VoLTE RCA system for cellular network diagnosis) in configurations with multiple data sources with overlapping/non-overlapping KPIs or alarms with potentially different granularity of reporting, different domain knowledge regarding reliability of the KPIs, etc.

Certain embodiments according to this disclosure provide systems and methods for performing root cause analysis using advanced causation analytics tools by declaring one data source as a reference data source and one or more data sources as supporting data sources.

Certain embodiments according to this disclosure use reference data source KPIs to receive a pool of samples that correspond to network degradation.

Certain embodiments according to this disclosure use supporting data sources to further refine the pool of samples that correspond to network degradation.

Certain embodiments according to this disclosure provide a network architecture wherein a module ingests KPIs from multiple data sources to perform automatic root cause analysis.

Certain embodiments according to this disclosure provide a module that selects data source as reference or supporting data sources.

Certain embodiments according to this disclosure provide a module that refines the pool of network degradation samples obtained based on reference data source using KPIs from supporting data source(s).

Certain embodiments according to this disclosure provide a module that performs troubleshooting of network anomalies using causation analytics tools.

Figure 15:
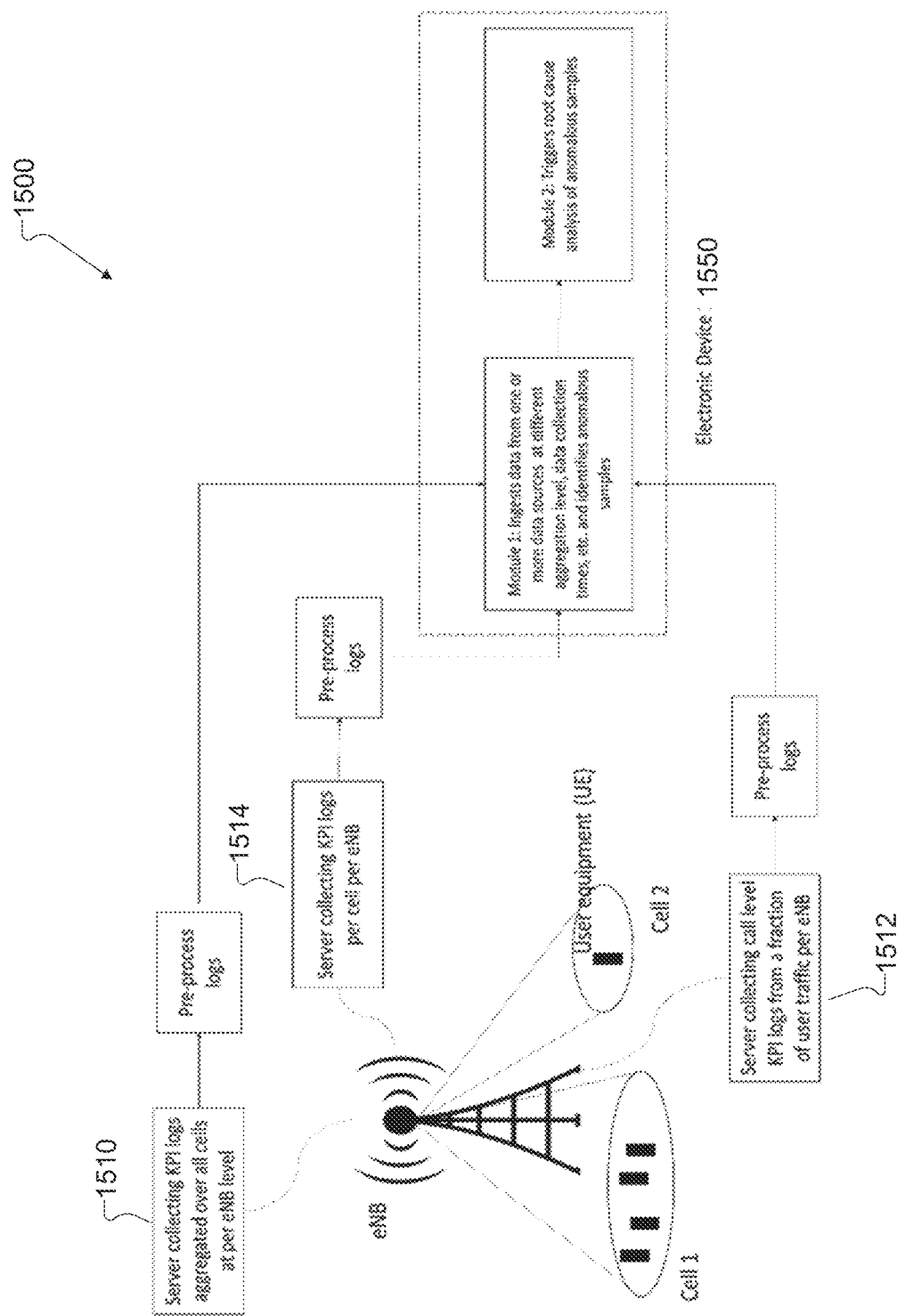
FIG. 15 illustrates a high-level process 1500 for anomaly detection in non-cellular network applications with multiple input data sources according to this disclosure.

FIG. 15 illustrates a high-level process 1500 for anomaly detection in non-cellular network applications with multiple input data sources (e.g., robot localization system with multiple sensors aiding the localization) according to this disclosure. Process 1500 may be run on one or more electronic devices having the same or similar components as UE 116. Data from multiple data sources at potentially varying levels of aggregation (e.g., call level data 1510, cell level data 1512, eNB/gNB level data 1514) and different times of reporting may be ingested into an electronic device 1550. In some embodiments, the data is pre-processed by one or more external server(s) or processor(s) prior to ingestion.

The three data sources shown in FIG. 15 (e.g., call level data 1510, cell level data 1512, eNB/gNB level data 1514) are presented for illustration purposes, and embodiments according to this disclosure are not limited to these three data sources in any way. There may be any number of such data sources with different methods of data collection from eNB/gNB, cell, UE, etc., levels. The data ingested from each data source may be indexed. Module 1 of process 1500 processes the data from multiple data sources and identifies a list of anomalous samples. Anomalous samples are reported by module 1 in terms of a collection of data indices corresponding to one or more data sources. Data indices may include timestamp-cell pairs, timestamp-eNB pairs, a list of eNBs, timestamp-cell-eNB triplets, a list of cell-eNB pairs, timestamps, or any other suitable reference.

Although FIG. 15 illustrates one example of a network configuration 100 including an electronic device 101, various changes may be made to FIG. 15. For example, for use in a non-cellular network application with multiple data sources. For example, in a robot localization system with multiple sensors aiding localization.

Figure 16:
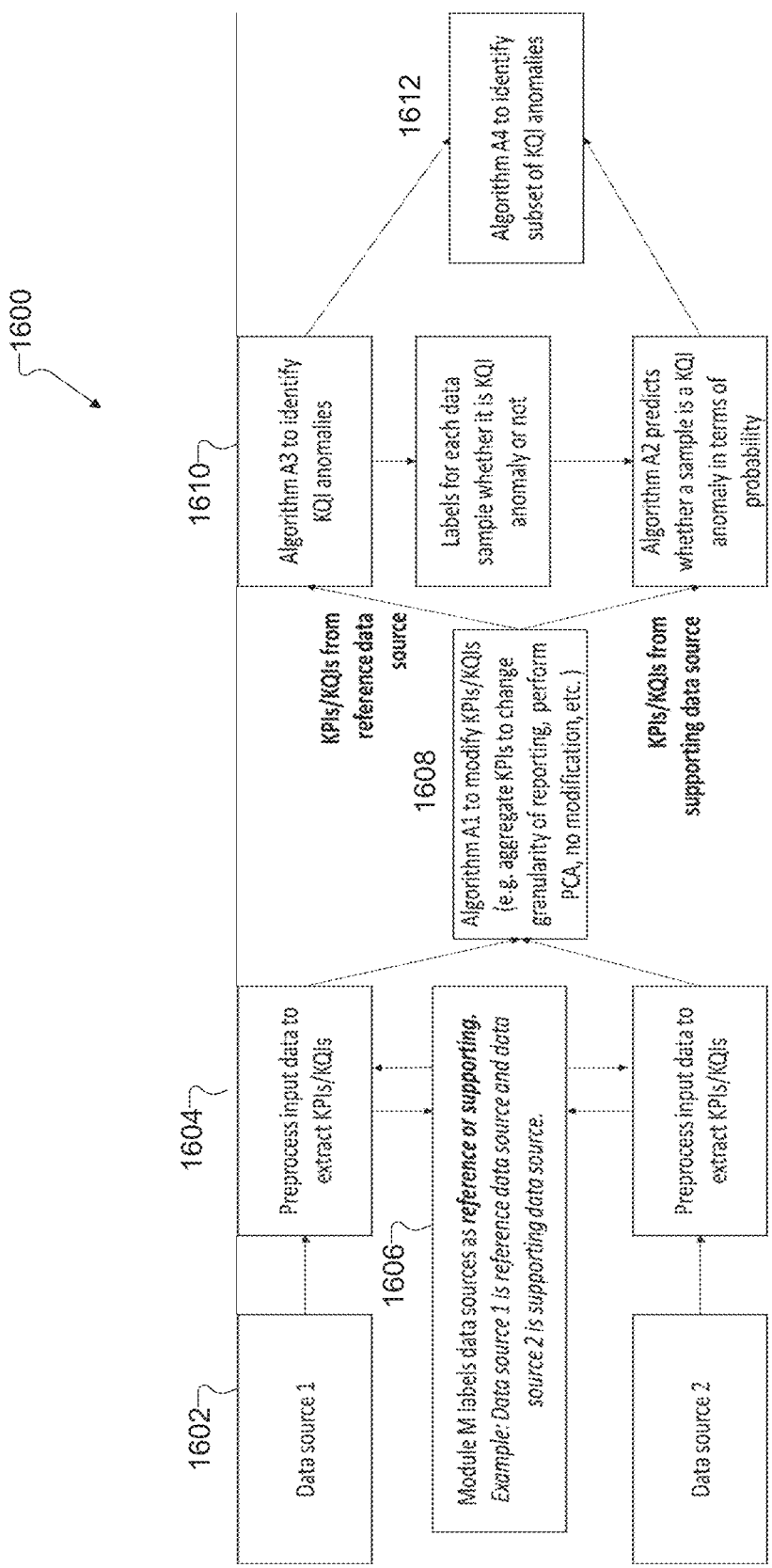
FIG. 16 illustrates a block diagram of an exemplary module 1 process according to this disclosure.

FIG. 16 illustrates a block diagram of an exemplary module 1 process 1600 according to this disclosure. In this example, two data sources (data sources 1 and 2) are used for simplicity purposes and embodiments in accordance with this disclosure may include any number of data sources. In operation 1602, one or more data sources are ingested into electronic device 1550, as described in relation to FIG. 15. The data obtained from these data sources may be in different formats. For example, zipped files for different time intervals. or may be in terms of counters that are themselves not sufficient to monitor network quality but may be combined with other counters to generate KPIs. Accordingly, operation 1604 preprocesses the data from the multiple data sources to extract KPIs from each of these data sources.

In operation 1606, module M selects one data source, or a subset of data sources as reference data sources. Reference data sources may be used to identify KQI anomalies. The remaining data sources may be labeled by module M as supporting data sources. KQIs, as used herein, are a subset of KPIs available from a data source. Module M may label one or more data sources as reference data sources by reading from a list of available input data sources stored in the memory component of electronic device 1550, along with any preference of being chosen as a reference data source.

However, operation 1606 is not restrictive and module M may employ another suitable technique to select a reference data source(s). Module M may select supporting or reference data sources using automatic or manual inputs, through a GUI, or other software program. For example, Module M may automatically select one of the data sources as a reference data source and the remaining data source(s) as supporting data sources by analyzing the extracted KPIs from both data sources. For example, based on granularity of reporting. For example, Module M may always choose the data source with smaller granularity of reporting in terms of cell, call, eNB/gNB, or time as reference as the reference data. In another example, Module M may evaluate association rules of the form $KQI_1 > T_1 \rightarrow KQI_2 > T_2$ wherein subscripts 1 and 2 imply refer to the data source being used (e.g., data source 1, data source 2, etc.). The association rule that provides the highest machine learning confidence after evaluations based on thresholds or other criteria may be chosen to determine the reference source.

For example, since VOMA KPIs collected may only be using a subset of calls, unlike PM KPIs, Rule 1 may have an 80% confidence. Rule 2 may have very poor confidence. In this example, VoLTEULQualityDefect is the PM KPI. The following rules may be applied to determine the reference data source:

Rule 1: mute_rate_enduser>TVOMA⇒VoLTEU LQuality Defect>0

Rule 2: VoLTEULQualityDefect>0⇒mute_rate_enduser> TVOMA

In this example, the PM KPI may be chosen as a reference data source and VOMA KPI as supporting data source.

In another example, module M may always choose the data source that has the coarsest granularity of reporting as the reference data source or based on one or more criteria. For example, if data source 1 reports KPIs per eNB on an hourly basis, and data source 2 reports KPIs per cell every 15 minutes, module M may select data source 1 as a reference data source given its coarse granularity of reporting. Similarly, if data source 1 reports KPIs per cell level every 15 minutes and data source 2 reports KPIs per call level every 15 minutes, module M may again select data source 1 as a reference data source for its coarse granularity of reporting.

Next, in operation 1608, algorithm A1 further processes KPIs/KQIs from the reference and supporting data sources to generate modified KPIs/KQIs. One potential purpose of this step may be to match the granularity of reporting of the KPIs/KQIs from the different data sources. For instance, if the reference data source reports certain KPIs/KQIs at the eNB level on an hourly basis and supporting data source reports certain KPIs/KQIs at the cell level every 15 minutes, algorithm A2 may convert the cell level per 15 minute KPIs from supporting data sources at the eNB level on an hourly basis through an aggregation method. Algorithm A1 may be a trivial algorithm that, for example, leaves input KPIs from data source 1 unchanged. There may be several methods to aggregate supporting data source(s) for algorithm A2. For example, aggregation can be done by simple averaging operation across cells and time. Another example is to take maximum values of KPIs/KQIs across all cells to compute eNB level KPIs/KQIs. Similarly, maximum value of four 15 minute samples of the KPIs/KQIs per hour can be taken to get hourly samples of the KPIs/KQIs.

The methods described above for algorithm A1 and A2 are provided as examples and embodiments in accordance with this disclosure are not limited by these specific methods. Other methods included as part of algorithms A1 and A2 may include taking principal component analysis (PCA) of the several KPIs from data source 1 or 2 to receive a smaller set of synthetically generated KPIs that capture the most variance. PCA may be taken before the operation of changing granularity of reporting as described above or after operation 1608.

Another method that may be executed by algorithms A1 and/or A2 may be to align two data sources to have the same sample indices for KPIs. For example, after converting both data sources to eNB-hourly granularity, if the reference data source has certain KPI values reported at 9 am for eNB 1, but the supporting data source does not have a corresponding sample for some of the KPI values, the sample from the reference data source may be dropped. In another example, if a particular sample index is missing in KPIs of the reference data source but not in KPIs of the supporting data source, the samples from supporting data sources may be dropped.

Figure 17:
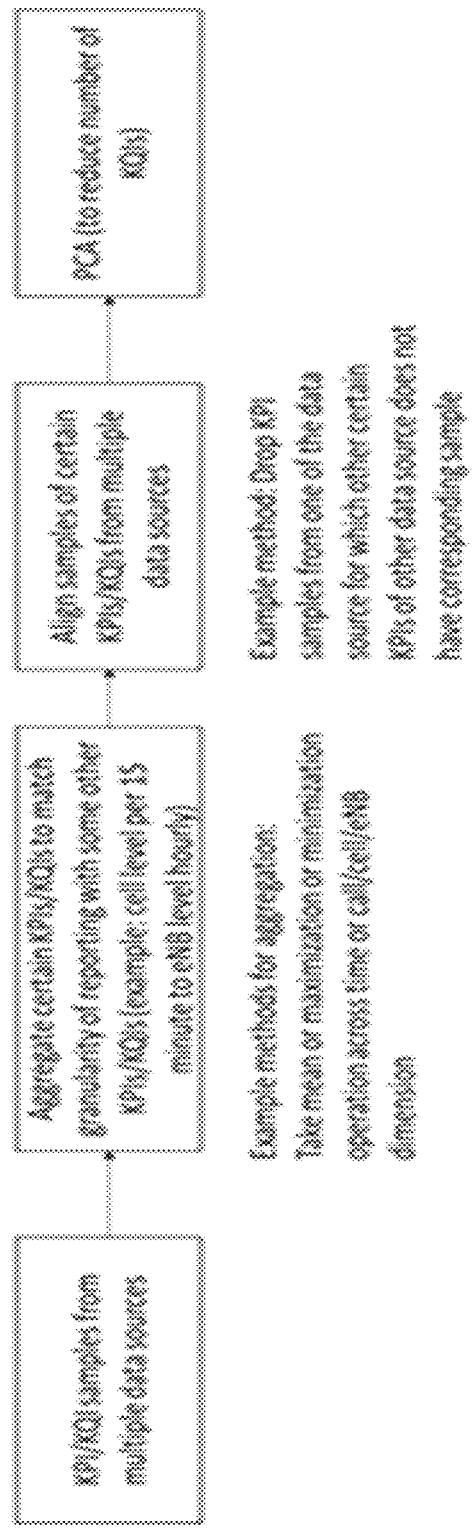
FIG. 17 summarizes example components that may be included within algorithm A1 in accordance with this disclosure.

FIG. 17 summarizes example components that may be included within algorithm A1 in accordance with this disclosure. Not all components may be required, and additional components may be added in accordance with this disclosure. For example, a PCA block may be excluded in an embodiment. Further, the sequence shown is only one of example of a sequence that may be applied in embodiments according to this disclosure.

Once operation 1608 has completed, Algorithm A3 may be initiated by operation 1610 to identify KQI anomaly samples from the output of algorithm A1, as shown in FIG. 17. First, algorithm A3 may select KQI(s), which is/are a subset of the KPIs from the reference data source. Next, a function of the KQI(s) may be used to mark whether a particular data sample is an anomaly or not. For example, if X is a KQI from the reference data source, a simple algorithm that declares whether X is an anomaly or not may run. For example:

Declare that X is an anomaly if X>T, otherwise, do not declare an anomaly. For example, T may be a fixed threshold across an entire network or a fixed value for every eNB, but different across eNBs. T may also be a fixed value across the entire network if, for example, the sample under consideration corresponds to a fixed time of day or any other suitable policy.

An expert may choose T based on domain knowledge or T maybe chosen based on statistics of incoming data. For instance, T can be set to be a 99 percentile value of X over a training set of data. Note that above are given as exemplary anomaly detection procedures for algorithm A3 and the embodiment is not limited to these examples. In operation 1610, each sample of the KQIs may marked as being anomalous or not. After identifying KQI anomalies, each sample from the reference data source may be labeled as being anomalous or not. As used herein, these labels are referred to as L.

Figure 18:
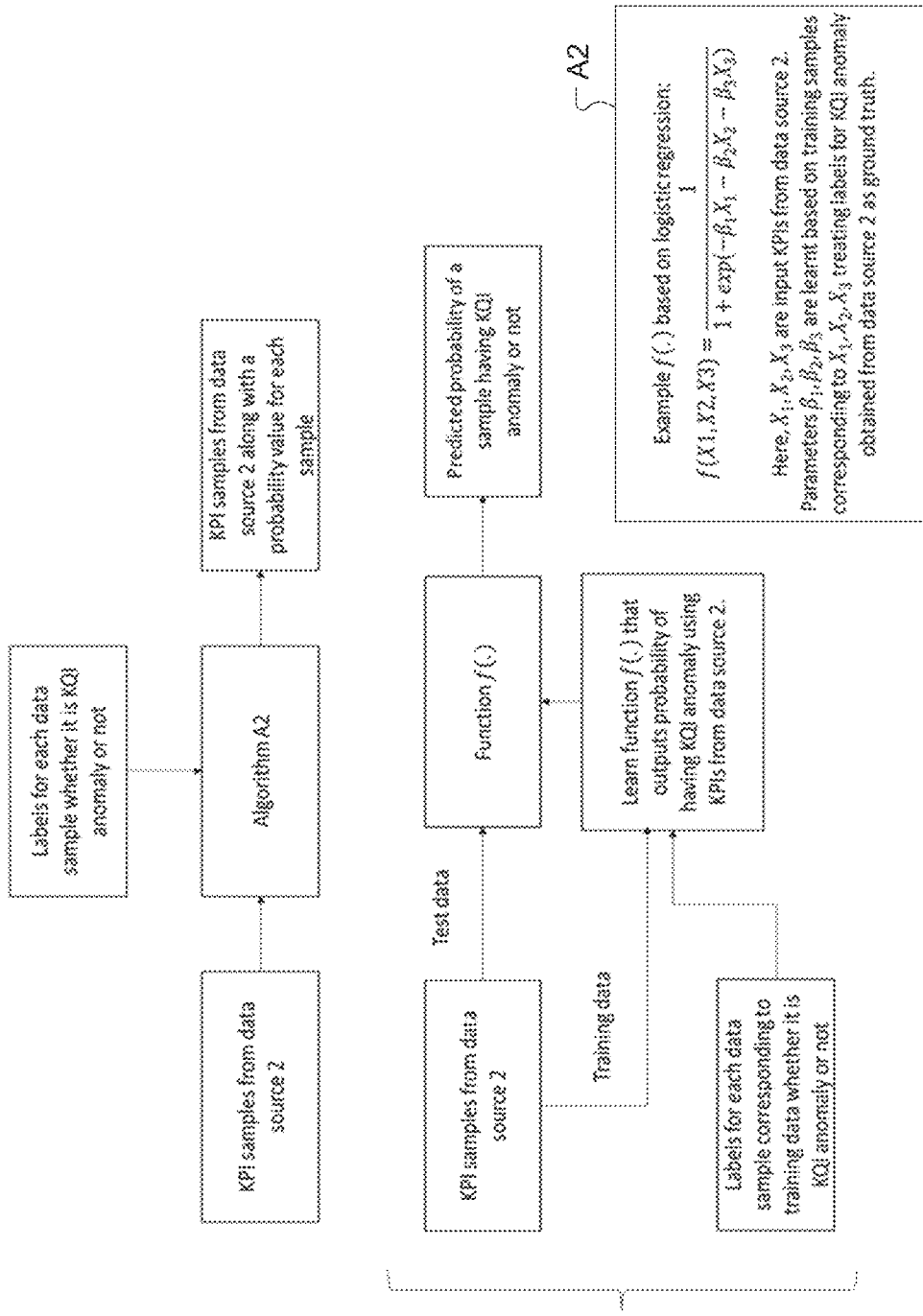
FIG. 18 illustrates a high level input/output block diagram 1810 and a detailed example of implementing algorithm A2 using logistic regression according to this disclosure.

FIG. 18 illustrates a high level input/output block diagram 1810 and a detailed example of implementing algorithm A2 using logistic regression according to this disclosure. As shown in FIG. 18, Algorithm A2 receives, as inputs, KPIs from the supporting data source(s) and labels L as inputs, and outputs a probability value that indicates whether a particular sample in the data is a KQI anomaly. The KPI samples from the supporting data source and labels L may be divided into training data and test data. In this example, training data samples are used to identify a function $f(.)$ that predicts whether there is a KQI anomaly. A supervised learning method may be used to identify function $f(.)$ by treating the KQI anomaly samples from the reference data source as ground truth. Note that logistic regression is provided as an example method of function $f(.)$, and embodiments of algorithm A2 according to this disclosure are not limited to the use of logistic regression. Other methods to arrive at functions $f(.)$ may be through deep learning of neural network architectures. Once a function $f(.)$ is learned, the function may be used to output a probability value. The probability value is the probability that a KQI anomaly by using a reference data source(s) for the test data being received from a supporting data source (s).

The division of training and test data may be performed by algorithm A2 in several ways. One example is to consider all samples, or up to N samples, before time stamp $T_0$ as training samples and treat all samples for time $t>T_0$ as test data. Time stamp $T_0$ may be a fixed time, or a time that is periodically updated (e.g., every day or every week). Each time timestamp $T_0$ is updated, the system retrains the learn function $f(.)$. If $T_0$ is fixed, function $f(.)$ may only need to be learned once and the remaining time may be used to evaluate KPIs from the testing data of supporting data source (s).

Figure 19:
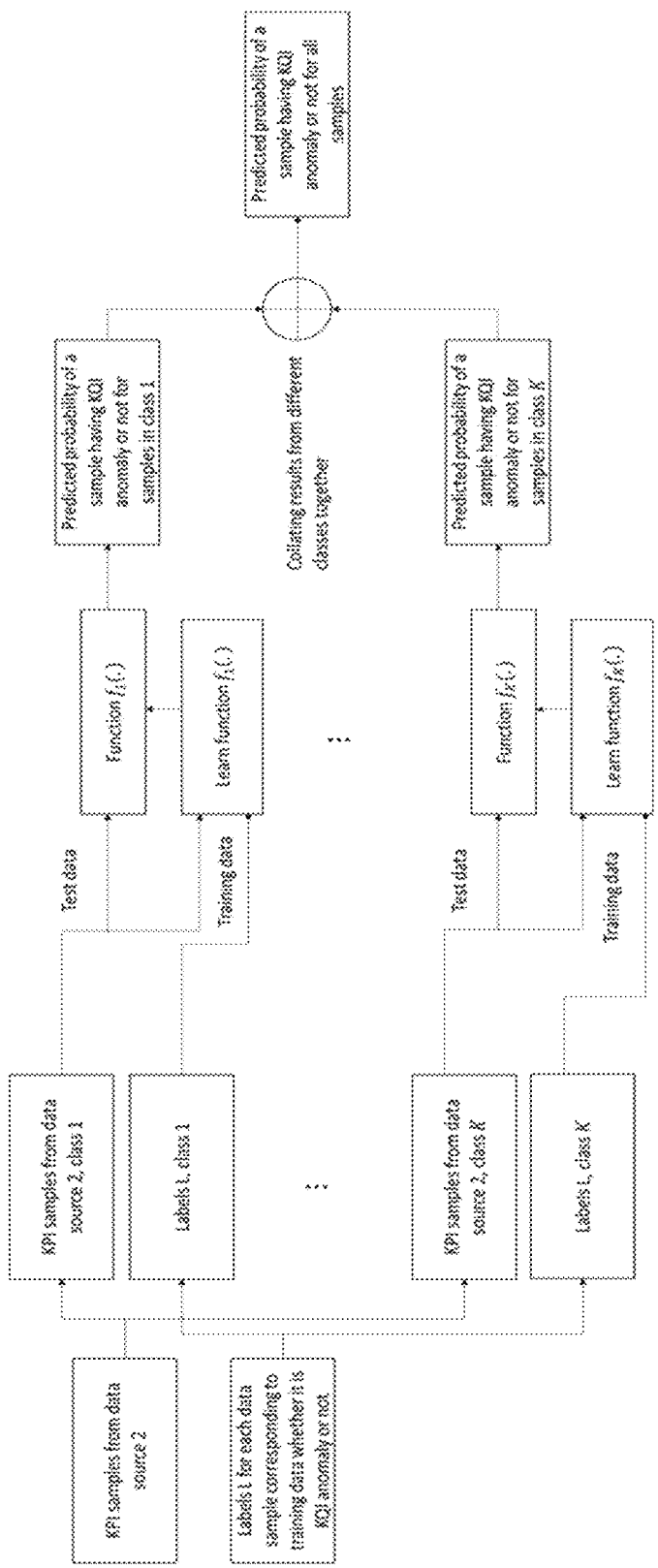
FIG. 19 illustrates a variation of algorithm A2 according to this disclosure.

FIG. 19 illustrates a variation of algorithm A2 according to this disclosure. In this example, input data may first be classified into K different classes. A separate function $f_k(.)$ may be learned for each of the classes ($k \in \{1, \ldots, K\}$). Label L and KPIs/KQIs from supporting data source may first be classified into K different classes. A separate function $f_k(.)$ may be learned for each of the classes ($k \in \{1, \ldots, K\}$). In an exemplary embodiment, each class may correspond to a unique eNB. The training/testing split of the data for each class may be performed using the same method or a different method. For example, the same $T_0$ may be used to divide training and testing data across all classes. The output from each of $f_k(.)$ may be collated in the end to determine a predicted probability value corresponding to each KQI anomaly sample in testing data set(s).

Referring again to FIG. 16, the output of algorithm A2 and A3 in every labeled KQI anomaly sample may be combined with a corresponding probability value in operation 1612. The combination may indicate whether it is possible to predict the KQI anomaly (identified using the reference data source(s)) using KPI samples from supporting data source(s). Algorithm A4 may also include identifying a subset of anomalies using the labeled data discussed above. Various methods may be implemented according to embodiments of this disclosure. One simple method that may be implemented may to only consider KQI anomaly samples with predicted probability value from algorithm A2 being greater than a fixed value (e.g., 0.5).

Certain embodiments in this disclosure provide anomaly detection for voice over long term evolution (VoLTE) voice quality degradation. For example, a PM data source from an operator may be considered as a supporting data source and a third party data source may considered as a reference data source for the same eNBs for which PM data is available. KPIs from PM data may be obtained per cell based on a time window, for example, every 15 minutes. The reference data source may be obtained per eNB on an hourly basis.

Algorithm A1 may aggregate supporting PM data sources from the cell level to the eNB/gNB level by computing a mean value of KPIs over all cells of that eNB/gNB. Algorithm A1 may report the eNB/gNB level every 15 minutes and provide hourly reporting by taking the mean value of the four 15-minute samples per hour. A fixed threshold anomaly detection method may be used for algorithm A3 using the reference data source. The fixed threshold anomaly detection method for detecting VoLTE degradation may be a preferred technique in certain embodiments according to this disclosure.

Certain embodiments according to this disclosure establish causal relations among KPIs and alarms. For example, causal relationships between KPIs, KPIs and alarms, among alarms across time/space using various approaches, etc. Each of the foregoing approaches may be implemented through its own operation. The operations may extract root causes combining causal relations and association rules from ML/AI models. The apparatus may include a training mode. In the training mode, the apparatus may adjust one or more casual relationships based on feedback.

Certain embodiments according to this disclosure include operations to extract KPIs/alarms to monitor for anomaly detection on streaming data. Based on established causal relationships over time, KPI/alarm that may cause future anomalies may be identified. By identifying points of potential anomalies before the anomalies occur, proactive steps may be taken to prevent a future service degradation.

Figure 20:
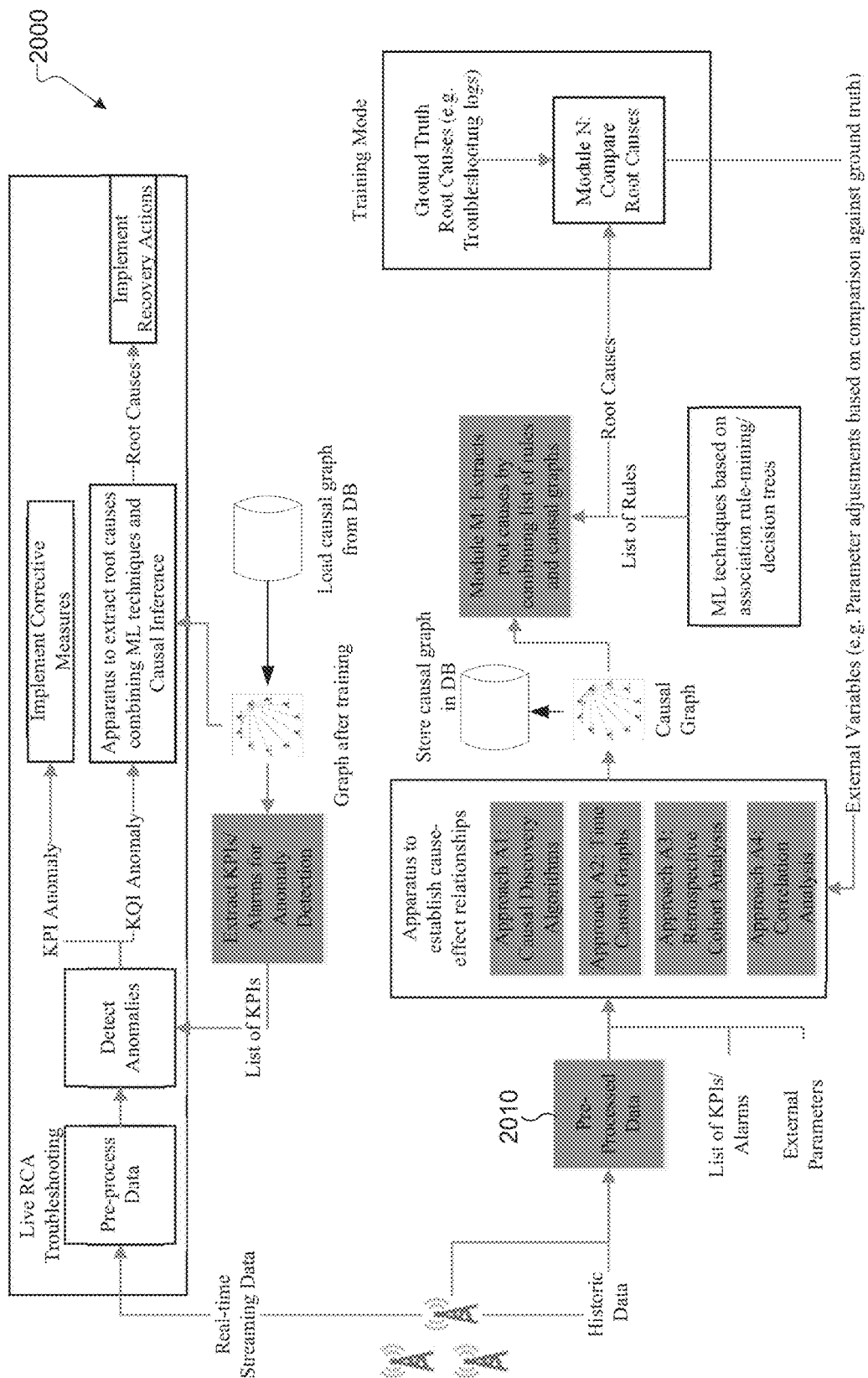
FIG. 20 illustrates one framework for an RCA implementation according to this disclosure.

FIG. 20 illustrates one framework for an RCA implementation according to this disclosure. The real time streaming data or historic data may be received as input from more than one data source as described above with reference to FIG. 16.

Apparatus 2000 may determine cause and effect relationships among any set of desired KPIs and alarms. Apparatus 200 receives, as input, input log data from one or more operations support systems (OSS). For example, a set of KPI values for each (ENB_ID, cell number, time stamp) tuple and a set of time stamped alarms for each ENB_ID.

Apparatus 2000 may ingest time-stamped KPIs and alarms for determining causal relations between alarms, KPIs, and between KPIs and alarms. The apparatus may output a causal Directed Acyclic Graph (DAG). The edges in DAG may represent causal relations across KPIs and alarms within a given (cell number, eNodeB) and across different (cell Numbers, eNodeBs).

With respect to the nature or profile of the log data itself, the following example scenarios may be implemented in accordance with this disclosure. In a first scenario, the log data may be derived from a historical corpus for purposes of deriving causal relations across KPIs, alarms etc., or for training a machine learning model relating KPIs and Alarm values to anomaly occurrences. The causal relations obtained via the historical log data may be stored to a database, such as database 406. In a second different scenario, real-time streaming data may be provided to the apparatus. In the real-time or near real-time streaming data example, causal relations derived earlier via historical log data may be loaded from a database and applied for purposes of identifying anomalies and troubleshooting their underlying root cause.

The log data (whether training or real-time streaming) may be transformed before being applied to apparatus 2000. The apparatus 2000 processes inputs derived from KPIs and alarms for a set of time-stamps $\{t_1, t_2, \ldots t_N\}$. The times $t_1$ through $t_N$ may be periodic, or they may be event-triggered. For each time stamp $t_i$, the inputs may represent the values of the KPIs and alarms; i.e., representing the state of each cell number at each eNB at that time. The set of KPIs and alarms may be chosen by selecting all available KPIs and alarms at the OSS. In alternative embodiments, the set of KPIs and alarms input to apparatus 2000 may be obtained by examining the antecedents and consequent KPIs of rules of the form $\{KPI_1 < T_1, KPI_2 > T_2, \ldots, KPI_N \leq T_N \rightarrow KPI_M = 1\}$, where the right hand side KPI (KPIM) is a monitored KPI that monitors service level quality metrics (e.g., IP throughput for the previous 15 minutes) that takes value 1 if the service quality metric indicates a network anomaly.

Rules may be obtained from a machine learning algorithm such as a neural network, hierarchical decision tree, association rule mining, etc. The KPI vectors for deriving the causal analysis may comprise of either continuous valued KPIs or discrete valued KPIs (e.g. after applying an absolute or relative percentile-based discretization, a threshold, or a mix of both.

In certain embodiment for deriving causal relations according to this disclosure, the apparatus 2000 may perform a statistical causal discovery analysis over the KPIs and alarms across the ensemble of eNBs, cell numbers and time stamps. The apparatus 2000 may output a directed acyclic graph (DAG) with nodes corresponding to KPI values. The DAG has the property that a directed edge from node N1 to N2 implies that KPI N1 at a certain eNB and cell number causally affects KPI N2 at the same eNB and cell number combination. That is, any change in KPI N1, with high probability, influences a corresponding change in KPI N2, either with or without conditioning on one or more KPIs different from N1 and N2. The graph output by the apparatus may also be provided if the inputs are drawn only from alarms or from a mixture of KPIs and alarms.

In other embodiments, the apparatus 2000 may process KPIs and alarms, and perform a time-series causal inference procedure. The apparatus 2000 may produce a DAG such that a directed edge from node N1 to node N2 implies a temporal causal relation between the two nodes. For example, any trends in KPI N1 at a certain time t for a certain eNB and cell number causally influences KPI N2 at time t or later for the same eNB and cell number. For example, if KPI N1 starts to degrade starting from time t, KPI N2 may also experience degradation at time t or later.

The apparatus 2000 may also include embodiments in which the causal discovery or time-series causal relations can be used to establish causal relations between KPIs and alarms across different (ENB, Cell Number) pairs. For example, a directed edge from two nodes N1 to N2 implies that the KPI or Alarm value corresponding to N1 at a first eNB causally influences KPI or Alarm value corresponding to N2 for the neighbors of the first eNB. Other embodiments that employ correlation approaches and cohort analysis for establishing causal relationships across Alarms and KPIs are also in accordance with this disclosure.

In certain embodiments, apparatus 2000 may be used for generating causal DAG could also accept external information. The external information could, for example, represent pre-stored or pre-known ground-truth causal relationships between KPIs and alarms based on historical troubleshooting. Apparatus 2000 could, for example, compare the causal relations output from the causal discovery, temporal causal inference or correlation analysis against the ground-truth causal relationship and validate the correctness of the causal relation. If a certain causal relation output from the DAG is different than the ground-truth information, the apparatus 2000 may indicate causal relationship, through, for example, a user-interface. Apparatus 2000 may alert the end-user that a relationship different from prior causal information has been discovered. The end-user or the apparatus could, for example, eliminate such spurious relations or rerun the causal discovery with corrective actions.

As described in greater detail below, a description regarding pre-stored causal relations, derived using the apparatus 2000, are applied in an RCA system processing real-time streaming data. The causal relations may be obtained either through a correlation approach, a cohort analysis approach, a structural discovery approach, or a time-series causal inference approach. The apparatus 2000 may load the causal relations from a database and apply the relationship either for identifying anomalies ahead of time, or for trouble shooting anomalies to identify their underlying root causes.

For example, if a causal graph indicates a directed edge starting at KPI N1 and terminating at KPI N2, it may be implied that any degradation in the value of N1 can result in a degradation at N2. As a simple example, if N1 denotes Cell Accessibility KPI, then any degradation in Cell Accessibility can result in degradation in IP Throughput KPI (=KPI N2).

In certain embodiments, apparatus 2000 may extract from the causal DAG a subset of nodes (KPIs) such that each KPI within this subset has one or more than one outbound edge within the DAG. Variations of this embodiment are also possible in accordance with this disclosure. For example, only the nodes (KPIs) having outbound edges and no inbound edges may be extracted by apparatus 2000. The ensuing KPIs within this subset may be monitored and used for proactively identifying anomalies in other KPIs. In certain embodiments, apparatus 2000 may monitor the KPIs within this subset for anomalies as the KPIs within this subset causally affect other KPIs in the system. For example, if any negative trends are identified in one or more KPIs lying in this subset, the apparatus can indicate that an anomaly has occurred and trigger troubleshooting/RCA.

For example, in certain embodiments, based on the causal analysis described above, within the rule of the form $\{KPI_1 < T_1, KPI_2 < T_2, KPI_3 < T_3 \Rightarrow KPI_M = 1\}$, $KPI_1$ may be determined as having a causal effect on KPIs lying in $\{KPI_2, KPI_3, KPI_M\}$. That is, in the causal DAG structure, a directed arrow connects the node $KPI_1$ with each of the nodes corresponding to $KPI_2$, $KPI_3$ and $KPI_M$. Thus, apparatus 2000 may monitor $KPI_1$ and any negative trends in this KPI can be linked to the anomalies in the service level KPI $KPI_m$.

During the troubleshooting/RCA process, the causal relations can be fused together with a set of rules obtained during the machine learning model. In one embodiment, for example, during the RCA process, suppose a certain rule or set of rules are satisfied by the KPI samples during periods of service level anomaly (or $KPI_M = 1$). For each satisfied rule, the apparatus loads from the causal DAG, the causal relations corresponding to the nodes (KPIs) belonging within each rule. The apparatus could indicate via the user interface, the rules that are satisfied and the causal relations between the KPIs belonging to each rule. The end user can apply these causal relations for determining the root cause or the KPI that was responsible for service level degradation.

Figure 21:
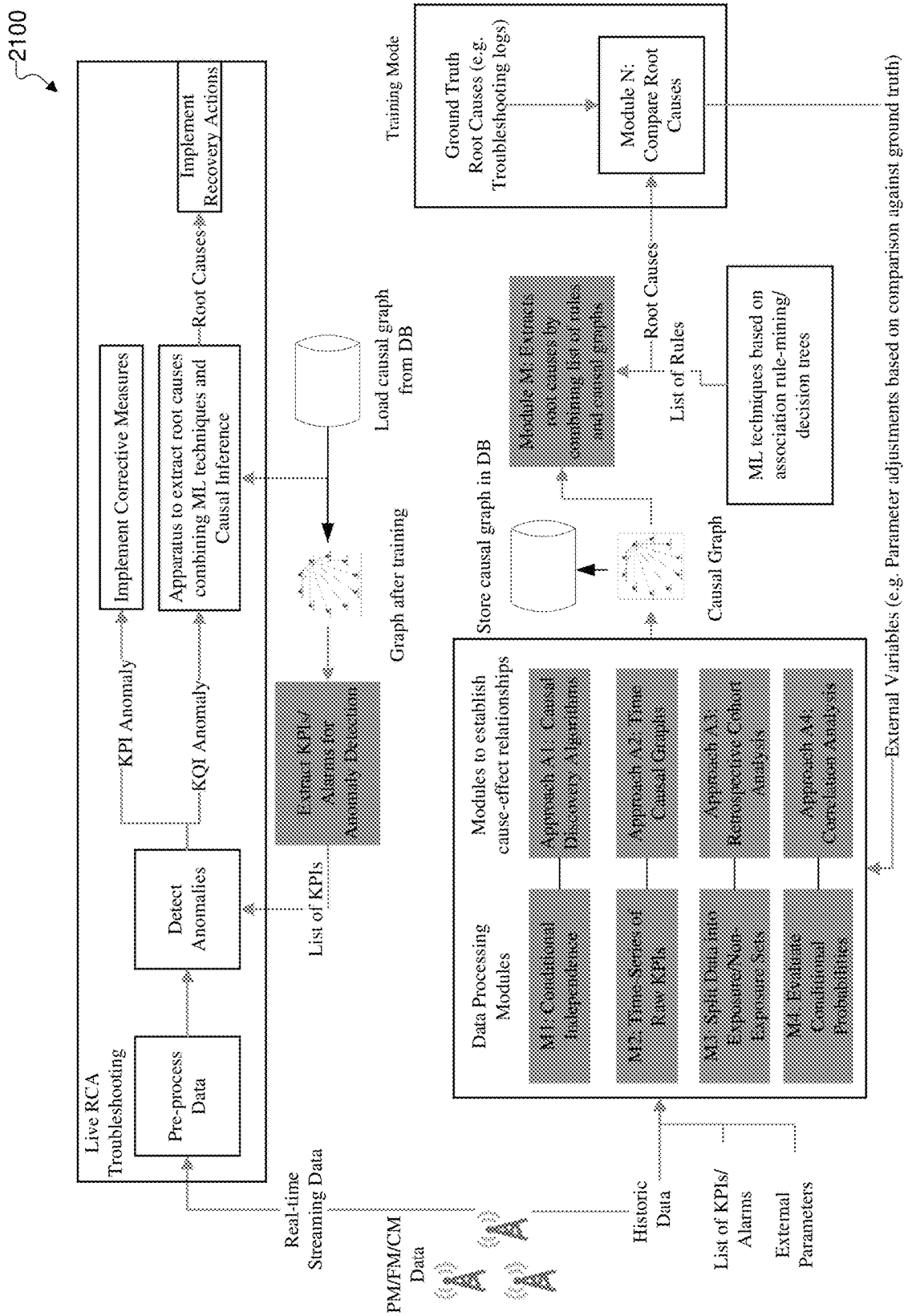
FIG. 21 illustrates an example framework for an RCA implementation according to this disclosure.

FIG. 21 illustrates the example apparatus 2100. The example apparatus 2100 is similar to the apparatus 2000 of FIG. 20. The embodiments of FIGS. 20 and 21 are for illustration only. Other embodiments can be used without departing from the scope of this disclosure.

The apparatus 2100 is equipped to implement various approaches to determine the cause effect relations among KPIs and alarms. A specific pre-processing of data is used for each of the approaches. Various data-processing modules can be used to transform the log data from OSS. Data processing modules that transform the log data based be based on a casual discovery process, a time series casual inference process, a retrospective cohort analysis, a correlation analysis across space analysis, or any combination thereof.

In certain embodiments, a data processing module that transforms the log data can be based on a casual discovery process. For example various causal discovery processes rely on statistical conditional independence among the variables under consideration to establish cause-effect relationships. Thus, in this specific embodiment, a module (M1) that takes in as input that includes (i) all combinations of KPIs and Alarms and (ii) log data of continuous valued or discretized KPIs and alarms with values at each (ENB_ID, cell number, time stamp). The module M1 also checks for conditional independence and outputs 0/1 for each of the KPI/alarm combination with 1 indicating conditional independence and vice versa.

For example, a KPI/alarm value at an (ENB_ID, cell number, time stamp) tuple can be one sample. Assuming KPI values are discretized, each KPI/alarm is considered to be a discrete random variable with all the samples from log data as realizations/statistical data to be used to establish conditional independence. Variations of this approach can be applied without loss of generality even if the KPIs are continuous valued.

Various methods exists in testing for conditional independence, in this specific embodiment the G-square test that is predominately used in evaluating conditional independence in binary or multi-level data. This test is based on information theory and uses cross entropy. This is not restrictive and various other methods such as chi-square tests can also be implemented. The test is applied to the input which is all combinations of KPIs/alarms and the output is then given as input to the module implementing the causal discovery algorithms. For example, consider the list of KPIs as $\{A_1, A_2, A_3, A_4\}$, then this module tests for following conditional independence relationships. The first relationship is $A_i \perp\!\!\!\perp A_j$, $i \neq j \in \{1,2,3,4\}$. The second relationship is $A_i \perp\!\!\!\perp A_j | A_k$, $i \neq j \neq k \in \{1,2,3,4\}$. The third relationship is $A_i \perp\!\!\!\perp A_j | (A_k, A_l)$, $i \neq j \neq k \neq l \in \{1,2,3,4\}$.

In this specific embodiment, a Peter-Clark (PC) algorithm and/or a causal structural discovery algorithm can be used to establish causation. However in other embodiments, and any general causal algorithm can be used. The PC algorithm uses the conditional independence results (output from previous module) as input to generate a causal graph, where an edge between nodes imply causation. The edges are added to the graph based on the principle that a causal directed graph fundamentally satisfies the Causal Markov condition. For instance, to define the Causal Markov condition, let G represent the causal graph with vertices V and let P be the probability distribution over vertices generated by causal structure over graph G. Then the causal Markov condition states that for any vertex $W \in V$, W is independent of all vertices of V that not its descendants given parents of W. The PC algorithm can produce a Markov equivalent Causal DAG as long as the vertexes satisfying the Causal Markov condition and the Faithfulness condition.

Figure 22A:
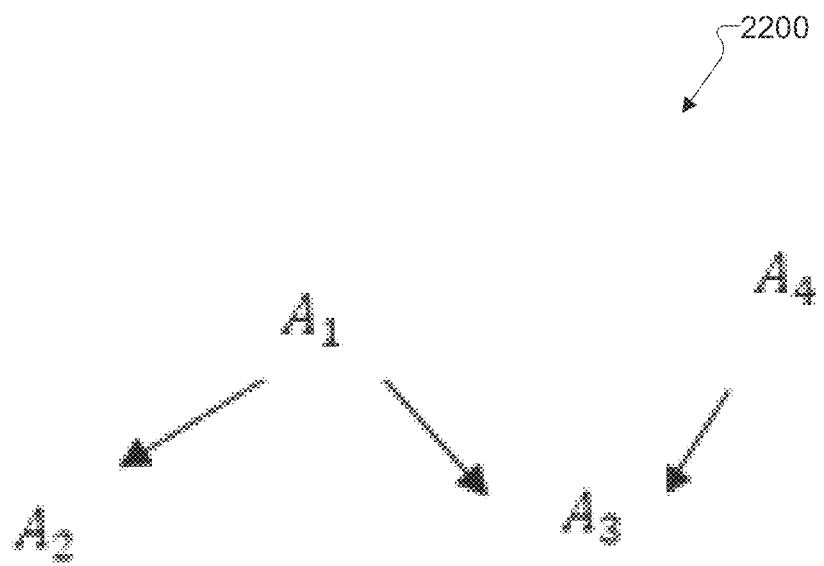
FIG. 22A illustrates an example, causal graph that is generated based on causal discovery process according to this disclosure.

FIG. 22A illustrates an example, causal graph 2200 that is generated based on causal discovery process according to an embodiment of the present disclosure. As illustrated in FIG. 22A, The causal graph 2200 is produced, where A1 being a parent of nodes A2 and $\{A1, A4\}$ being parent nodes of A3) when the following four conditions are true. A first condition can be including $A_1 \perp\!\!\!\perp A_4$. A second condition can be including $A_2 \perp\!\!\!\perp A_3 | A_1$. A third condition can be including $A_2 \perp\!\!\!\perp A_4 | A_1$. A fourth condition can be including $A_1$, $A_4$ are dependent given $A_3$: $A_1$ and $A_4$ form collider at $A_3$. Thus, $A_1$ and $A_4$ jointly vary given $A_3$. Given these causal Markov conditions, A2 and A3 are D-separated (or conditionally independent) by set $\{A1\}$; A1 and A4 are unconditionally D-separated; A2 and A4 are unconditionally D-separated; A2 and A4 are D-connected conditioned on $\{A3\}$; A1 and A4 are D-connected conditioned on $\{A3\}$, as illustrated in FIG. 22A.

In certain embodiments, a data processing module that transforms the log data can be based on a time series casual inference process. Various time-series causal inference algorithms take in as input a pair of discrete-time stochastic processes and establishes causal relations among them. Thus, in this specific embodiment, we design a module (M2) that takes in input including (i) the historical log data of KPIs over multiple days with values at each (ENB_ID, cell number, time stamp) tuple, (ii) a confidence threshold Tconf, (iii) Maximum number of (ENB_ID, cell_number) analyzed: N, and (iv) List of KPIs. The data processing module that transforms the log data can be based on a time series casual inference process can output time series (KPI(t)) for each KPI at every one of the N (ENB_ID, cell_number) pairs, where KPI(t) is a function in time taking values at every 15 minutes denoting KPI values at the specified ENB_ID, cell_number.

It is noted that each KPI time series data {KPI(t)} at (ENB_ID, cell_number) pair is a realization of a discrete time stochastic process. The Module M2 can take in as input either discretized KPI data (discrete-valued stochastic process) or raw KPI data (real-valued stochastic process). In a simplest embodiment, the module randomly selects N (ENB_ID, cell_number) pairs such that at least 50% of them correspond to a KQI anomaly and then it generates the time series data for each KPI in the list of KPIs. This is not restrictive and can be varied. The output of the data processing module M2, is the input to the module implementing the time-series causation approach. This module establishes time-series causation relations among all possible pairs of KPIs by considering various causation tests such as Granger causality tests and Transfer Entropy tests.

Figure 22B:
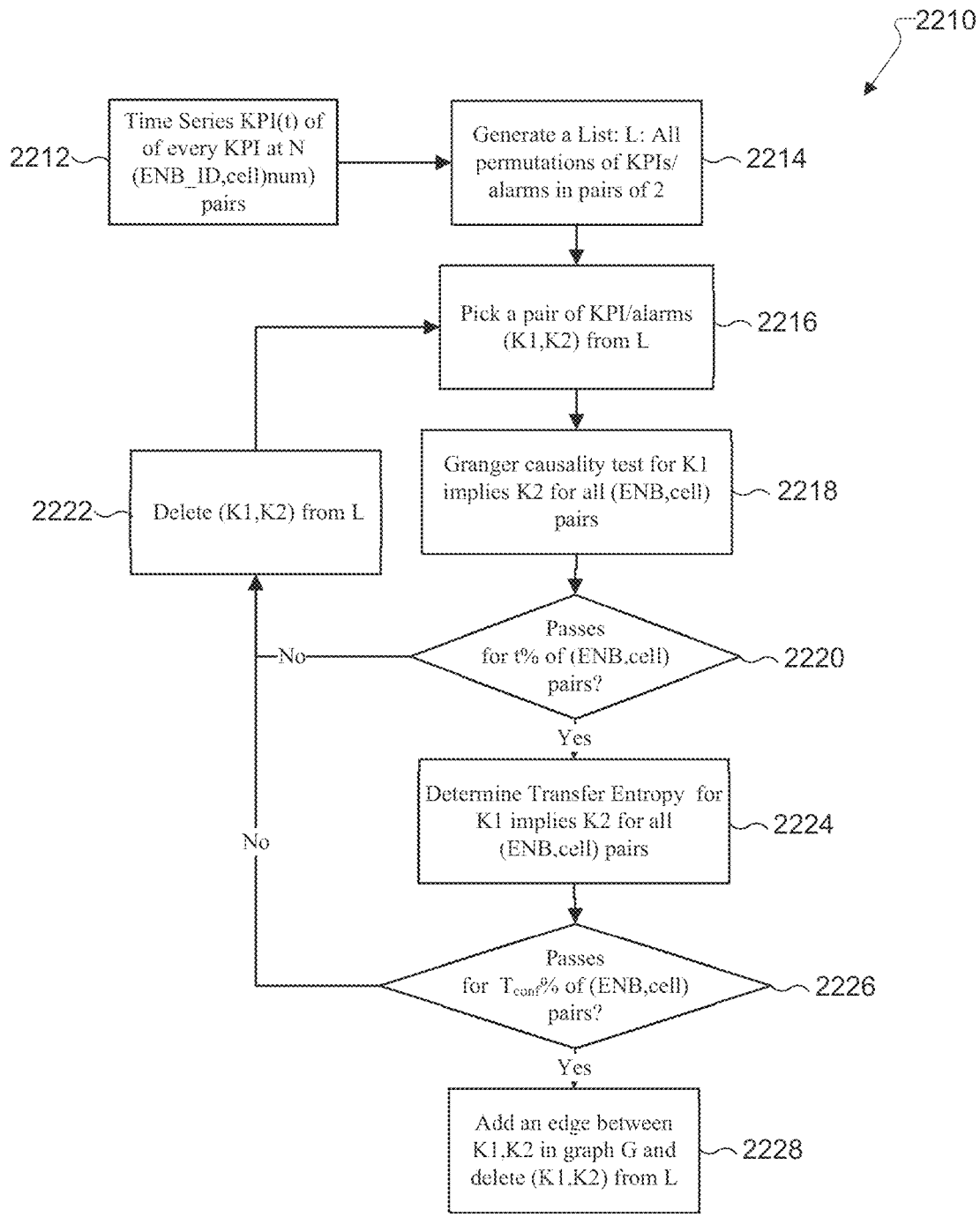
FIG. 22B illustrates an example process for time series causal inference according to this disclosure.

FIG. 22B illustrates an example flowchart 2210 for time series causal inference according to this disclosure. In certain embodiments, tests are performed on multiple realizations of KPI stochastic processes, i.e., on N pairs of (ENB_ID, cell_numbers) and causations are established if the test is passed in Tconf % of the realizations.

At step 2212 the apparatus receives time series KPI data of KPIs at N pairs. In step 2214 a list L is generated that includes all permutation of the KPI's/alarms in pairs of two. In step 2216 a pair of KPI or alarm is selected from the list L. In step 2218 a Granger causality tests is performed. The Granger causality tests for K1 implies that K2 for all (ENB, cell) pairs. In step 2200 a determination is performed. When the pair does not pass, then in step 2222 K1 and K2 are deleted from the list. Alternatively, if the pairs pass, then in step 2224 a transfer entropy is determined. The determined transfer entropy for K1 implies K1 for all (ENB, cell) pairs. In step 2226 another determination is performed. When it does not pass a threshold of Tconf %, then in step 2222 K1 and K2 are deleted from the list L. Alternatively, if the pairs pass, then in step 2228 an edge is added between K1 and K2 in graph G. Additionally in step 2228 (K1, K2) are deleted from the list L.

In certain embodiments, a data processing module that transforms the log data can be based on a retrospective cohort analysis. the retrospective cohort analysis establishes a causation X→Y, where the algorithm considers metrics such as odds ratio/relative risk. Odds ratio is the odds that Y occurs when X is present compared to that when X is absent.

The following are example nomenclature used in the retrospective cohort analysis. For X→Y, X: Exposure Variable and Y: Response Variable. A Exposure Set includes a dataset where X is present. A Non-Exposure Set includes a dataset where X is absent. The expresses ions supp(X), supp($\overline{X}$) indicate support of dataset where X is present and absent respectively. Equation (2) is an example odds ratio and Equation (3) is an example relative risk.

$$(X \rightarrow Y) = \frac{supp(XY)supp(\overline{X}\overline{Y})}{supp(\overline{X}Y)supp(Y\overline{X})} \quad (2)$$

$$(X \rightarrow Y) = \frac{supp(XY)supp(\overline{X})}{supp(\overline{X}Y)supp(X)} \quad (3)$$

In this embodiment of retrospective cohort analysis, the data processing module M3 takes as input (i) log data of (discretized) KPIs with values at each (ENB_ID, cell number, time stamp) tuple and (ii) List of KPIs/alarms. The data processing module M3 then outputs exposure and non-exposure sets for each KPI/alarms in the list by splitting the input log data.

The module evaluating the causation, would then takes in as input the exposure and non-exposure sets of every KPI/alarm as input data and outputs a causal graph. First, it considers all possible permutations of KPI/alarms in pairs of 2, and evaluates the odds ratio using the input datasets. It then adds an edge between the nodes, if the odds ratio is greater than 1. Cohort Analysis based on odds ratio is not restrictive and other metrics such as relative risk can be used.

In certain embodiments, a data processing module that transforms the log data can be based on a correlation analysis across space analysis. In this embodiment, the neighboring ENB information from the Configuration Management (CM) data is considered for establishing cause-effect relationship among alarms in different (ENB_ID, cell_number) pairs. In this embodiment of correlation analysis across space analysis, the data processing Module M4 takes as input (i) Alarm log data that includes alarm time, clear time, location, (ii) Neighboring ENB Information from CM data, and (iii) Causation time δt. The data processing Module M4 then outputs conditional probabilities $P(A_1|A_2)$ for all permutations of alarms in pairs of 2. Equation (4) describes the conditional probability $$P(A_1|A_2)=P(A_1\in\{[t,t+\Delta t]\times\text{neigh}(E_1)\}|A_2\in\{t\times E_1\}) \quad (4)$$

As shown in Equation (4), given alarm $A_2$ occurred at time t at ENB $E_1$, the probability that an alarm $A_1$ occurs at one of the neighboring ENBs within δt. The module to evaluate the causation, takes as input these conditional probabilities, and threshold t2. It then outputs a causal graph by adding an edge between two alarms, if the conditional probability is above the specified threshold t2.

Figure 23:
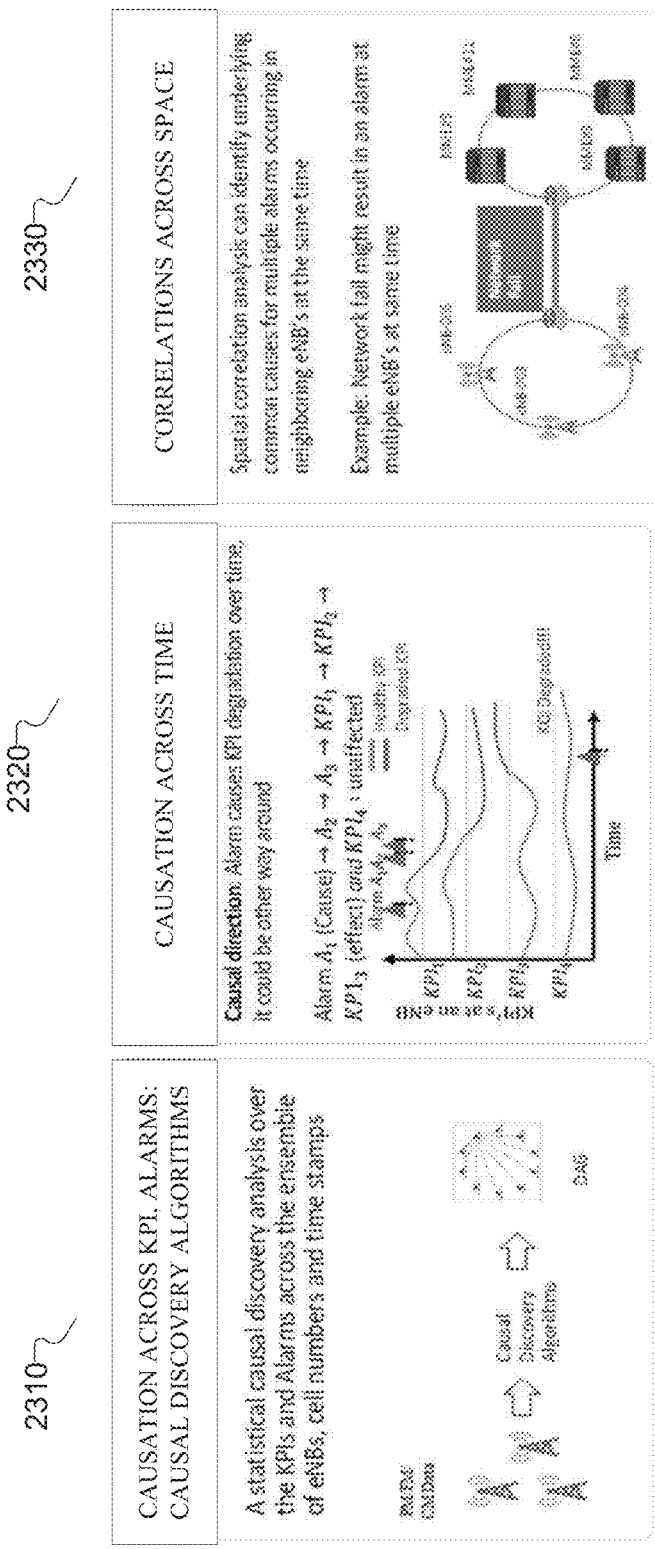
FIG. 23 illustrates implementations for establishing causal relationships among KPIs and alarms according to this disclosure.

FIG. 23 illustrates implementations for establishing causal relationships among KPIs and alarms according to this disclosure. As described above, causal relations may be established among KPIs, KPIs and alarms, alarms across time and space. For example, module 2310 may establish causation across KPIs and alarms, module 2320 may establish causation across time, and module 2330 may establish correlations across space. Modules 2310, 2320, and 2330 may run independent of each other. Further, one or more of modules 2310, 2320, and 2330 may be omitted. Additional operations may also be added. Module 2310 may perform a statistical causal discovery analysis over KPIs and alarms across an ensemble of eNBs, cell numbers, and time stamps. Module 2320 may establish causation by measuring data points over time. For example, module 2320 may determine that an alarm is causing KPI degradation over time, or that a KPI is causing an alarm. For example, Alarm $A_1$ (Cause)→$A_2$→$A_3$→$KPI_1$→$KPI_2$→$KPI_3$ (effect) and $KPI_4$: unaffected. Module 2330 may determine correlations across space. Spatial correlation analysis may identify underlying common causes for multiple alarms occurring in neighboring eNB/gNBs at the same time. For example, a network fail might result in an alarm at multiple eNB/gNBs at the same time.

Referring again to FIG. 20, in the preprocessing of data 2010, log data from, for example, PM, CM, and FM data may be transformed before being applied to the apparatus. It is noted that alarms/KPIs may be of different granularity. KPIs may be discretized/continuous valued. Neighboring cells information form CM data may be used to establish cause-effect relationship among alarms in different (e.g., ENB_ID, cell_number) pairs.

In a root cause mechanism, root causes may be extracted by analyzing causal relations and outputs of machine learning models together instead of individually.

Feedback mechanism may compare the ground truth and feed in external variables back to one of the modules inferring causality (e.g. 2310, 2320, and 2330). The causality module may apply adjustments to its model based on the feedback from the feedback mechanism.

Figure 24:
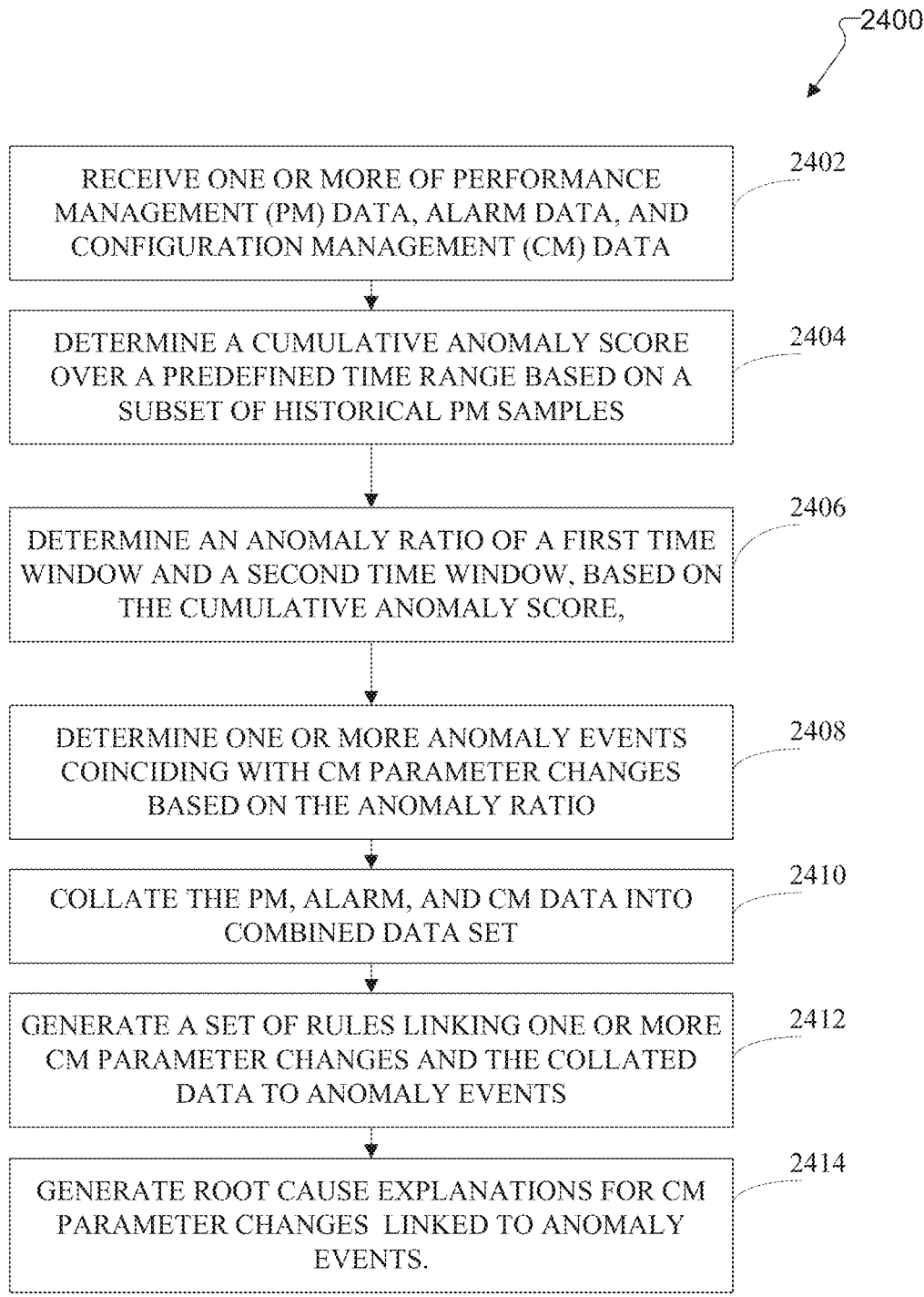
FIG. 24 illustrates an example process flowchart 2400 for identifying network anomalies in accordance with this disclosure.

FIG. 24 illustrates an example process flowchart 2400 for identifying network anomalies in accordance with this disclosure. The steps that follow may be performed by an electronic device. As described above, an electronic device may have similar components and capabilities as any of UEs 111-116. At step 2402, the electronic device may receive one or more of performance management (PM) data, alarm data, and configuration management (CM) data from one or more devices on a network. At step 2404, the electronic device may determine a cumulative anomaly score over a pre-defined time range based on a subset of historical PM samples. At step 2406, the electronic device may determine an anomaly ratio of a first time window and a second time window, based on the cumulative anomaly score, wherein the first time window is before one or more CM parameter changes and the second time window is a time window during and after one or more CM parameter changes. At step 2408, the electronic device may determine one or more anomaly events coinciding with CM parameter changes based on the anomaly ratio. At step 2410, the electronic device may collate the PM, alarm, and CM data into a combined data set based on matching fields and timestamps. At step 2412, the electronic device may generate a set of rules linking one or more CM parameter changes and the collated data to anomaly events. At step 2414, the electronic device may generate root cause explanations for CM parameter changes that are linked to anomaly events.

Certain embodiments of this disclosure can be applied to any electronic system with multiple sources of KPIs used for diagnosing problems with the system followed by root cause analysis. For example, an automated VoLTE root cause analysis system.

This disclosure can be applied to any case that may need to improve

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

While the above detailed diagrams have shown, described, and pointed out novel features of the present disclosure as applied to various embodiments, it will be understood that various omissions, substitutions, and changes in the form and details of the device or process illustrated may be made by those skilled in the art without departing from the present disclosure. This description is in no way meant to be limiting, but rather should be taken as illustrative of the general principles of the present disclosure.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus for identifying network anomalies, the apparatus comprising:
   a communication interface configured to receive one or more of performance management (PM) data, alarm data, and configuration management (CM) data from one or more devices on a network, and
   a processor operably connected to the communication interface, the processor configured to:
   determine a cumulative anomaly score over a pre-defined time range based on a subset of historical PM samples;
   determine an anomaly ratio of a first time window and a second time window, based on the cumulative anomaly score, wherein the first time window is before one or more CM parameter changes and the second time window is a time window during and after the one or more CM parameter changes;
   determine one or more anomaly events coinciding with the one or more CM parameter changes based on the anomaly ratio;
   collate the PM data, the alarm data, and the CM data into combined data set based on matching fields and timestamps;
   generate a set of rules linking one or more CM parameter changes and the collated data to anomaly events;
   control the apparatus to transmit the set of rules to a controller of the network;
   generate root cause explanations for CM parameter changes that are linked to anomaly events;
   identify a reference data source among two or more data sources that report key performance indicators (KPIs); and
   determine whether to modify a granularity of reporting of KPIs to be a finer granularity or a more coarse granularity based on a granularity of reporting of KPIs that corresponds to the reference data source.

2. The apparatus of claim 1, wherein the processor is further configured to:
   receive information indicating changes to CM settings from the one or more devices on the network;
   compare the collated data and the CM settings of the one or more devices against a set of generated rules for one or more matched rules associated with a performance improvement;
   identify one or more parameter settings based on the one or more matched rules;
   update the CM settings of the one or more devices with the parameter settings; and
   evaluate the one or more matched rules by updating the CM settings of the one or more devices based on the set of generated rules,
   wherein:
   the update is performed at pre-defined intervals, based on a probability, or in an order, relative to other rules, based on a priority associated with the one or more matched rules, or
   the update is performed in an order, relative to other rules, based on a priority associated with the one or more matched rules, wherein matched rules with higher priority are evaluated first.

3. The apparatus of claim 1, wherein the processor is configured to generate the set of rules linking one or more CM parameter changes and the collated data to anomaly events, based on at least one of:
changing a parameter value to another value;
changing the parameter value from a fixed before value to another after value;
changing the parameter value to a fixed after value, or a value in a predefined range;
changing the parameter value from the fixed before value, to a value in the predefined range; and
changing a parameter based on a threshold quantity.

4. The apparatus of claim 1, wherein the processor is further configured to:
determine instances of degradation events by comparing the anomaly ratio to a threshold value, wherein the threshold value is greater than 1; and
determine instances of improvement events by comparing the anomaly ratio to the threshold value, wherein the threshold value is greater than 1.

5. The apparatus of claim 1, wherein the processor is further configured to identify whether another anomaly event at one of the one or more devices coincides in time with a CM parameter change at a neighbor device.

6. The apparatus of claim 1, wherein the root cause explanations include:
root cause category codes comprising type of fault, failure, or abnormal condition;
root cause symptoms based on the root cause category codes and comprising a set of PM, alarm, and CM data variables or ranges; and
recommendations for one or more corrective actions.

7. The apparatus of claim 1, wherein the processor is further configured to:
receive the KPIs and alarm data from the two or more data sources; and
modify the granularity of reporting of the KPIs by interpolating the granularity of reporting to the finer granularity, or aggregating the granularity of reporting to match the more coarse granularity, based on the reference data source.

8. The apparatus of claim 1, wherein the processor is further configured to:
ingest the PM data and the alarm data from the two or more data sources;
identify remaining data sources of the two or more data sources as supporting data sources;
identify anomalous samples based on the KPIs extracted from one or more of the two or more data sources;
refine the anomalous samples based on preconfigured criteria;
perform a root cause analysis for one or more anomalies based on the refined anomalous samples; and
generate a root cause explanation based on the root cause analysis.

9. The apparatus of claim 1, wherein, the processor is further configured to:
extract the KPIs and alarms from the PM data, the alarm data, and the CM data based on established causal relations over a historical time; and
detect network anomalies based on the extracted KPIs and alarms.

10. The apparatus of claim 1, wherein the processor is further configured to:
receive the KPIs and alarm data from the two or more data sources;
determine causal relations between one or more of the KPIs and the alarm data across different time and space based on the KPIs and the alarm data; and
generate prediction information indicating a future anomaly at a second location based on one or more previous or current anomalies at a first location and the causal relations.

11. A method for identifying network anomalies, the method comprising:
receiving one or more of performance management (PM) data, alarm data, and
configuration management (CM) data from one or more devices on a network;
determining a cumulative anomaly score over a pre-defined time range based on a subset of historical PM samples;
determining an anomaly ratio of a first time window and a second time window, based on the cumulative anomaly score, wherein the first time window is before one or more CM parameter changes and the second time window is a time window during and after the one or more CM parameter changes;
determining one or more anomaly events coinciding with the one or more CM parameter changes based on the anomaly ratio;
collating the PM data, the alarm data, and the CM data into combined data set based on matching fields and timestamps;
generating a set of rules linking one or more CM parameter changes and the collated data to anomaly events;
transmitting the set of rules to a controller of the network;
generating root cause explanations for CM parameter changes that are linked to anomaly events;
identifying a reference data source among two or more data sources that report key performance indicators (KPIs); and
determining whether to modify a granularity of reporting of KPIs to be a finer granularity or a more coarse granularity based on a granularity of reporting of KPIs that corresponds to the reference data source.

12. The method of claim 11, further comprising:
receiving information indicating changes to CM settings from the one or more devices on the network;
comparing the collated data and the CM settings of the one or more devices against a set of generated rules for one or more matched rules associated with a performance improvement;
identifying one or more parameter settings based on the one or more matched rules;
updating the CM settings of the one or more devices with the parameter settings; and
evaluating the one or more matched rules by updating the CM settings of the one or more devices based on the set of generated rules,
wherein:
the updating is performed at pre-defined intervals, based on a probability, or in an order, relative to other rules, based on a priority associated with the one or more matched rules, or
the updating is performed in an order, relative to other rules, based on a priority associated with the one or more matched rules, wherein matched rules with higher priority are evaluated first.

13. The method of claim 11, further comprising:
generating the set of rules linking one or more CM parameter changes and the collated data to anomaly events, based on at least one of:
changing a parameter value to another value;
changing the parameter value from a fixed before value to another after value;

changing the parameter value to a fixed after value, or a value in a predefined range;

changing the parameter value from the fixed before value, to a value in the predefined range; and changing a parameter based on a threshold quantity.

14. The method of claim 11, further comprising:

determining instances of degradation events by comparing the anomaly ratio to a threshold value, wherein the threshold value is greater than 1; and determining instances of improvement events by comparing the anomaly ratio to the threshold value, wherein the threshold value is greater than 1.

15. The method of claim 11, further comprising:

identifying whether another anomaly event at one of the one or more devices coincides in time with a CM parameter change at a neighbor device.

16. The method of claim 11, wherein the root cause explanations include:

root cause category codes comprising type of fault, failure, or abnormal condition;

root cause symptoms based on the root cause category codes and comprising a set of PM, alarm, and CM data variables or ranges; and recommendations for one or more corrective actions.

17. The method of claim 11, further comprising:

receiving the KPIs and alarm data from the two or more data sources; and modifying the granularity of reporting of the KPIs by interpolating the granularity of reporting to the finer granularity, or aggregating the granularity of reporting to match the more coarse granularity, based on the reference data source.

18. The method of claim 11, further comprising:

ingesting the PM data and the alarm data from the two or more data sources;

identifying remaining data sources of the two or more data sources as supporting data sources;

identifying anomalous samples based on the KPIs extracted from one or more of the two or more data sources; and refining the anomalous samples based on preconfigured criteria.

19. The method of claim 11, further comprising:

extracting the KPIs and alarms from the PM data, the alarm data, and the CM data based on established causal relations over a historical time; and detecting network anomalies based on the extracted KPIs and alarms.

20. The method of claim 11, further comprising:

receiving the KPIs and alarm data from the two or more data sources;

determining causal relations between one or more of the KPIs and the alarm data across different time and space based on the KPIs and the alarm data; and generating prediction information indicating a future anomaly at a second location based on one or more previous or current anomalies at a first location and the causal relations.

* * * * *